US 12,487,640 B2

United States Patent
Kumar Agrawal et al.

(10) Patent No.: US 12,487,640 B2
(45) Date of Patent: Dec. 2, 2025

(54) ELECTRONIC DEVICES WITH TRANSLATING FLEXIBLE DISPLAYS AND CORRESPONDING METHODS FOR MANAGING DISPLAY POSITION AS A FUNCTION CONTENT PRESENTATION

(71) Applicant: Motorola Mobility LLC, Chicago, IL (US)

(72) Inventors: Amit Kumar Agrawal, Bangalore (IN); Rohit Sisodia, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/090,270

(22) Filed: Dec. 28, 2022

(65) Prior Publication Data

US 2024/0126332 A1   Apr. 18, 2024

Related U.S. Application Data

(60) Provisional application No. 63/419,994, filed on Oct. 27, 2022, provisional application No. 63/416,927, filed on Oct. 17, 2022.

(51) Int. Cl.
 *G06F 1/16* (2006.01)
(52) U.S. Cl.
 CPC .......... *G06F 1/1652* (2013.01); *G06F 1/1624* (2013.01); *G06F 1/1675* (2013.01); *G06F 1/1677* (2013.01)
(58) Field of Classification Search
 CPC .... G06F 1/1652; G06F 1/1624; G06F 1/1675; G06F 1/1677
 See application file for complete search history.

(56) References Cited

U.S. PATENT DOCUMENTS

| | | |
|---|---|---|
| 9,473,190 B1 | 10/2016 | Sandlofer |
| 10,225,515 B1 | 3/2019 | Sun |
| 11,513,604 B2 | 11/2022 | Jain et al. |
| 11,616,869 B2 | 3/2023 | Lee |
| 11,838,433 B1 | 12/2023 | Agrawal |
| 11,940,842 B2 | 3/2024 | Kang |
| 11,997,805 B2 | 5/2024 | Delaporte |
| 12,045,535 B2 | 7/2024 | Han |
| 12,100,323 B1 | 9/2024 | Agrawal |

(Continued)

FOREIGN PATENT DOCUMENTS

| | | |
|---|---|---|
| CN | 107430482 | 12/2017 |
| CN | 108762391 | 11/2018 |

(Continued)

OTHER PUBLICATIONS

Davies, Daniel, "GB Search Report", GB Application No. GB2315569.0; Mailed Apr. 12, 2024.

(Continued)

*Primary Examiner* — Andrey Belousov
(74) *Attorney, Agent, or Firm* — Philip H. Burrus, IV

(57) ABSTRACT

A method in an electronic device transitions a blade assembly that carries a blade and flexible display and that is slidably coupled to a device housing and movable between an extended position, a retracted position, and a peek position to a position between the retracted position and the extended position when content is to be newly presented on the flexible display.

20 Claims, 23 Drawing Sheets

(56) References Cited

U.S. PATENT DOCUMENTS

| | | |
|---|---|---|
| 12,160,540 B1 | 12/2024 | Chandran |
| 2003/0144034 A1 | 7/2003 | Hack |
| 2005/0219372 A1 | 10/2005 | Watanabe |
| 2006/0082518 A1 | 4/2006 | Ram |
| 2007/0273752 A1 | 11/2007 | Chamber |
| 2009/0137279 A1* | 5/2009 | Silfverberg ............ H04M 1/23 345/169 |
| 2012/0311499 A1 | 12/2012 | Dellinger |
| 2013/0275910 A1 | 10/2013 | Kim |
| 2014/0071039 A1 | 3/2014 | Saiki |
| 2016/0037625 A1 | 2/2016 | Huitema |
| 2016/0282899 A1 | 9/2016 | Inagaki |
| 2016/0378270 A1 | 12/2016 | Lee |
| 2017/0034319 A1 | 2/2017 | Chenn |
| 2017/0235341 A1 | 8/2017 | Huitema |
| 2018/0198896 A1 | 7/2018 | Kang |
| 2019/0155492 A1* | 5/2019 | Woo .................... G06F 3/04847 |
| 2019/0261519 A1 | 8/2019 | Park et al. |
| 2019/0346954 A1 | 11/2019 | Jung |
| 2020/0081227 A1 | 3/2020 | Huang |
| 2020/0128124 A1 | 4/2020 | Lin |
| 2020/0202472 A1* | 6/2020 | Barak .................... H04W 4/021 |
| 2020/0301567 A1 | 9/2020 | Park |
| 2020/0326754 A1 | 10/2020 | Kim |
| 2020/0336577 A1 | 10/2020 | Han |
| 2021/0026408 A1* | 1/2021 | Ha ........................ G06F 1/1605 |
| 2021/0185237 A1 | 6/2021 | Wang |
| 2021/0337049 A1 | 10/2021 | Noh |
| 2021/0385311 A1 | 12/2021 | Kim |
| 2021/0397264 A1 | 12/2021 | Jain et al. |
| 2021/0397815 A1 | 12/2021 | Alemah et al. |
| 2022/0035412 A1 | 2/2022 | Agrawal et al. |
| 2022/0038572 A1 | 2/2022 | Agrawal et al. |
| 2022/0098146 A1 | 3/2022 | Hart-Cooper et al. |
| 2022/0130304 A1 | 4/2022 | Chung |
| 2022/0174198 A1 | 6/2022 | Wang |
| 2022/0237816 A1 | 7/2022 | Jiang |
| 2022/0368784 A1 | 11/2022 | Koh |
| 2023/0007149 A1 | 1/2023 | Ji |
| 2023/0034607 A1 | 2/2023 | Li |
| 2023/0051784 A1 | 2/2023 | Lee |
| 2023/0053032 A1 | 2/2023 | Jeon |
| 2023/0097982 A1 | 3/2023 | Kim |
| 2023/0122508 A1 | 4/2023 | Kim |
| 2023/0221768 A1 | 7/2023 | Liu |
| 2023/0224573 A1* | 7/2023 | Park ........................ H04N 23/51 348/222.1 |
| 2023/0259268 A1* | 8/2023 | Chun .................... G06F 1/1677 715/781 |
| 2023/0273645 A1* | 8/2023 | Kwon ............... H04M 1/72454 361/679.01 |
| 2023/0300451 A1 | 9/2023 | Cheon |
| 2024/0040023 A1 | 2/2024 | Wang |
| 2024/0073313 A1 | 2/2024 | Chen |
| 2024/0126332 A1 | 4/2024 | Kumar Agrawal |
| 2024/0126333 A1 | 4/2024 | Link |
| 2024/0126335 A1 | 4/2024 | Groebe |
| 2024/0126345 A1 | 4/2024 | Agrawal |
| 2024/0129393 A1 | 4/2024 | Vashist |
| 2024/0129396 A1 | 4/2024 | Vashist |
| 2024/0129398 A1 | 4/2024 | Poluru |
| 2024/0243683 A1 | 7/2024 | Kang |
| 2024/0420608 A1 | 12/2024 | Choi |
| 2024/0431049 A1 | 12/2024 | Lee |
| 2025/0021136 A1 | 1/2025 | Lee |
| 2025/0053194 A1 | 2/2025 | Park |
| 2025/0053292 A1 | 2/2025 | Yang |
| 2025/0107022 A1 | 3/2025 | Kang |

FOREIGN PATENT DOCUMENTS

| | | |
|---|---|---|
| CN | 110300195 | 10/2019 |
| CN | 109076122 | 4/2021 |
| CN | 112640404 | 4/2021 |
| CN | 114546225 | 8/2023 |
| EP | 3547101 | 8/2020 |
| EP | 3731502 | 10/2020 |
| EP | 3531230 | 4/2022 |
| JP | 2005176370 | 6/2005 |
| KR | 20190101184 | 8/2019 |
| KR | 20220077516 | 6/2022 |
| WO | 2017119529 | 7/2017 |
| WO | 2021117941 | 6/2021 |
| WO | 2022035236 | 2/2022 |
| WO | 2022098146 | 5/2022 |
| WO | 2022108110 | 5/2022 |
| WO | 2022114836 | 6/2022 |
| WO | 2022119143 | 6/2022 |
| WO | 2022119339 | 6/2022 |

OTHER PUBLICATIONS

Davis, Daniel, "GB Search Report", GB Application No. GB2315584.9; Mailed Apr. 26, 2024.

Taylor, Sabrina, "GB Search Report", GB Application No. GB2315359.6; Mailed Apr. 11, 2024.

Taylor, Sabrina, "GB Search Report", GB Application No. GB2315356.2; Mailed Apr. 11, 2024.

Morris, Euros, "GB Search Report", GB Application No. 2315512.0; Mailed Apr. 2, 2024.

Taylor, Sabrina, "GB Search Report", GB Application No. 2315443.8; Mailed Apr. 2, 2024.

Taylor, Sabrina, "GB Search Report", GB Application No. 2315511.2; Mailed Mar. 28, 2024.

"PCT International Search Report", PCT/CN2023/099338; Filed Jun. 9, 2023; Mailed Feb. 21, 2024.

Camargo, Marly, "Non-Final Office Action", U.S. Appl. No. 18/116,065; Filed Mar. 1, 2023; Mailed Sep. 18, 2024.

Camargo, Marly S., "Notice of Allowance", U.S. Appl. No. 18/116,065; Filed Mar. 1, 2023; Mailed Dec. 13, 2024.

Perez, Angelica, "NonFinal Office Action", U.S. Appl. No. 18/222,304, filed Jul. 14, 2023; Mailed Jul. 30, 2025.

Diaby, Moustapha, "Non-Final Office Action", U.S. Appl. No. 18/090,280, filed Dec. 28, 2022; Mailed May 19, 2025.

Garcia, Santiago, "NonFinal Office Action", U.S. Appl. No. 18/114,663, filed Feb. 27, 2023; Mailed Jun. 13, 2025.

Neff, Michael R., "Non-Final OA", U.S. Appl. No. 18/090,285, filed Dec. 28, 2022; Mailed Jul. 7, 2025.

Sorowar, Golam, "NonFinal Office Action", U.S. Appl. No. 18/116,091, filed Mar. 1, 2023; Mailed Jun. 18, 2025.

Talukder, MD K, "NonFinal Office Action", U.S. Appl. No. 18/116,060, filed Mar. 1, 2023; Mailed May 8, 2025.

\* cited by examiner

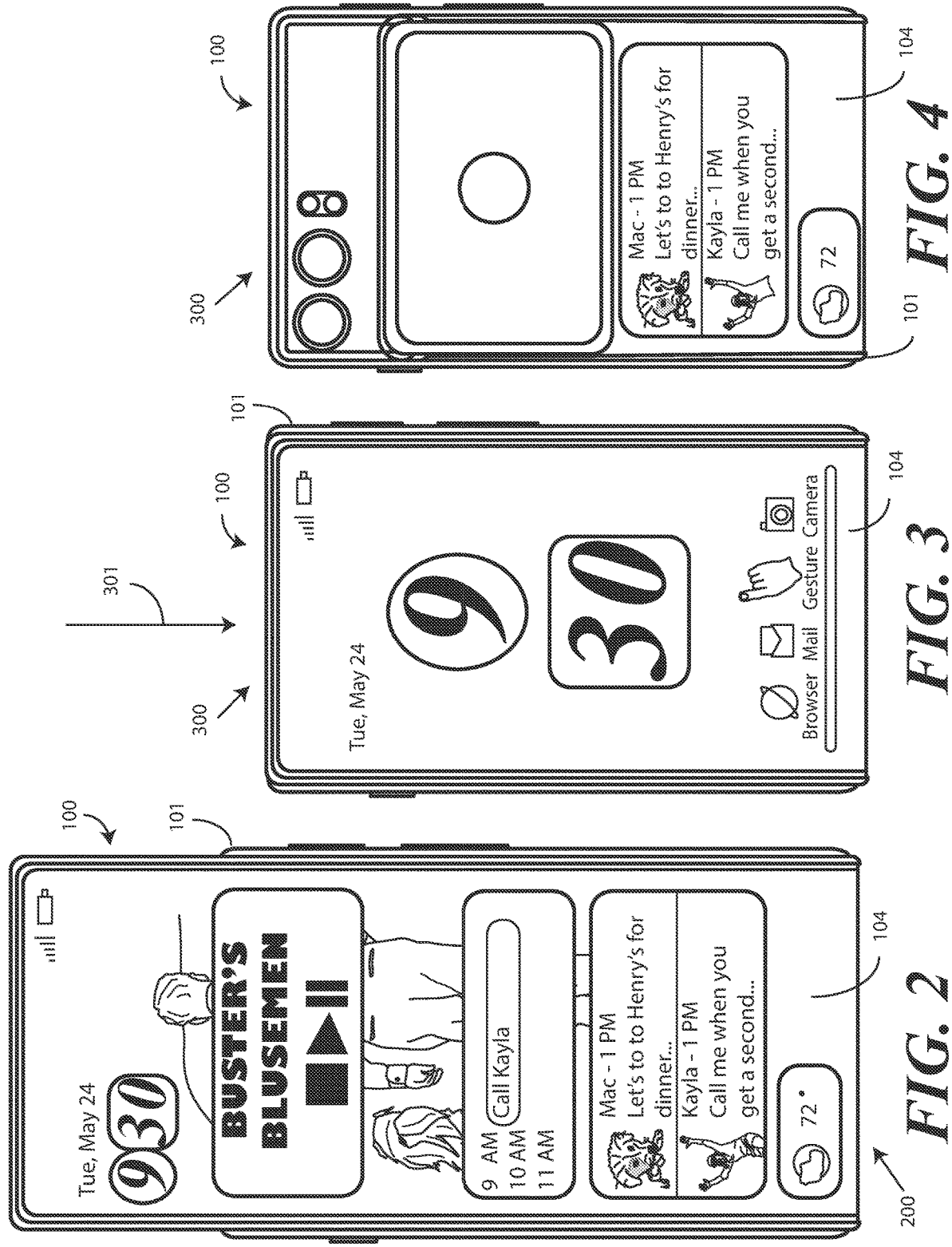

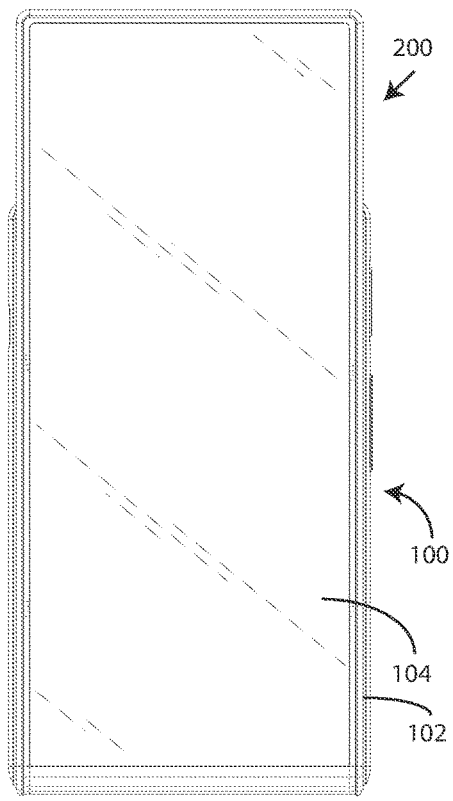 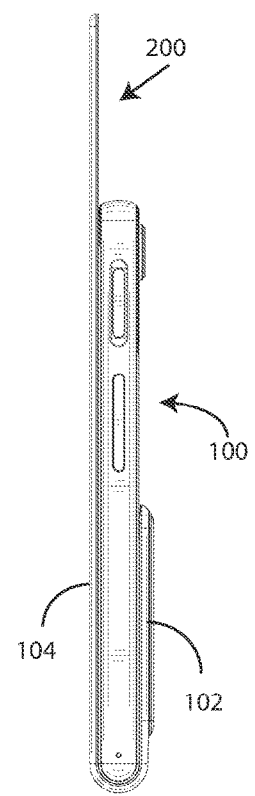 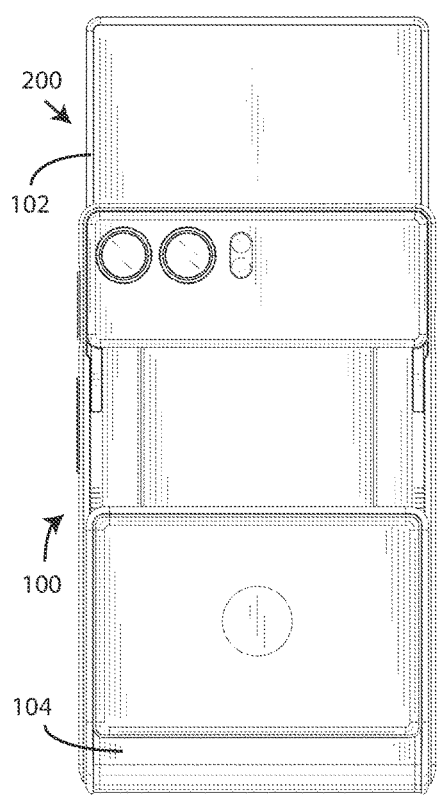
*FIG. 15*  *FIG. 16*  *FIG. 17*
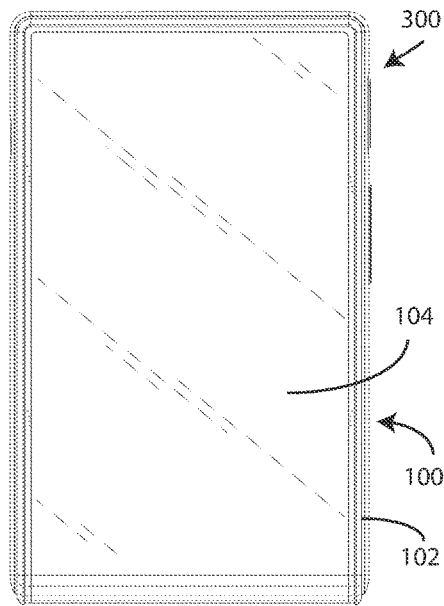 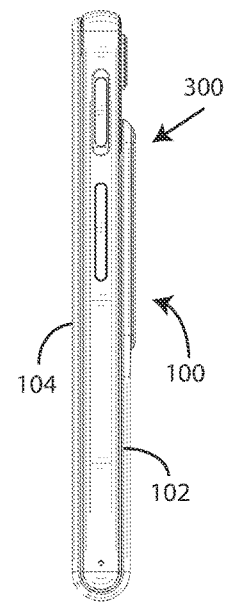 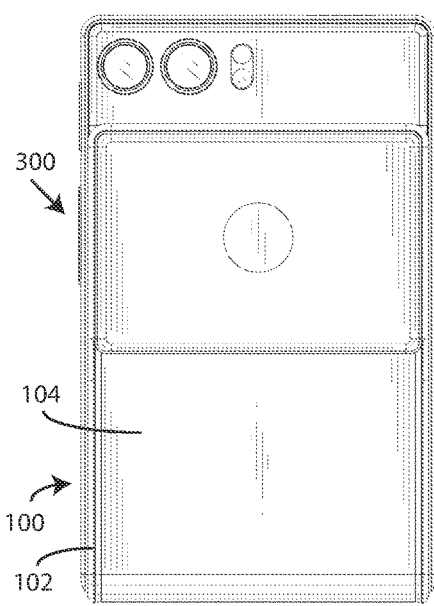
*FIG. 18*  *FIG. 19*  *FIG. 20*

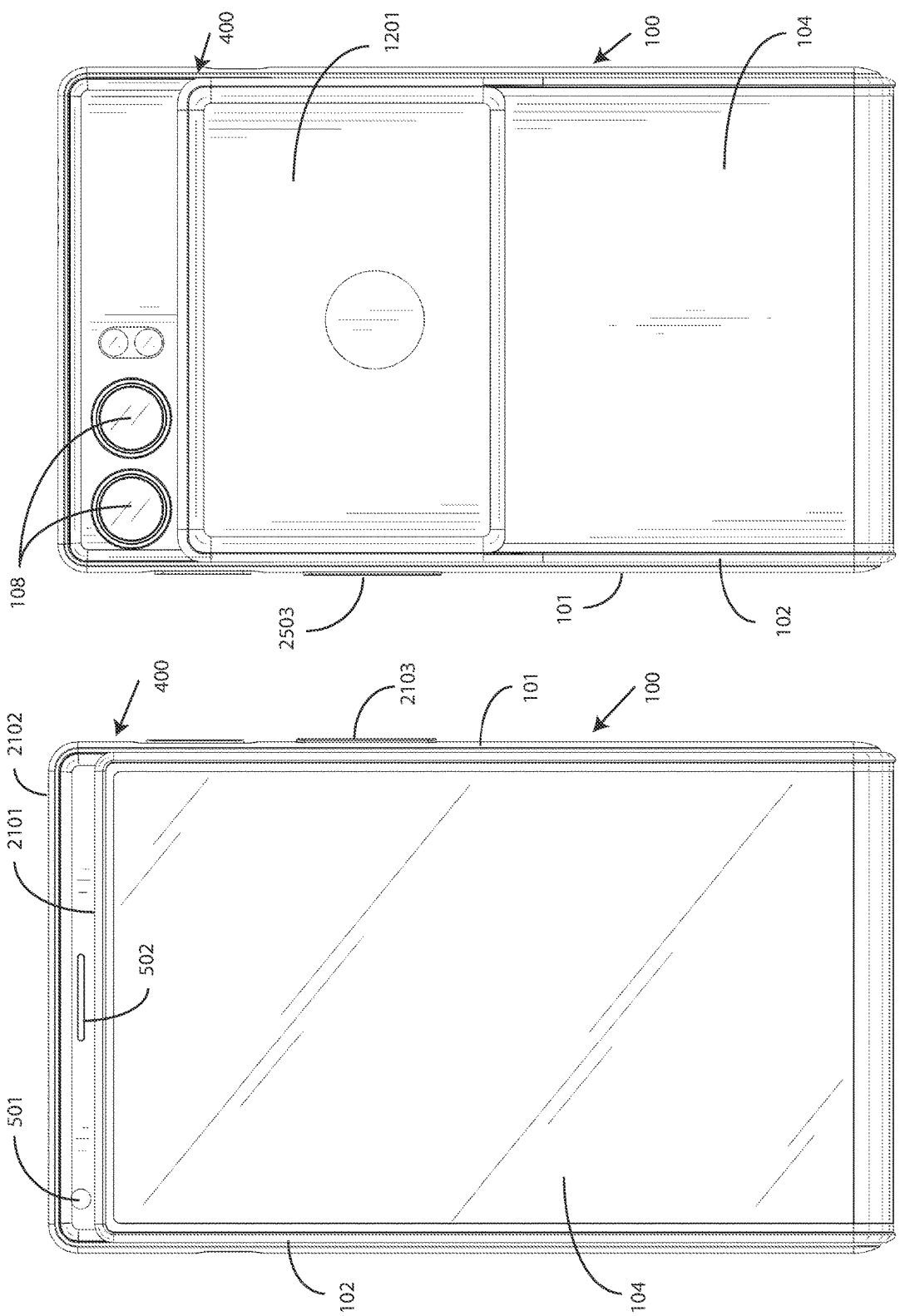

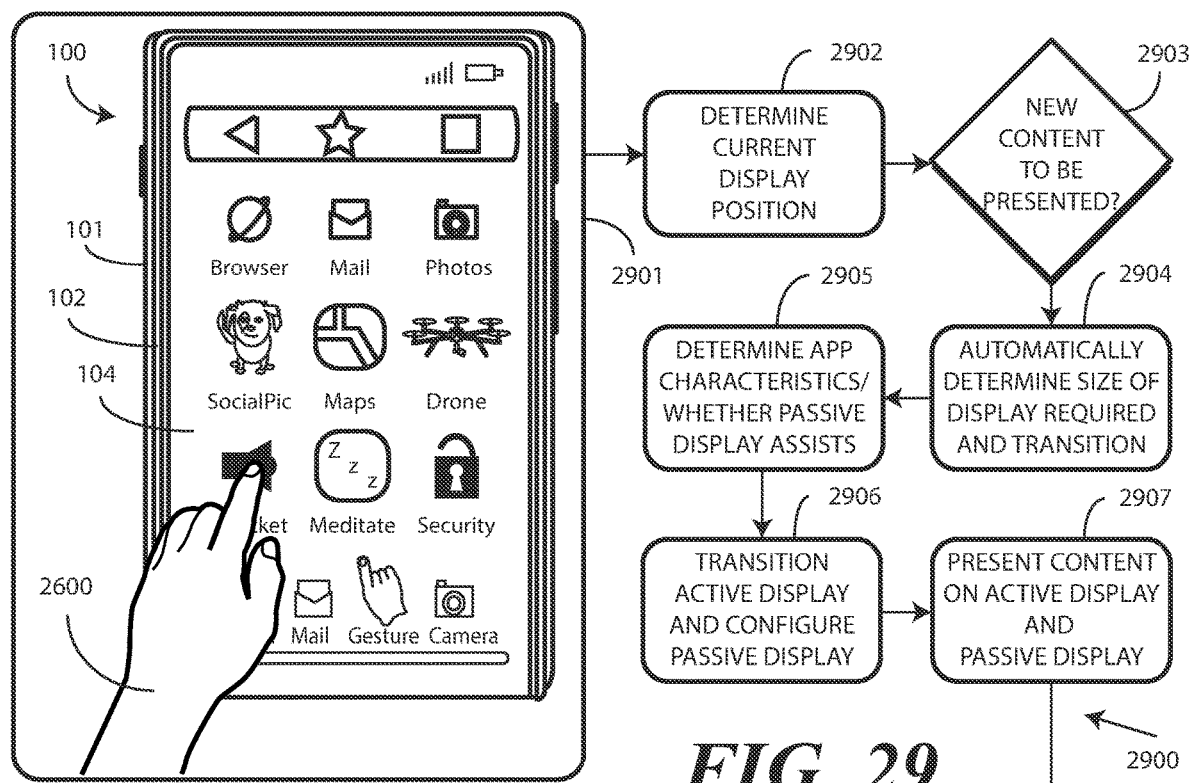
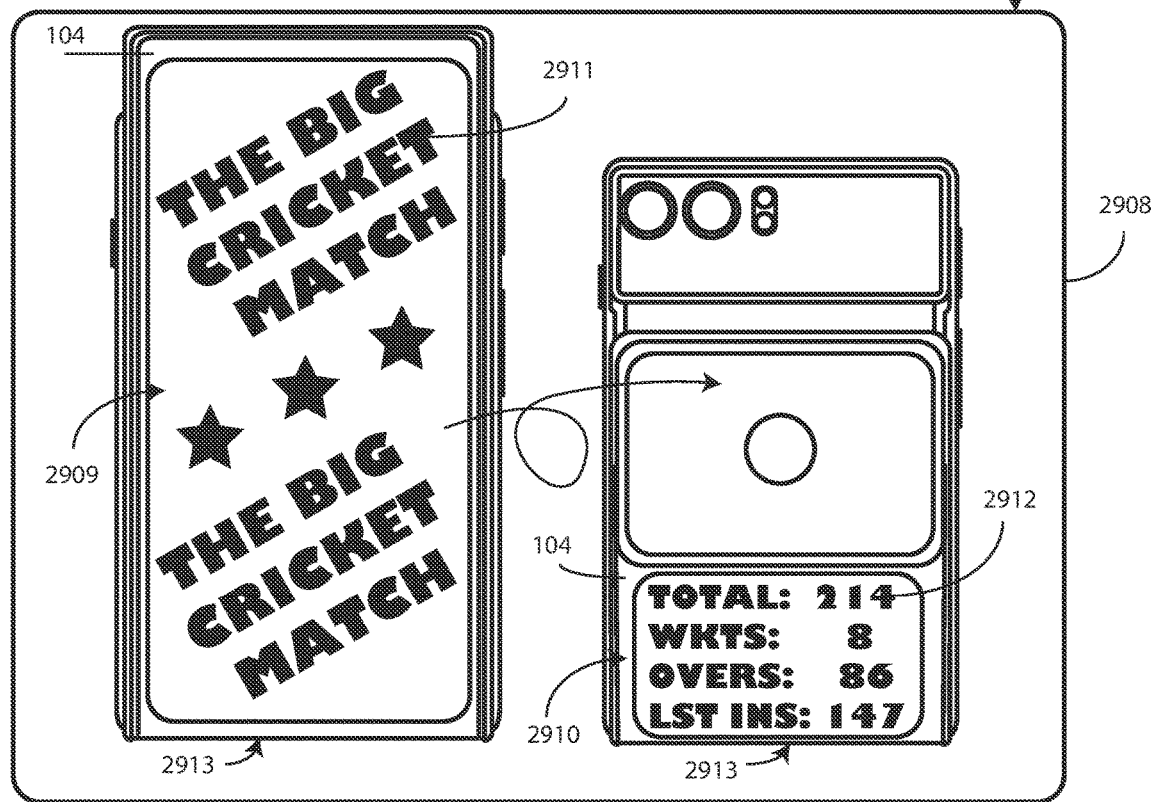
FIG. 29

ELECTRONIC DEVICES WITH TRANSLATING FLEXIBLE DISPLAYS AND CORRESPONDING METHODS FOR MANAGING DISPLAY POSITION AS A FUNCTION CONTENT PRESENTATION

CROSS REFERENCE TO PRIOR APPLICATIONS

This application claims priority and benefit under 35 U.S.C. § 119(e) from the following U.S. Provisional Applications, each of which incorporated by reference for all purposes: U.S. Ser. No. 63/416,927, filed Oct. 17, 2022, and U.S. Ser. No. 63/419,994, filed Oct. 27, 2022.

BACKGROUND

Technical Field

This disclosure relates generally to electronic devices, and more particularly to electronic devices having flexible displays.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device and corresponding methods that not only provide a compact geometric form factor but that also allow for the use of a larger display surface area as well.

BRIEF DESCRIPTION OF THE DRAWINGS

FIG. 2 illustrates one explanatory electronic device having a translating display moved to a first sliding position where portions of the translating display extend distally away from the device housing of the electronic device.

FIG. 3 illustrates the explanatory electronic device of FIG. 2 with the translating display moved to a second sliding position where the translating display wraps around, and abuts, the device housing of the electronic device.

FIG. 4 illustrates the electronic device of FIG. 3 from the rear.

FIG. 15 illustrates a front elevation view of one explanatory electronic device in accordance with one or more embodiments of the disclosure with the blade assembly in an extended position.

FIG. 16 illustrates a left side elevation view of one explanatory electronic device in accordance with one or more embodiments of the disclosure with the blade assembly in an extended position.

FIG. 17 illustrates a rear elevation view of one explanatory electronic device in accordance with one or more embodiments of the disclosure with the blade assembly in an extended position.

FIG. 18 illustrates a front elevation view of one explanatory electronic device in accordance with one or more embodiments of the disclosure with the blade assembly in a retracted position.

FIG. 19 illustrates a left elevation view of one explanatory electronic device in accordance with one or more embodiments of the disclosure with the blade assembly in a retracted position.

FIG. 20 illustrates a rear elevation view of one explanatory electronic device in accordance with one or more embodiments of the disclosure with the blade assembly in a retracted position.

FIG. 21 illustrates a front elevation view of one explanatory electronic device in accordance with one or more embodiments of the disclosure with the blade assembly in a peek position revealing a front facing image capture device.

FIG. 22 illustrates a rear elevation view of one explanatory electronic device in accordance with one or more embodiments of the disclosure with the blade assembly in a peek position revealing a front facing image capture device.

FIG. 29 illustrates still another explanatory method in accordance with one or more embodiments of the disclosure.

Figure 1:
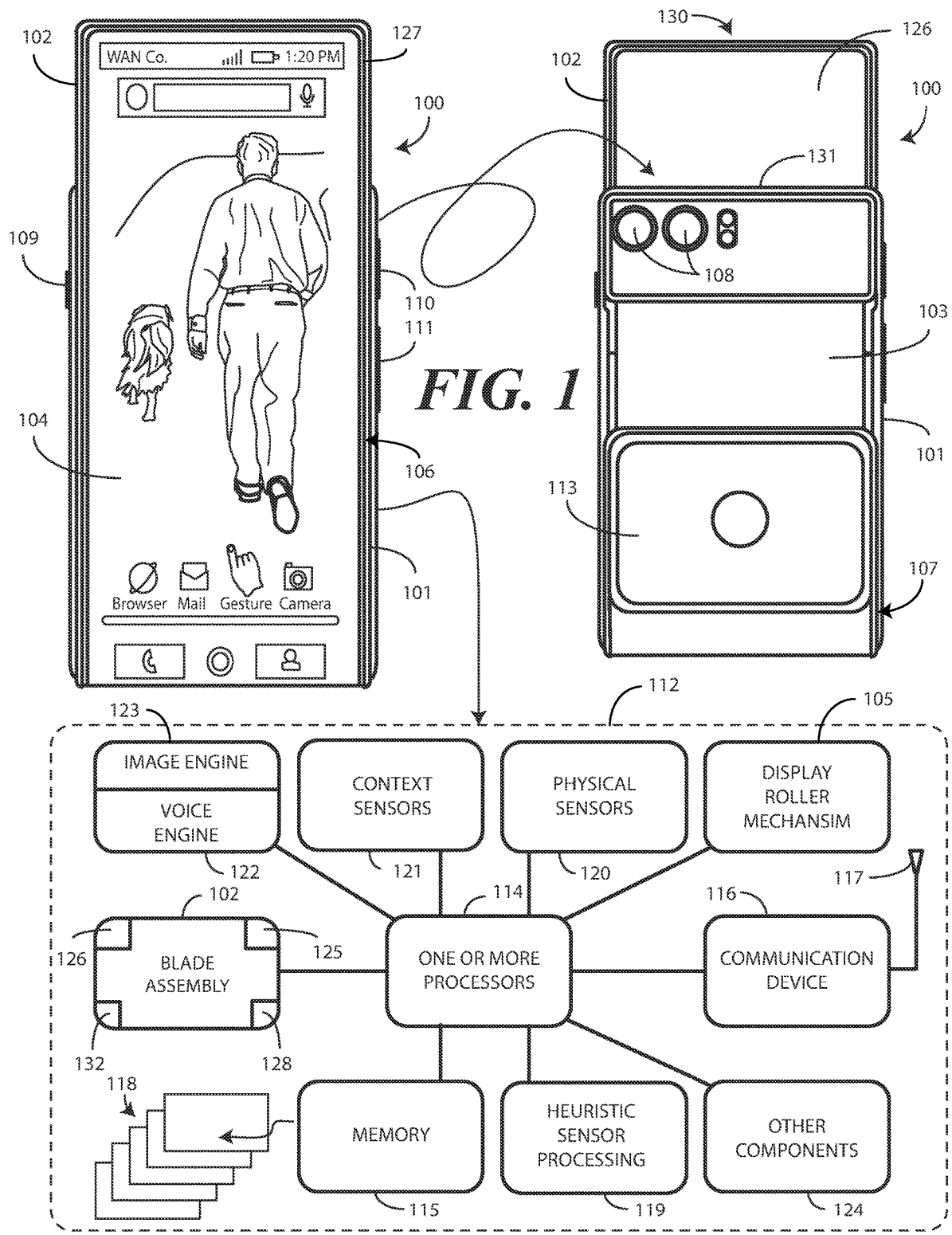
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to translating a flexible display between an extended position and a retracted position when content is to be newly presented on the flexible display, or alternatively when content being presented on the flexible display is consumed. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of generating methods and devices with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a single device housing. In one or more embodiments, a flexible display is then incorporated into a "blade" assembly that wraps around this single device housing. In one or more embodiments, the blade assembly does this by coupling to a translation mechanism attached to the single device housing.

The translation mechanism is operable to transition the blade assembly around the surfaces of the device housing between an extended position where a blade of the blade assembly extends distally from the device housing, a retracted position where the blade assembly abuts the device housing with the flexible display wrapping around the surfaces of the device housing, a "peek" position where movement of the translation mechanism causes the blade assembly to reveal an image capture device situated beneath the blade assembly on the front of the single device housing, and positions in between.

In one or more embodiments, translation of the blade assembly around the device housing toward the extended position occurs automatically when content is to be newly presented on the flexible display. In one or more embodiments, translation of the blade assembly around the device housing toward the retracted position occurs automatically when content actively being presented on the flexible display is consumed, deleted, or otherwise removed from the flexible display. In one or more embodiments, any translation of the flexible display to positions between the retracted position and the extended position occurs as a function of a content presentation size of the content to be newly presented on, or that was consumed, deleted, or removed from, the flexible display.

Illustrating by example, in one explanatory embodiment, the blade assembly slides around the single device housing such that the blade slides away from the single device housing to change an overall length of the flexible display appearing on the front of the electronic device when content is to be newly presented on the flexible display. In other embodiments, the blade assembly can slide in an opposite direction around the single device housing to a retracted position with similar amounts of the flexible display visible on the front side of the electronic device and the rear side of the electronic device when content is consumed, deleted, or otherwise removed from the front-facing portion of the flexible display. Accordingly, in one or more embodiments an electronic device includes a single device housing with a blade assembly coupled to two major surfaces of the single device housing and wrapping around at least one minor surface of the electronic device where the translation mechanism is positioned such that the blade assembly can slide around, and relative to, the single device housing between a retracted position and an extended position depending upon whether additional content needs to be presented on the flexible display or if less content needs to be presented on the flexible display.

In one or more embodiments, the flexible display is coupled to the blade assembly. In one or more embodiments, the flexible display is also surrounded by a silicone border that is co-molded onto a blade substrate and that protects the side edges of the flexible display. In one or more embodiments, the blade assembly engages at least one rotor of the translation mechanism that is situated at an end of the single device housing. When a translation mechanism situated in the single device housing drives elements coupled to the blade assembly, the flexible display wraps around the rotor and moves to extend the blade of the blade assembly further from, or back toward, the single device housing.

In one or more embodiments, one end of the flexible display is fixedly coupled to the blade assembly. Meanwhile, the other end of the flexible display is coupled to the tensioner via a flexible substrate that extends beyond the terminal edges of the flexible display. In one or more embodiments, this flexible substrate is a stainless-steel substrate, although other materials can be used.

Illustrating by example, in one or more embodiments the flexible substrate of the flexible display is longer along its major axis than is the flexible display in at least one dimension. Accordingly, at least a first end of the flexible substrate extends distally beyond at least one terminal end of the flexible display. This allows the first end of the flexible substrate to be rigidly coupled to a tensioner. In one or more embodiments, adhesive is used to couple one end of the flexible display to the blade assembly, while one or more fasteners are used to couple the second end of the flexible display to the tensioner, which is carried by the blade assembly.

In one or more embodiments, the translation mechanism comprises an actuator that causes a portion of the blade assembly abutting a first major surface of the single device housing and another portion of the blade assembly abutting a second major surface of the single device housing to slide symmetrically in opposite directions along the single device housing when the blade assembly transitions between the extended position, the retracted position, and the peek position.

Advantageously, embodiments of the disclosure provide an improved sliding mechanism for a flexible display integrated into a blade assembly in a sliding electronic device having a single device housing that eliminates crumpling and pillowing tendencies that may occur in the flexible display. In one or more embodiments, the tensioner is rigidly coupled between the blade assembly and the end of the flexible substrate supporting the flexible display. The tensioner can comprise one or more springs that apply a loading force biasing an end of the flexible substrate supporting the flexible display toward an end of the blade assembly. Moreover, the tensioner can be split into two tensioners to allow electronic circuit components and/or conductors powering and controlling the flexible display to be positioned therebetween. Thus, in one or more embodiments the tensioner can be configured as two tensioners each comprising one or more springs biasing a corner end of the flexible substrate supporting the flexible display away from the rotor. The tensioner also helps to avoid the pillowing effect by applying a loading force that eliminates slack from the flat portions of the flexible display defining the partial J-shape.

The actuator of the translation mechanism can take a variety of forms. In some embodiments, the actuator can comprise a dual-shaft motor. The dual shaft motor can be threaded to move translators of the translation mechanism in equal and opposite directions in one or more embodiments. In other embodiments, the dual-shaft motor can be coupled to at least one timing belt.

In one or more embodiments, the blade assembly is coupled to the translator of the translation mechanism. When the translator is actuated, a first portion of the blade assembly abutting a first major surface of the single device housing and a second portion of the blade assembly abutting a second major surface of the single device housing move symmetrically in opposite directions.

In another embodiment, the actuator comprises a first drive screw and a second drive screw. These drive screws can be coupled together by a gear assembly. When a first portion of the blade assembly is coupled to a translator positioned around the first drive screw, and a second portion of the blade assembly is coupled to another translator positioned around the second drive screw, actuation of either causes the first portion of the blade assembly abutting a first major surface of the single device housing and the second portion of the blade assembly abutting a second major surface of the single device housing to move symmetrically in opposite directions as the first drive screw and the second drive screw rotate.

In still other embodiments, the actuator comprises a first rack, a second rack, and a pinion. The first rack can be coupled to the first portion of the blade assembly while the second rack can be coupled to the second portion of the blade assembly. When the pinion engages both the first rack or the second rack, actuation of either causes the first portion of the blade assembly abutting a first major surface of the single device housing and the second portion of the blade assembly abutting a second major surface of the single device housing to move symmetrically in opposite directions as the first rack and second rack do the same. Other configurations of the actuator will be described below. Still others will be obvious to those of ordinary skill in the art having the benefit of this disclosure.

Advantageously, embodiments of the disclosure provide an improved sliding mechanism for a flexible display in an electronic device. Flexible display and rotor sliding assemblies configured in accordance with embodiments of the disclosure maintain a flat upper portion of a J-shape defined by a flexible display and/or blade assembly while preserving the operability and functionality of the flexible display during sliding operations.

Embodiments of the disclosure contemplate that in such an electronic device having a translating display, the user generally must manually select whether the display is transitioned to the extended position, the retracted position, or the peek position. Illustrating by example, the user might have to press a button once to cause the translating display to transition to the extended position and twice to cause the translating display to transition to the retracted position. A "long press" of the button may be required to cause the translating display to transition to the peek position, and so forth.

This manual actuation requires the user to take a manual action to change the state of the electronic device. Additionally, this requirement potentially delays the usability of the electronic device in the new state due to the time taken to manually "inject" the trigger causing transition of the translating display by pressing the button.

Advantageously, embodiments of the disclosure provide systems and methods that automatically and pre-emptively move the translating display to the optimal state based upon one an amount of content that needs to be presented on the flexible display, and in particular based upon a content presentation size associated with content that needs to be presented on the flexible display. Illustrating by example, in one or more embodiments one or more processors cause the translation mechanism to transition the blade assembly carrying the blade and flexible display between the retracted position and the extended position, and more particularly toward the extended position, when content is to be newly presented on the flexible display.

In one or more embodiments, this transitioning to the position between the extended position and the retracted position occurs as a function of a content presentation size of the content to be newly presented on the flexible display. In one or more embodiments, the content presentation size comprises a size of at least one presentation item identifying the content to be newly presented on the flexible display and another size of a buffer window situated around the presentation item.

The process can continue each time there is additional content to be presented on the flexible display. Illustrating by example, the process can again transition, by the translation mechanism, the blade assembly to another position between the retracted position and the extended position that is closer to the extended position when additional content is to be newly presented on the flexible display.

The process can further comprise continuing to transition, by the translation mechanism, the blade assembly toward the extended position as additional content is to be newly presented on the flexible display so long as the blade assembly has not reached the extended position. In one or more embodiments, when the extended position is reached, one or more processors of the electronic device can preclude the presentation of additional content on the flexible display. Accordingly, in one or more embodiments the one or more processors can determine whether the blade assembly is in the extended position when additional content is to be newly presented on the flexible display and, where the blade assembly is in the extended position when the additional content is to be newly presented on the flexible display, prelude presentation of the additional content. Optionally, the one or more processors may present a notification that additional content is awaiting consumption.

The process can function in reverse when content is consumed, deleted, or otherwise removed from the flexible display. Illustrating by example, in one or more embodiments the one or more processors can detect consumption of the content after the content is newly presented on the flexible display and, thereafter, transition the blade assembly toward the retracted position. As with the expansion of the front-facing portion of the flexible display, this retraction that reduces the area of the front-facing portion of the flexible display can occur as a function of a content presentation size of the content.

The content to be presented on, or alternatively removed upon consumption from, the flexible display can vary. Illustrating by example, in one or more embodiments when the electronic device is in a locked state, the content can comprise notification contents that, when presented on the flexible display, are presented after the flexible display transitions from a first position closer to the retracted position to a second position closer to the extended position. By contrast, when the electronic device is in an unlocked state, the content can comprise application output content, e.g., emails, text messages, chat messages, movies, television shows, browser windows, and so forth, with the operation being the same.

In one or more embodiments, the transitioning—be it toward the extended position to accommodate new content or toward the retracted position when content is removed— results in the flexible display defining a front-facing portion and a rear-facing portion separated from the front-facing portion by a curvilinear portion. In one or more embodiments, both the front-facing portion and the rear-facing portion can be used to present content, with the front-facing portion presenting content and the rear-facing portion presenting supplemental content corresponding to the content.

In other embodiments, the translation mechanism can transition the blade assembly carrying the blade and flexible display toward the extended position when split-screen content is to newly be presented on the flexible display. Illustrating by example, where the split-screen content comprises a first window presented by a first application on the one or more processors and a second window presented by a second application, the translation mechanism may transition the blade assembly between the retracted position and the extended position as a function of a content presentation size of the split-screen content to be newly presented on the display. In one or more embodiments, this content presentation size comprises the size of the first window, the second window, and optionally a buffer window situated around each of the first window and the second window, respectively.

In one or more embodiments, the split-screen content comprises multimedia content. Advantageously, the ability of the translation mechanism to automatically transition the blade assembly as a function of the size of the split-screen content allows the electronic device to enter a full-screen, immersive mode, especially when held or positioned in a landscape orientation. Examples of applications utilizing split-screen content for such full-screen, immersive modes of operation include gaming applications and video playback applications. Other such applications will be obvious to those of ordinary skill in the art having the benefit of this disclosure.

Translation of the translating display to the retracted position can occur in a similar fashion. In one or more embodiments, the one or more processors of the electronic device can automatically translate the translating display back to the retracted position when one or more windows of the split-screen content are closed by a user. Advantageously, embodiments of the disclosure provide intuitive operation of a translating display in an electronic device. In cases where automatic translation of the translating display is triggered, no user action is required for the translating display to change positions. Instead, the device automatically changes to the position potentially desired by the user. Other advantages will be described below. Still others will be obvious to those of ordinary skill in the art having the benefit of this disclosure.

In one or more embodiments, an electronic device comprises a device housing and a blade assembly carrying a blade and slidably coupled to the device housing. In one or more embodiments, the electronic device comprises a translation mechanism operable to slide the blade assembly relative to the device housing.

In one or more embodiments, the electronic device comprises one or more processors operable with the translation mechanism. In one or more embodiments, the one or more processors are operable to cause the translation mechanism to automatically slide the blade assembly between an extended position where the blade extends beyond an edge of the device housing and a retracted position where a major surface of the blade abuts a major surface of the device housing as a function of content, be it split-screen content or regular non-split-screen content, that is to newly be presented on, or that has been removed from, the flexible display.

Embodiments of the disclosure also contemplate that in electronic devices in general, many different sensors and actuators will be spread out across surfaces of the electronic device. Illustrating by example, some of the sensors and/or actuators that are normally placed on the top front of the device include a front facing camera, light sensor, proximity sensor, and/or earpiece speaker. Although these sensors are only used in specific scenarios, their permanent placement occupies valuable "real estate" along surfaces of the electronic device. Many times, these devices require an interruption in the display that looks like a "black cutout" in the display to a user.

This is equally true in an electronic device having a translating display configured in accordance with one or more embodiments of the disclosure. However, and advantageously, embodiments of the disclosure are able to mount such sensors and/or actuators beneath the blade assembly of the translating display. Also advantageously, these "under the blade" sensors and actuators are only exposed when the blade assembly and flexible display move to the peek position.

In one or more embodiments, this occurs only when the under the blade sensors and actuators need to be used. Again advantageously, this allows the user to always see an "end to end" display except when the blade assembly and flexible display transition to the peek position, which occurs when one or more processors determine that the use of some of the front facing sensors and/or actuators is necessary. When this happens, the one or more processors cause the translation mechanism to transition the blade assembly and flexible display of the translating display to the peek position.

In one or more embodiments, the one or more processors automatically move the translating display to the peek position to expose sensors, examples of which include front-facing sensors, an earpiece speaker, and a camera. In one or more embodiments, this automatic transition to the peek position occurs when the electronic device is engaged in a voice call, or a front-facing image capture device is required.

Additionally, in one or more embodiments the electronic device can be placed into a "privacy mode" that precludes the blade assembly and flexible display from entering the peek position. By placing the front-facing imager beneath the blade assembly, a user is advantageously able to physically disable the front-facing imager by setting a user mode of operation precluding the translating display from moving to the peek position. A user may wish to do this out of privacy concerns. In one or more embodiments, when the user enables this mode of operation, the peek position is precluded, thereby physically blocking the camera sensor from the external world.

Advantageously, the ability to translate the flexible display and blade assembly to the peek position provides a novel way of solving real estate problems associated with placing front-facing sensors on an electronic device. In addition to enhancing privacy when the peek position is prohibited, the ability to transition into the peek position provides the ability to have a nearly one hundred percent bezel-less display which is unique and provides a truly distinctive "wow" factor. Other advantages will be described below. Still others will be obvious to those of ordinary skill in the art having the benefit of this disclosure.

Embodiments of the disclosure contemplate that when an electronic device is equipped with a translating display, the position of the translating display relative to the device housing will change the amount of the translating display that is visible from the front, visible from the rear, and visible in the curved end portions. Said differently, the viewable size of the translating display from each side of the electronic device will vary as a function of the position of the translating display on the device housing. Advantageously, embodiments of the disclosure provide applications, methods, and systems that dynamically resize and adjust the amount of area on the front-facing portion as a function of content, both split-screen content and regular content, that is presented on, or removed from, the front-facing portion of the flexible display.

This can be accomplished by causing a translation mechanism to translate a blade assembly carrying a flexible display to a position between the extended position and the retracted position as a function of the content to increase, or decrease, the amount of area available along the front-facing portion of the flexible display. Applications can then be windowed on this primary area of the translating display, which will resize as the translating display transitions between the extended position, retracted position, and peek position as a function of the content presented thereon.

When such translation occurs to adjust the size of the front-facing portion of the flexible display, embodiments of the disclosure can further repurpose other content as a function of the translation of the translating display. To wit, in one or more embodiments the translating display is segmented into three, individual, usable parts. These include the front-facing portion of the translating display, the rear-facing portion of the translating display, and the curvilinear portion of the translating display wrapping around the rotor, which is sometimes revered to as the "roll edge" portion of the display. (These portions are also sometimes referred to as "display root1," "display root2," and "display root3," respectively.)

In one or more embodiments, each of these usable parts are dynamically remapped as the translating display position changes relative to the device housing. In one or more embodiments, applications can request one or more windows on the usable portion upon which it intends to present content. In one or more embodiments, the orientation of the rear-facing portion and the roll edge portion is not the same as that of the front-facing portion when the translating display translates along the device housing from the extended position to the retracted position or peek position. To address this, in one or more embodiments content presented on the rear-facing portion is rotated by 180 degrees so that its "up" side is the same as the "up" side on the front-facing portion.

In one or more embodiments, the orientation of content presented on the roll edge portion can change based upon the orientation of the electronic device. If, for example, the front-facing side is up the orientation of content presented on the roll edge will have a first orientation. By contrast, if the rear-facing side is up, the orientation of that same content presented on the roll edge will have a second orientation that is rotated 180 degrees relative to the first orientation.

In one or more embodiments, any content presented on the front-facing portion of the translating display is oriented in accordance with user preferences. In one or more embodiments, this front-facing portion is oriented in accordance with the orientation of the electronic device in three-dimensional space.

On the roll edge portion of the translating display, in one or more embodiments this segment is oriented in the same orientation as the front-facing portion when the electronic device is not oriented with the front-facing side facing the negative z-direction in three-dimensional space (it is rotated by 180 degrees when this is the case). In one or more embodiments, the roll edge portion does not obey user preferences for display orientation and auto rotate/device orientation.

In one or more embodiments, content presented on the rear-facing portion of the translating display is always rotated by 180 degrees relative to content presented on the front-facing portion when the electronic device is being held vertically. In one or more embodiments, the rear-facing portion does not obey user preferences for display orientation and auto-rotate/device orientation.

Accordingly, in one or more embodiments one or more processors of an electronic device dynamically remap multiple translating display root segments based upon the position of the translating display relative to the device housing. The one or more processors can independently manage orientation and rotation on each of the display root segments, be they the front-facing portion, the rear-facing portion, or the roll edge portion. In one or more embodiments, this management occurs independently based upon which side of the electronic device the segment is currently positioned upon, combined with sensor inputs to identify if the electronic device is face down or face up.

In still other embodiments such as those were split-screen content comprises picture-in-a-picture content, a change in aspect ratio can be made. As noted above, when an electronic device is equipped with a translating display, the position of the translating display relative to the device housing will change the amount of the translating display that is visible from the front, visible from the rear, and visible in the curved end portions. This translation of the translating display can also change the ability to present content in a particular aspect ratio. Whereas electronic devices with non-moving displays have a fixed aspect ratio, electronic devices with a translating display have available display space that changes as the translating display moves around the device housing.

With electronic devices having displays with fixed aspect ratios, applications operating on such displays try to adapt to whatever that fixed aspect ratio might be. They might crop, scale, or stretch content, for example. However, most of the time this is a compromise as the application generally is designed with an optimal aspect ratio for the best user experience. Scaling, filling, and stretching can result in multiple usability issues. These include black and white borders on the edges of the display, gaming or application controls not placed in optimal positions, or, worse, the graphics being skewed to adjust the display size. Working around these problems using cropping, scaling, or stretching generally results in either a loss in image quality or a loss of portions of the image.

Advantageously, in one or more embodiments one or more processors of the electronic device have knowledge of the position of the translating display relative to the device housing. This is true even when presenting multiple windows from different applications or split-screen content. In one or more embodiments, the one or more processors can then adjust the display size to accommodate a wide range of aspect ratios suitable for presentation on a portion of the translating display in a particular position. Advantageously, this ability to accommodate multiple aspect ratios on a single translating display by changing the position of the translating display relative to the device housing completely avoids the black bars and cropping and stretching problems plaguing the prior art. Applications operating on the one or more processors can identify their optimal aspect ratio with the one or more processors causing the translation mechanism to move the translating display to the proper position to accommodate that ideal aspect ratio. Advantageously, this allows content to be presented in accordance with the optimal user experience for a given application's design.

Accordingly, in one or more embodiments one or more processors facilitate an automatic optimal display size adjustment based upon an aspect ratio of video in playback. The one or more processors can adjust the translating display to optimize display size based upon optimal aspect ratios indicated by the application operating in the foreground.

Embodiments of the disclosure also allow for applications to request windows having certain aspect ratios. Illustrating by example, in one or more embodiments the application operating in the foreground submits an optimal list of aspect ratios that provide the best performance. For all of these "ideal" aspect ratios, the one or more processors calculate the corresponding display sizes. In one or more embodiments, the one or more processors then cause the translation mechanism to move the translating display to the largest optimal size within the possible display size ranges.

Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a single device housing 101. In one or more embodiments, a blade assembly 102 carrying a flexible display 104 wraps around the single device housing 101. As will be described in more detail below, in one or more embodiments the blade assembly 102 is configured to "slide" along the first major surface (covered by the flexible display in the front view of the electronic device 100 on the left side of FIG. 1) of the single device housing 101 and second major surface 103 situated on the rear side of the single device housing 101.

In one or more embodiments the single device housing 101 is manufactured from a rigid material such as a rigid thermoplastic, metal, or composite material, although other materials can be used. Illustrating by example, in one illustrative embodiment the single device housing 101 is manufactured from aluminum. Still other constructs will be obvious to those of ordinary skill in the art having the benefit of this disclosure.

In the illustrative embodiment of FIG. 1, the blade assembly 102 carries the flexible display 104. The flexible display 104 can optionally be touch-sensitive. Users can deliver user input to the flexible display 104 of such an embodiment by delivering touch input from a finger, stylus, or other objects disposed proximately with the flexible display 104.

In one embodiment, the flexible display 104 is configured as an organic light emitting diode (OLED) display fabricated on a flexible plastic substrate. The blade assembly 102 is fabricated on a flexible substrate as well. This allows the blade assembly 102 and flexible display 104 to deform around a display roller mechanism 105 when a first portion 106 of the blade assembly 102 abutting a first major surface of the single device housing 101 and a second portion 107 of the blade assembly 102 abutting a second major surface 103 of the single device housing 101 move symmetrically in opposite directions around the single device housing 101. In one or more embodiments, the blade assembly 102 and flexible display 104 are both constructed on flexible metal substrates can allow each to bend with various bending radii around the display roller mechanism 105.

In one or more embodiments the flexible display 104 may be formed from multiple layers of flexible material such as flexible sheets of polymer or other materials. In this illustrative embodiment, the flexible display 104 is fixedly coupled to the blade assembly 102, which wraps around the display roller mechanism 105.

Features can be incorporated into the single device housing 101. Examples of such features include one or more cameras or image capture devices 108 or an optional speaker port. In this illustrative embodiment, user interface components 109,110,111, which may be buttons, fingerprint sensors, or touch sensitive surfaces, can also be disposed along the surfaces of the single device housing 101. Any of these features are shown being disposed on the side surfaces of the electronic device 100 could be located elsewhere. In other embodiments, these features may be omitted.

A block diagram schematic 112 of the electronic device 100 is also shown in FIG. 1. The block diagram schematic 112 includes one or more electronic components that can be coupled to a printed circuit board assembly disposed within the single device housing 101. Alternatively, the electronic components may be carried by the blade assembly 102. Illustrating by example, in one or more embodiments electronic components can be positioned beneath a "backpack" 113 carried by the blade assembly 102.

The components of the block diagram schematic 112 can be electrically coupled together by conductors or a bus disposed along one or more printed circuit boards. For example, some components of the block diagram schematic 112 can be configured as a first electronic circuit fixedly situated within the single device housing 101, while other components of the block diagram schematic 112 can be configured as a second electronic circuit carried by the blade assembly 102 in the backpack 113. A flexible substrate can then extend from the first electronic circuit in the single device housing 101 to the second electronic circuit carried by the blade assembly 102 in the backpack 113 to electrically couple the first electronic circuit to the second electronic circuit.

The illustrative block diagram schematic 112 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one or more embodiments, the electronic device 100 includes one or more processors 114. In one embodiment, the one or more processors 114 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 115, can optionally store the executable software code used by the one or more processors 114 during operation.

In one embodiment, the one or more processors 114 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In this illustrative embodiment, the electronic device 100 also includes a communication device 116 that can be configured for wired or wireless communication with one or more other devices or networks. The networks can include a wide area network, a local area network, and/or personal area network. The communication device 116 may also utilize wireless technology for communication, such as, but are not limited to, peer-to-peer or ad hoc communications such as HomeRF, Bluetooth and IEEE 802.11, and other forms of wireless communication such as infrared technology. The communication device 116 can include wireless communication circuitry, one of a receiver, a transmitter, or transceiver, and one or more antennas 117.

In one embodiment, the one or more processors 114 can be responsible for performing the primary functions of the electronic device 100. For example, in one embodiment the one or more processors 114 comprise one or more circuits operable with one or more user interface devices, which can include the flexible display 104, to present, images, video, split-screen content, or other presentation information to a user. The executable software code used by the one or more processors 114 can be configured as one or more modules 118 that are operable with the one or more processors 114. Such modules 118 can store instructions, control algorithms, logic steps, and so forth.

In one embodiment, the one or more processors 114 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 114 may generate commands or execute control operations based on information received from the various sensors of the electronic device 100. As shown in FIG. 1, these sensors can be categorized into physical sensors 120 and context sensors 121.

Generally speaking, physical sensors 120 include sensors configured to sense or determine physical parameters indicative of conditions in an environment about the electronic device 100. Illustrating by example, the physical sensors 120 can include devices for determining information such as motion, acceleration, orientation, proximity to people and other objects, lighting, capturing images, and so forth. The physical sensors 120 can include various combinations of microphones, location detectors, temperature sensors, barometers, proximity sensor components, proximity detector components, wellness sensors, touch sensors, cameras, audio capture devices, and so forth. Many examples of physical sensors 120 will be described below with reference to FIG. 6. Others will be obvious to those of ordinary skill in the art having the benefit of this disclosure.

By contrast, the context sensors 121 do not measure physical conditions or parameters. Instead, they infer context from data of the electronic device. Illustrating by example, when a physical sensor 120 includes a camera or intelligent imager, the context sensors 121 can use data captured in images to infer contextual cues. An emotional detector may be operable to analyze data from a captured image to determine an emotional state. The emotional detector may identify facial gestures such as a smile or raised eyebrow to infer a person's silently communicated emotional state, e.g., joy, anger, frustration, and so forth. Other context sensors 121 may analyze other data to infer context, including calendar events, user profiles, device operating states, energy storage within a battery, application data, data from third parties such as web services and social media servers, alarms, time of day, behaviors a user repeats, and other factors.

The context sensors 121 can be configured as either hardware components, or alternatively as combinations of hardware components and software components. The context sensors 121 can be configured to collect and analyze non-physical parametric data.

Figure 6:
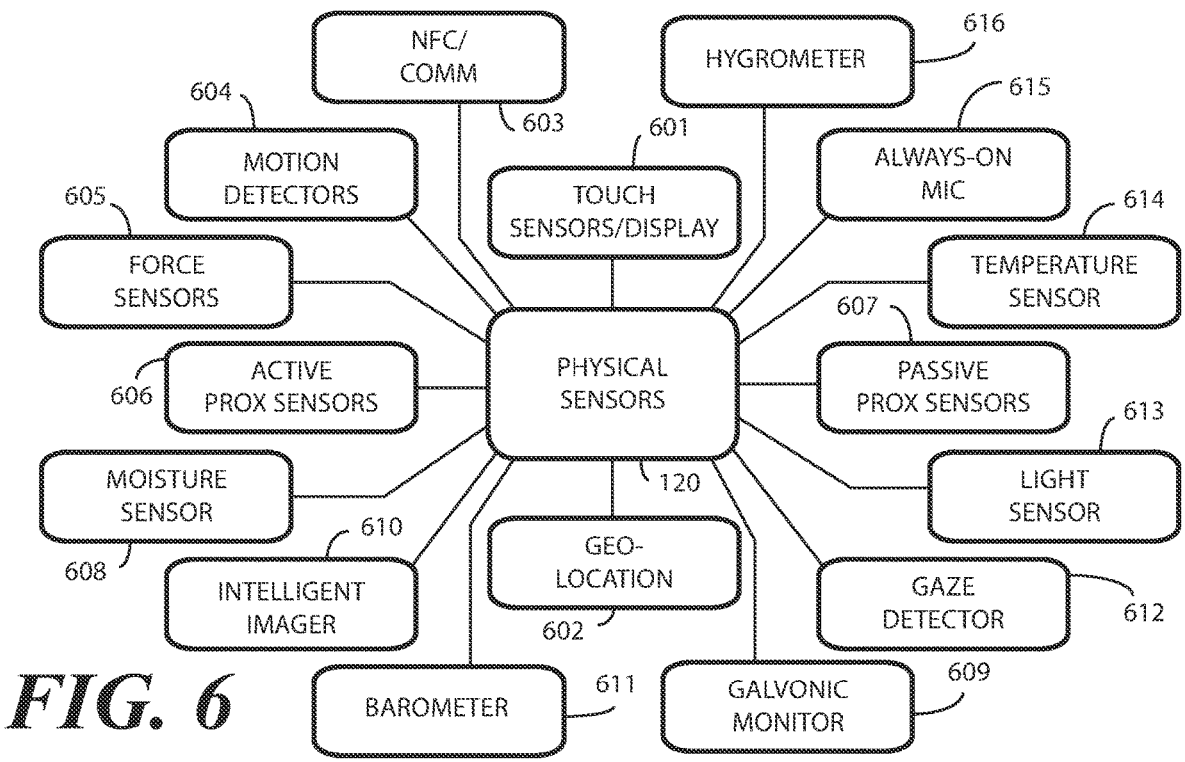
FIG. 6 illustrates one or more explanatory physical sensors suitable for use, alone or in combination, in an electronic device in accordance with one or more embodiments of the disclosure.
Figure 7:
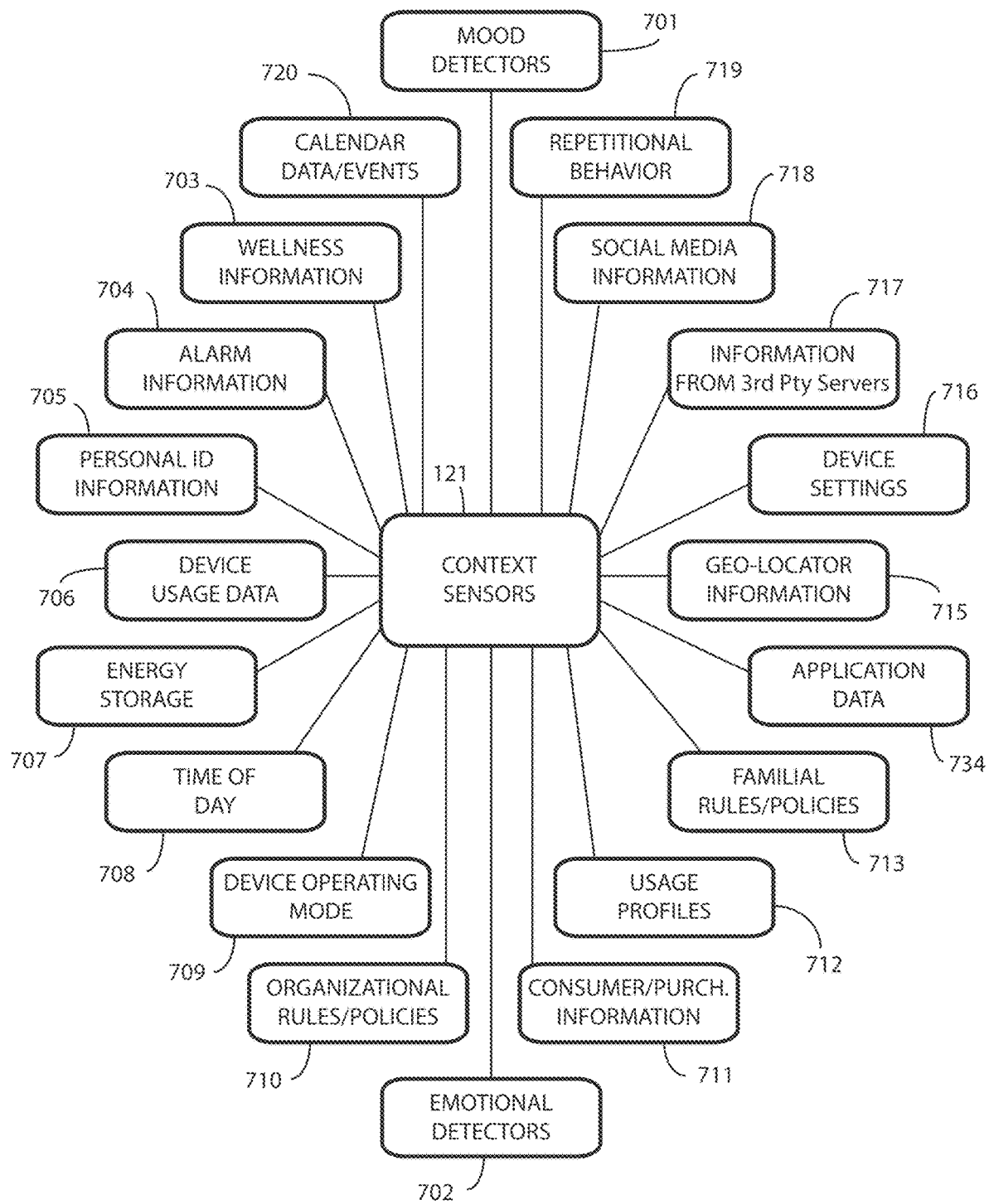
FIG. 7 illustrates one or more explanatory context sensors suitable for use, alone or in combination, in an electronic device in accordance with one or more embodiments of the disclosure.

Examples of the physical sensors 120 and the context sensors 121 are shown in FIGS. 6 and 7. These examples are illustrative only, as other physical sensors 120 and context sensors 121 will be obvious to those of ordinary skill in the art having the benefit of this disclosure.

Turning briefly to FIG. 6, illustrated therein are various examples of the physical sensors 120. In one or more embodiments, the physical sensors 120 sense or determine physical parameters indicative of conditions in an environment about an electronic device. FIG. 6 illustrates several examples physical sensors 120. It should be noted that those shown in FIG. 6 are not comprehensive, as others will be obvious to those of ordinary skill in the art having the benefit of this disclosure. Additionally, it should be noted that the various physical sensors 120 shown in FIG. 6 could be used alone or in combination. Accordingly, many electronic devices will employ only subsets of the physical sensors 120 shown in FIG. 6, with the particular subset chosen being defined by device application.

A first example of a physical sensor is a touch sensor 601. The touch sensor 601 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (114), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 120 is a geo-locator that serves as a location detector 602. In one embodiment, location detector 602 is operable to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, and other similar satellite positioning systems. The location detector 602 can make location determinations autonomously or with assistance from terrestrial base stations, for example those associated with a cellular communication network or other ground-based network, or as part of a Differential Global Positioning System (DGPS), as is well known by those having ordinary skill in the art. The location detector 602 may also be able to determine location by locating or triangulating terrestrial base stations of a traditional cellular network, or from other local area networks, such as Wi-Fi networks.

Another physical sensor 120 is a near field communication circuit 603. The near field communication circuit 603 can be included for communication with local area networks to receive information regarding the context of the environment in which an electronic device is located. Illustrating by example, the near field communication circuit 603 may obtain information such as weather information and location information. If, for example, a user is at a museum, they may be standing near an exhibit that can be identified with near field communication. This identification can indicate that the electronic device is both indoors and at a museum. Accordingly, if the user requests additional information about an artist or a painting, there is a higher probability that the question is a device command asking the one or more processors (114) to search for than information with a web browser. Alternatively, the near field communication circuit 603 can be used to receive contextual information from kiosks and other electronic devices. The near field communication circuit 603 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 120 is the motion detector 604. Illustrating by example, an accelerometer, gyroscopes, or other device can be used as a motion detector 604 in an electronic device. Using an accelerometer as an example, an accelerometer can be included to detect motion of the electronic device. Additionally, the accelerometer can be used to sense some of the gestures of the user, such as one talking with their hands, running, or walking.

The motion detector 604 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor 120 is a force sensor 605. The force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device rather than the display.

Another example of physical sensors 120 includes proximity sensors. The proximity sensors fall in to one of two camps: active proximity sensors and "passive" proximity sensors. These are shown as proximity detector components 606 and proximity sensor components 607 in FIG. 6. Either the proximity detector components 606 or the proximity sensor components 607 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components 607 comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 607 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 607 are sometimes referred to as a "passive IR system" due to the fact that the person is the active transmitter. Accordingly, the proximity sensor component 607 requires no transmitter since objects disposed external to the housing deliver emissions that are received by the infrared receiver. As no transmitter is required, each proximity sensor component 607 can operate at a very low power level.

In one embodiment, the signal receiver of each proximity sensor component 607 can operate at various sensitivity levels so as to cause the at least one proximity sensor component 607 to be operable to receive the infrared emissions from different distances. For example, the one or more processors (114) can cause each proximity sensor component 607 to operate at a first "effective" sensitivity so as to receive infrared emissions from a first distance. Similarly, the one or more processors (114) can cause each proximity sensor component 607 to operate at a second sensitivity, which is less than the first sensitivity, so as to receive infrared emissions from a second distance, which is less than the first distance. The sensitivity change can be made by causing the one or more processors (114) to interpret readings from the proximity sensor component 607 differently.

By contrast, proximity detector components 606 include a signal emitter and a corresponding signal receiver. While each proximity detector component 606 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 606 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 606 can be an infrared proximity sensor set that uses a signal emitter that transmits a beam of infrared light that reflects from a nearby object and is received by a corresponding signal receiver. Proximity detector components 606 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 608. A moisture detector 608 can be configured to detect the amount of moisture on or about the display or the housing of the electronic device. This can indicate various forms of context. Sometimes, it can indicate rain or drizzle in the environment about the electronic device. Accordingly, if a user is frantically asking "Call a cab!" the fact that moisture is present may increase the likelihood that this ask is a device command. The moisture detector 608 can be realized in the form of an impedance sensor that measures impedance between electrodes. As moisture can be due to external conditions, e.g., rain, or user conditions, perspiration, the moisture detector 608 can function in tandem with ISFETS configured to measure pH or amounts of NaOH in the moisture or a galvanic sensor 609 to determine not only the amount of moisture, but whether the moisture is due to external factors, perspiration, or combinations thereof.

An intelligent imager 610 can be configured to capture an image of an object and determine whether the object matches predetermined criteria. For example, the intelligent imager 610 operate as an identification module configured with optical recognition such as include image recognition, character recognition, visual recognition, facial recognition, color recognition, shape recognition and the like. Advantageously, the intelligent imager 610 can be used as a facial recognition device to determine the identity of one or more persons detected about an electronic device.

For example, in one embodiment when the one or more proximity sensor components 607 detect a person, the intelligent imager 610 can capture a photograph of that person. The intelligent imager 610 can then compare the image to a reference file stored in memory (115), to confirm beyond a threshold authenticity probability that the person's face sufficiently matches the reference file. Beneficially, optical recognition allows the one or more processors (114) to execute control operations only when one of the persons detected about the electronic device are sufficiently identified as the owner of the electronic device.

In addition to capturing photographs, the intelligent imager 610 can function in other ways as well. For example, in some embodiments the intelligent imager 610 can capture multiple successive pictures to capture more information that can be used to determine social cues. Alternatively, the intelligent imager 610 can capture or video frames, with or without accompanying metadata such as motion vectors. This additional information captured by the intelligent imager 610 can be used to detect richer social cues that may be inferred from the captured data.

A barometer 611 can sense changes in air pressure due to environmental and/or weather changes. In one embodiment, the barometer 611 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 612 can comprise sensors for detecting the user's gaze point. The gaze detector 612 can optionally include sensors for detecting the alignment of a user's head in three-dimensional space. Electronic signals can then be delivered from the sensors to the gaze detection processing for computing the direction of user's gaze in three-dimensional space. The gaze detector 612 can further be configured to detect a gaze cone corresponding to the detected gaze direction, which is a field of view within which the user may easily see without diverting their eyes or head from the detected gaze direction. The gaze detector 612 can be configured to alternately estimate gaze direction by inputting to the gaze detection processing images representing a photograph of a selected area near or around the eyes. It will be clear to those of ordinary skill in the art having the benefit of this disclosure that these techniques are explanatory only, as other modes of detecting gaze direction can be substituted in the gaze detector 612 of FIG. 6.

A light sensor 613 can detect changes in optical intensity, color, light, or shadow in the environment of an electronic device. This can be used to make inferences about context such as weather or other cues. For example, if the light sensor 613 detects low-light conditions in the middle of the day when the location detector 602 indicates that the electronic device is outside, this can be due to cloudy conditions, fog, or haze. An infrared sensor can be used in conjunction with, or in place of, the light sensor 613. The infrared sensor can be configured to detect thermal emissions from an environment about an electronic device. Where, for example, the infrared sensor detects heat on a warm day, but the light sensor detects low-light conditions, this can indicate that the electronic device is in a room where the air conditioning is not properly set. Similarly, a temperature sensor 614 can be configured to monitor temperature about an electronic device.

The physical sensors 120 can also include an audio capture device 615. In one embodiment, the audio capture device 615 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (114) can then select between the first microphone and the second microphone to beam steer audio reception toward the user. Alternatively, the one or more processors (114) can process and combine the signals from two or more microphones to perform beam steering.

In one embodiment, the audio capture device 615 comprises an "always ON" audio capture device. As such, the audio capture device 615 is able to capture audio input at any time that an electronic device is operational. As noted above, in one or more embodiments, the one or more processors, which can include a digital signal processor, can identify whether one or more device commands are present in the audio input captured by the audio capture device 615.

One further example of the physical sensors 120 is a hygrometer 616. The hygrometer 616 can be used to detect humidity, which can indicate that a user is outdoors or is perspiring. As noted above, the illustrative physical sensors of FIG. 6 are not comprehensive. Numerous others could be added. For example, a wind-speed monitor could be included to detect wind. Accordingly, the physical sensors 120 of FIG. 6 are illustrative only, as numerous others will be obvious to those of ordinary skill in the art having the benefit of this disclosure.

Turning briefly now to FIG. 7, illustrated therein are various examples of context sensors 121. As with FIG. 6, the examples shown in FIG. 7 do not constitute a comprehensive list. Numerous other context sensors 121 will be obvious to those of ordinary skill in the art having the benefit of this disclosure.

In one embodiment, a mood detector 701 can infer a person's mood based upon contextual information received from the physical sensors (120). For example, if the intelligent imager (501) captures a picture, multiple successive pictures, video, or other information from which a person can be identified as the owner of the electronic device, and she is crying in the picture, multiple successive pictures, video, or other information, the mood detector 701 can infer that she is either happy or sad. Similarly, if the audio capture device captures a user's voice and the user is yelling or cursing, the mood detector 701 can infer that the user is likely angry or upset.

The emotional detector 702 can function in a similar manner to infer a person's emotional state from contextual information received from the physical sensors (120). Illustrating by example, if the intelligent imager (501) captures a picture, multiple successive pictures, video, or other information relating to of the owner of an electronic device, the emotional detector 702 can infer their silently communicated emotional state, e.g., joy, anger, frustration, and so forth. This can be inferred from, for example, facial gestures such as a raised eyebrow, grin, or other feature. In one or more embodiments, such emotional cues can indicate the user is intending to issue a command to the electronic device. Alternatively, emotion can be detected from voice inflections, or words used. If someone screams, "I am mad at you," there are likely negative emotional issues involved, for example.

Calendar information and events 720 can be used to detect social cues. If, for example, a calendar event indicates that a birthday party is occurring, this can imply festive and jovial social cues. However, if a funeral is occurring, it is unlikely that a user will be issuing device commands to an electronic device as funerals tend to be quiet affairs.

Wellness information 703 can be used to detect social cues. If, for example, wellness information 703 indicates that a person's heart rate is high, and they are perspiring, and the location information 715 indicates that a person is in an alley of a city, and the time-of-day information 708 indicates that its 3 AM, the person may be under duress. Accordingly, the command "Call 911" is highly likely to be a device command.

Alarm information 704 can be used to detect social cues. If an alarm has just sounded at 6:00 AM, the command "snooze" is likely to be a device command. Personal identification information 705 can be used to detect social cues as well. If a person is a diabetic, and wellness sensors show them to be clammy and sweaty, this could be due to low insulin. Accordingly, the command "Call 911" is highly likely to be a device command.

Device usage data 706 can indicate social cues. If a person is searching the web, and an incoming call is received, the command "decline" is likely to be a device command. Energy storage 707 within an electronic device can be used to indicate a social cue. Device operating mode information 709 can be used in a similar fashion. When energy storage drops to, for example, ten percent, the command "shut down all non-critical apps" is likely to be a device command.

Consumer purchase information 711 can certainly indicate social cues. If, for example, a person is a sommelier and frequently purchases wine, when viewing a web browser and finding a bottle of '82 Lafite for under $1000, the command "buy that wine now" is likely to be a device command.

Device usage profiles 712 can be used to infer social cues as well. If, for example, a person never uses an electronic device between 10:00 PM and 6:00 AM due to the fact that they are sleeping, if they happen to talk in their sleep and say, "order a pizza—I'm starving," this is not likely to be a device command.

Organizations can have formal rules and policies 710, such as meetings cannot last more than an hour without a break, one must take a lunch break between noon and 2:00 PM, and brainstorming sessions occur every morning between 9:00 and 10:00 AM. Similarly, families can have similar rules and policies 713, such as dinner occurs between 6:00 and 7:00 PM. This information can be used to infer social cues such as whether a person is likely to be in conversation with other people. When this is the case, spoken questions are less likely to be device commands. By contrast, when a user is likely to be alone, spoken commands are more likely to be device commands.

Application data 734 can indicate social cues. If a person frequently interacts with word processing applications during the day, the commands "cut" and "paste" are more likely to be device commands that they would for someone who instead plays video games with flying birds. Device settings 716 can indicate social cues as well. If a user sets their electronic device to alarm clock mode, it may be likely that they are sleeping and are not issuing device commands.

Social media 718 in formation can indicate social cues. For example, in one embodiment information relating to multi-modal social cues from an environment about the electronic device can be inferred from retrieving information from a social media server. For example, real time searches, which may be a keyword search, image search, or other search, of social media services can find images, posts, and comments relating to a location determined by the location information 715. Images posted on a social media service server that were taken at the same location may reveal multi-modal social cues. Alternatively, commentary regarding the location may imply social cues. Information from third party servers 717 can be used in this manner as well.

One further example of the context sensors 121 is repetitive behavior information 719. If, for example, a person always stops at a coffee shop between 8:00 and 8:15 AM on their way to work, the command, "Pay for the coffee," is likely to be a device command. As with FIG. 6 above, the physical sensors of FIG. 6 do not constitute a comprehensive list. Context sensors 121 can be any type of device that infers context from data of the electronic device. The context sensors 121 can be configured as either hardware components, or alternatively as combinations of hardware components and software components. The context sensors 121 can analyze information to, for example, not only detect the user, but also to determine the social cues and emotional effect of other people in the vicinity of the electronic device, thereby further informing inferences about the user's intent and what executable control commands are appropriate given this composite social context.

The context sensors 121 can be configured to collect and analyze non-physical parametric data. While some are shown in FIG. 7, numerous others could be added. Accordingly, the context sensors 121 of FIG. 7 are illustrative only, as numerous others will be obvious to those of ordinary skill in the art having the benefit of this disclosure. It should be noted that one or both of the physical sensors (120) or the context sensors 121, when used in combination, can be cascaded in a predefined order to detect a plurality of multi-modal social cues to determine whether the device command is intended for the electronic device.

Turning now back to FIG. 1, in one or more embodiments a heuristic sensor processor 119 can be operable with both the physical sensors 120 and the context sensors 121 to detect, infer, capture, and otherwise determine when multi-modal social cues are occurring in an environment about an electronic device. In one embodiment, the heuristic sensor processor 119 determines, from one or both of the physical sensors 120 or the context sensors 121, assessed contexts and frameworks using adjustable algorithms of context assessment employing information, data, and events. These assessments may be learned through repetitive data analysis. Alternatively, a user may employ the user interface of the electronic device 100 to enter various parameters, constructs, rules, and/or paradigms that instruct or otherwise guide the heuristic sensor processor 119 in detecting multi-modal social cues, emotional states, moods, and other contextual information. The heuristic sensor processor 119 can comprise an artificial neural network or other similar technology in one or more embodiments.

In one or more embodiments, the heuristic sensor processor 119 is operable with the one or more processors 114. In some embodiments, the one or more processors 114 can control the heuristic sensor processor 119. In other embodiments, the heuristic sensor processor 119 can operate independently, delivering information gleaned from detecting multi-modal social cues, emotional states, moods, and other contextual information to the one or more processors 114. The heuristic sensor processor 119 can receive data from one or both of the physical sensors 120 or the context sensors 121. In one or more embodiments, the one or more processors 114 are configured to perform the operations of the heuristic sensor processor 119.

In one or more embodiments, the block diagram schematic 112 includes a voice interface engine 122. The voice interface engine 122 can include hardware, executable code, and speech monitor executable code in one embodiment. The voice interface engine 122 can include, stored in memory 115, basic speech models, trained speech models, or other modules that are used by the voice interface engine 122 to receive and identify voice commands that are received with audio input captured by an audio capture device. In one embodiment, the voice interface engine 122 can include a voice recognition engine. Regardless of the specific implementation utilized in the various embodiments, the voice interface engine 122 can access various speech models to identify speech commands.

In one embodiment, the voice interface engine 122 is configured to implement a voice control feature that allows a user to speak a specific device command to cause the one or more processors 114 to execute a control operation. For example, the user may say, "How tall is the Willis Tower?" This question comprises a device command requesting the one or more processors to retrieve, with the communication device 116, information from a remote server, perhaps across the Internet, to answer the question. Consequently, this device command can cause the one or more processors 114 to access an application module, such as a web browser, to search for the answer and then deliver the answer as audible output via an audio output of the other components 124. In short, in one embodiment the voice interface engine 122 listens for voice commands, processes the commands and, in conjunction with the one or more processors 114, returns an output that is the result of the user's intent.

The block diagram schematic 112 can also include an image/gaze detection-processing engine 123. The image/gaze detection-processing engine 123 can be operable with the physical sensors 120, such as a camera or intelligent imager, to process information to detect a user's gaze point. The image/gaze detection-processing engine 123 can optionally include sensors for detecting the alignment of a user's head in three-dimensional space. Electronic signals can then be delivered from the sensors to the image/gaze detection-processing engine 123 for computing the direction of user's gaze in three-dimensional space. The image/gaze detection-processing engine 123 can further be configured to detect a gaze cone corresponding to the detected gaze direction, which is a field of view within which the user may easily see without diverting their eyes or head from the detected gaze direction. The image/gaze detection-processing engine 123 can be configured to alternately estimate gaze direction by inputting images representing a photograph of a selected area near or around the eyes.

The one or more processors 114 may also generate commands or execute control operations based upon information received from a combination of the physical sensors 120, the context sensors 121, the flexible display 104, the other components 124, and/or the other input devices. Alternatively, the one or more processors 114 can generate commands or execute control operations based upon information received from the one or more sensors or the flexible display 104 alone. Moreover, the one or more processors 114 may process the received information alone or in combination with other data, such as the information stored in the memory 115.

Other components 124 operable with the one or more processors 114 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

As noted above, in one or more embodiments a blade assembly 102 is coupled to the flexible display 104. In contrast to sliding devices that include multiple device housings, the electronic device 100 of FIG. 1 includes a single device housing 101 to which the blade assembly 102 is coupled. The blade assembly 102 is configured as a mechanical chassis that allows the flexible display 104 to translate along a translation surface defined by major and minor surfaces of the single device housing 101. In one or more embodiments, the blade assembly 102 also provides a mechanical support for portions 130 of the flexible display 104 that extend beyond the top edge 131 of the single device housing 101 when the blade assembly 102 and flexible display 104 are in the extended position shown in FIG. 1. When the display roller mechanism 105 actuates, it causes the blade assembly 102 and the flexible display 104 to translate 301 along the rear major surface 103, the bottom minor surface, and the front major surface between the extended position shown in FIG. 1, the retracted position shown in FIG. 3, and the peek position shown in FIG. 5.

The blade assembly 102 can include a blade substrate 125 that includes both flexible portions and rigid portions, and that is positioned between the flexible display 104 and the translation surface defined by the single device housing 101. The blade substrate 125 can also comprise a silicone border 127 that surrounds and protects the edges of the flexible display 104. In one or more embodiments, the blade substrate 125 comprises a steel backer plate with the silicone border 127 co-molded around the perimeter of the steel backer plate. In one or more embodiments, a low-friction dynamic bending laminate stack 128 and blade 126 are positioned between the blade assembly 102 and the translation surfaces defined by the single device housing 101.

In one or more embodiments, the blade substrate 125 is partially rigid and partially flexible. Illustrating by example, portions of the blade substrate 125 that slide along the major surfaces of the single device housing 101 are configured to be substantially rigid, while portions of the blade substrate 125 that pass around the minor surfaces of the single device housing 101 are configured to be flexible so that they can curl around those minor surfaces. In one or more embodiments, some portions of the blade substrate 125 abut the translation surfaces defined by the single device housing 101 while other portions abut the display roller mechanism 105, which is positioned at the bottom minor surface of the single device housing 101 in this illustrative embodiment.

In one or more embodiments, the blade 126 and the low-friction dynamic bending laminate stack 128 are positioned between the blade assembly 102 and the translation surfaces defined by the single device housing 101. The blade 126 supports portions of the blade assembly 102 and flexible display 104 that extend beyond the top edge 131 of the single device housing 101 when the blade assembly 102 is transitioned to the extended position shown in FIG. 1. Since this blade 126 needs to be rigid to support those portions of the blade assembly 102 and the flexible display 104, it is not able to bend around the display roller mechanism 105. To prevent gaps or steps from occurring where the blade 126 terminates, in one or more embodiments a low-friction dynamic bending laminate stack 128 spans the remainder of the blade assembly 102 and abuts the transition surfaces defined by the single device housing 101.

The blade assembly 102 can be fixedly coupled to the flexible display 104 by an adhesive or other coupling mechanisms. Where the blade substrate 132 defines both rigid and flexible portions. The blade substrate 132 can define a first rigid section extending along the major surfaces of the single device housing 101 and a second flexible section extending configured to wrap around the minor surfaces of the single device housing 101 where the display roller mechanism 105 is positioned.

Figure 5:
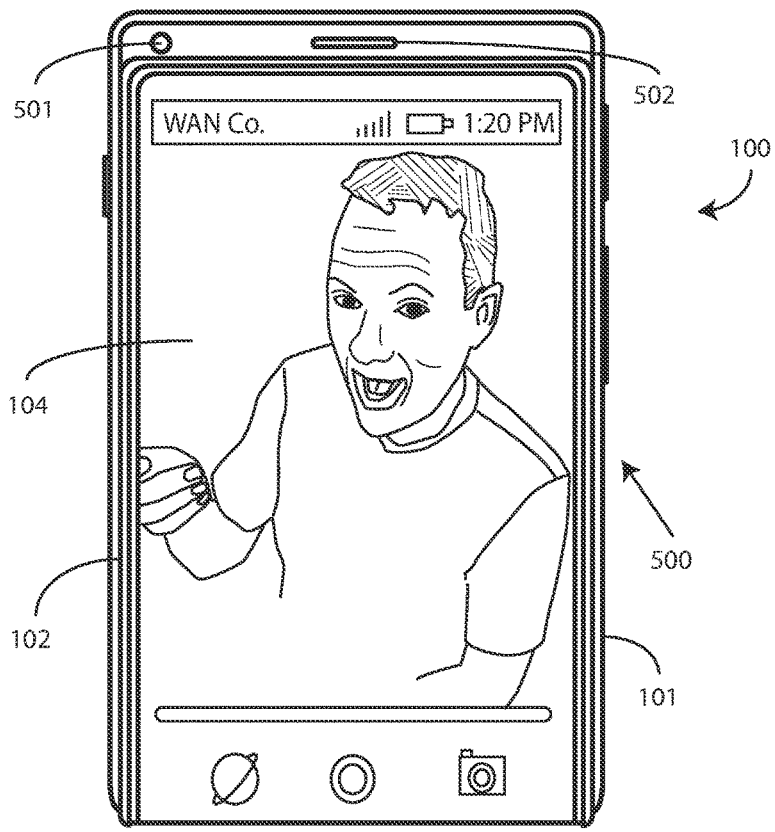
FIG. 5 illustrates the explanatory electronic device of FIG. 2 with the translating display moved to a third sliding position known as the "peek" position that exposes an image capture device positioned under the translating display when the translating display is in the first sliding position or second sliding position.

In one or more embodiments, the blade assembly 102 defines a mechanical assembly providing a slider framework that allows the flexible display 104 to move between the extended position of FIG. 1, the retracted position of FIG. 3, and the peek position of FIG. 5. As used herein, the term "framework" takes the ordinary English definition of a mechanical support structure supporting the other components coupled to the slider framework. These components can include the blade 126, the silicone border 127, and the low-friction dynamic bending laminate stack 128. Other components can be included as well. Illustrating by example, this can include electronic circuits for powering the flexible display 104. Moreover, the blade assembly can include a tensioner that ensures that the flexible display 104 remains flat against the single device housing 101 when translating.

In one or more embodiments, the display roller mechanism 105 that causes a first portion of the blade assembly 102 and the flexible display 104 display (shown on the rear side of the electronic device 100 in FIG. 1) and a second portion of the blade assembly 102 and the flexible display 104 (positioned on the front side of the electronic device 100 in FIG. 1) to slide symmetrically in opposite directions along the translation surfaces defined by the single device housing 101.

Thus, the electronic device 100 of FIG. 1 includes a single device housing 101 with a flexible display 104 incorporated into a blade assembly 102. The blade assembly 102 is then coupled to a translation mechanism defined by the display roller mechanism 105 and situated within the single device housing 101. In the explanatory embodiment of FIG. 1, the display roller mechanism 105 is situated at the bottom edge of the single device housing 101.

In one or more embodiments, in response to actuation of a user interface component 110 such as a button, the translation mechanism defined by the display roller mechanism 105 is operable to transition the blade assembly 102 around the surfaces of the single device housing 101 between the extended position of FIG. 1 where the blade 126 of the blade assembly 102 extends distally from the single device housing 101, a retracted position (shown in FIG. 3) where the blade assembly 102 abuts the single device housing 101 with the flexible display 104 wrapping around the surfaces of the single device housing 101, and a "peek" position (shown in FIG. 5) where movement of the translation mechanism defined by the display roller mechanism 105 causes the blade assembly 102 to reveal an image capture device situated beneath the blade assembly 102 on the front of the single device housing 101.

In other embodiments, as will be described below, the one or more processors 114 and/or an artificial intelligence classifier automatically transitions the blade assembly 102 and the flexible display 104 to a predefined state as a function of content presentation. Embodiments of the disclosure contemplate that in such an electronic device 100, manual actuation of the user interface component 110 potentially delays the usability of the electronic device 100 in the new state due to the time taken to manually "inject" the trigger causing transition of the blade assembly 102 and flexible display 104 by requiring the actuation of the user interface component 110.

Accordingly, in one or more embodiments the one or more processors 114 cause the blade assembly 102 to transition toward the extended position when the one or more processors 114 identify content to be newly presented on the flexible display 104. Similarly, when new split-screen content is identified to be presented on the flexible display 104, the one or more processors 114 can cause the blade assembly 102 to translate toward the extended position as well. When content—be it regular content or split-screen content—is removed from the flexible display 104, the one or more processors 114 can cause the blade assembly 102 to translate back toward the peek position.

Advantageously, embodiments of the disclosure provide systems and methods that automatically and pre-emptively move the flexible display 104 to the optimal state based upon whether content needs to be newly presented on the flexible display 104 or, alternatively, has been removed from the flexible display 104. Illustrating by example, in one or more embodiments one or more processors 114 of the electronic device 100 can transition the blade assembly 102 and flexible display 104 toward the extended position when content is identified to be newly presented on the flexible display 104. Where the new content is split-screen content, this allows the electronic device 100 to enter a full-screen, immersive mode. Examples of applications capable of presenting split-screen content utilizing such full-screen, immersive modes of operation include gaming applications and video playback applications. Other such applications will be obvious to those of ordinary skill in the art having the benefit of this disclosure.

Translation of the blade assembly 102 and flexible display 104 to the retracted position can occur in a similar fashion. In one or more embodiments, the one or more processors 114 of the electronic device 100 can automatically translate the blade assembly 102 and the flexible display 104 back to the retracted position when the presentation of content or split-screen content exits or loses foreground.

Advantageously, embodiments of the disclosure provide intuitive operation of a translating display in an electronic device 100. In cases where automatic translation of the translating display is triggered, no user action is required for the translating display to change positions. Instead, the device automatically changes to the position potentially desired by the user.

Translation of the blade assembly 102 and flexible display 104 can automatically occur for other reasons as well. As noted above, in one or more embodiments one or more processors 114 of the electronic device 100 have knowledge of the position of the translating display defined by the blade assembly 102 and flexible display 104 relative to the single device housing 101 from signals obtained from the one or more physical sensors 120. In one or more embodiments, the one or more processors 114 can adjust then automatically adjust the "display size" seen from the front of the electronic device 100 to accommodate a wide range of aspect ratios suitable for presentation on the front-facing portion of the flexible display 104 when the blade assembly 102 is in a particular position.

In one or more embodiments, the one or more processors 114 leverage this capability to automatically adapt the viewable display size from the front of the electronic device 100 to the most optimal aspect ratio for the forefront application operating on the one or more processors 114 and presenting content on the flexible display 104. Advantageously, this ability to accommodate multiple aspect ratios on a single translating display by changing the position of the blade assembly 102 relative to the single device housing 101 completely avoids the black bars and cropping and stretching problems plaguing the prior art.

In one or more embodiments, applications operating on the one or more processors 114 can identify their optimal aspect ratio with the one or more processors 114 causing the display roller mechanism 105 to move the blade assembly 102 to the proper position to accommodate that ideal aspect ratio. Advantageously, this allows content to be presented in accordance with the optimal user experience for a given application's design.

Accordingly, in one or more embodiments the one or more processors 114 facilitate an automatic optimal display size adjustment based upon an aspect ratio of video in playback. The one or more processors 114 can then cause the display roller mechanism 105 to adjust the blade assembly 102 such that the front-facing portion of the flexible display 104 is optimized for a display size based upon optimal aspect ratios indicated by the application operating in the foreground.

In one or more embodiments, the one or more processors 114 determine whether the application presenting content on front-facing portions of the flexible display 104 is presenting split-screen content in an immersive, full-screen playback mode. Where this is the case, the one or more processors 114 can query the application presenting the split-screen content to determine the optimal aspect ratio. The one or more processors 114 can then calculate the appropriate display size that should appear on the front-facing portions of the flexible display 104 and cause the display roller mechanism 105 to move the blade assembly 102 accordingly.

Embodiments of the disclosure also allow for applications to request windows having certain aspect ratios. Illustrating by example, in one or more embodiments applications operating in the foreground submit an optimal list of aspect ratios that provide the best performance to the one or more processors 114. For all of these "ideal" aspect ratios, the one or more processors 114 calculate the corresponding display sizes. In one or more embodiments, the one or more processors 114 then cause the display roller mechanism 105 to move the blade assembly 102 to the optimal size within the possible display size ranges accommodating the content offerings.

As shown in FIG. 1, the blade assembly 102 is able to slide around the single device housing 101 such that the blade 126 slides away from the single device housing 101 to change the apparent overall length of the flexible display 104 as viewed from the front of the electronic device 100. By contrast, in other states (such as the one shown in FIG. 3) the blade assembly 102 can slide in an opposite direction around the single device housing 101 to a retracted position with similar amounts of the flexible display 104 visible on the front side of the electronic device 100 and the rear side of the electronic device 100.

In FIG. 1, the electronic device 100 includes a single device housing 101 with a blade assembly 102 coupled to two major surfaces of the single device housing 101 and wrapping around at least one minor surface of the electronic device 100 where the display roller mechanism 105 is situated. This allows the blade assembly 102 to slide relative to the single device housing 101 between a retracted position of FIG. 3, the extended position of FIG. 1, and the peek position of FIG. 5 revealing a front-facing image capture device.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in the extended position 200 that was also shown in FIG. 1. In the extended position 200, the blade (126) slides outward and away from the single device housing 101, thereby revealing more and more portions of the flexible display 104. In such a configuration, the portions of flexible display 104 passing around the display roller mechanism (105) elongated into a flat position as they pass along the translation surface defined by the front of the single device housing 101.

Turning now to FIGS. 3-4, illustrated therein is the electronic device 100 with the flexible display 104 in the retracted position 300. FIG. 3 illustrates the front side of the electronic device 100, while FIG. 4 illustrates the rear side.

In this state, blade (126) slides back toward, and then along, the translation surface defined by the single device housing 101. This causes the apparent overall length of the flexible display 104 to get shorter as more and more portions of the flexible display 104 pass around the display roller mechanism (105) positioned at the bottom of the single device housing 101 and across the translation surface defined by the rear side of the single device housing 101.

Turning now to FIG. 5, illustrated therein is the electronic device 100 with the flexible display in the peek position 500. When in the peek position, the blade assembly 102 and the flexible display 104 translate past the retracted position (300) of FIG. 3. In one or more embodiments, when this occurs, the blade assembly 102 and the flexible display 104 reveal an image capture device 501 that is situated beneath the blade assembly 102 and the flexible display 104 when they are in the retracted position (300) of FIG. 3. In this illustrative embodiment, a loudspeaker 502 is also revealed.

Advantageously, by positioning the image capture device 501 beneath the blade assembly 102 and the flexible display 104 when these components are in either the retracted position (300) of FIG. 3-4 or the extended position (200) of FIG. 2, a user of the electronic device 100 is assured of privacy due to the fact that the image capture device 501 is not able to see through the blade (126) of the blade assembly 102. Accordingly, even if the electronic device 100 is accessed by a hacker or other nefarious actor, the user can be assured that the image capture device 501 cannot capture images or videos while the blade assembly 102 and flexible display 104 are in the retracted position (300), the extended position (200), or in positions therebetween. Only when the blade assembly 102 and the flexible display 104 transition to the peek position 500, thereby revealing the image capture device 501, can the image capture device 501 capture front-facing images or front-facing videos.

Referring collectively to FIGS. 2-5, it can be seen that the electronic device 100 includes a single device housing with a flexible display 104 incorporated into a blade assembly 102. The blade assembly 102 is coupled to a translation mechanism situated within the single device housing 101.

In response to actuation of a user interface device, one example of which is a button positioned on a side of the single device housing 101, or alternatively automatically as described below with reference to FIGS. 23-31, the translation mechanism is operable to transition the blade assembly 102 around the surfaces of the single device housing 101 between the extended position 200 where the blade (126) of the blade assembly 102 extends distally from the single device housing 101, the retracted position 300 where the blade assembly 102 abuts the single device housing 101 with the flexible display 104 and blade assembly 102 wrapping around the surfaces of the single device housing 101, and even positions therebetween, as a function of content that is to be newly presented on the flexible display 104.

Another feature that can be seen in reviewing FIGS. 2-5 collectively is the how the presentation of content changes as a function of the position of the blade assembly 102. Embodiments of the disclosure contemplate that the position of the blade assembly 102 and flexible display 104 relative to the single device housing 101 change the amount of the flexible display 104 that is visible from the front, visible from the rear, and visible in the curved end portions. Said differently, the viewable size of the flexible display 104 from each side of the electronic device 100 will vary as a function of the position of the blade assembly 102 relative to the single device housing 101. Advantageously, embodiments of the disclosure provide applications, methods, and systems that dynamically resize and adjust the interface layouts and content presentations, as shown in FIGS. 2-5.

This can be accomplished by resizing a primary visible portion, e.g., the front-facing portion shown in FIGS. 2, 3, and 5, of the flexible display 104. Applications can be windowed on this primary area of the flexible display 104, which will resize as the flexible display 104 as it transitions between the extended position 200 of FIG. 2, the retracted position 300 of FIGS. 3-4, and the peek position 500 of FIG. 5.

In FIGS. 2-5, the one or more processors (114) of the electronic device 100 segment the flexible display 104 into three, individual, usable parts. These include the front-facing portion of the flexible display 104 shown in FIGS. 2, 3, and 5, the rear-facing portion of the flexible display 104 shown in FIG. 5, and the curvilinear portion of the flexible display 104 situated at the bottom of the electronic device 100 and wrapping around the rotor, shown in FIGS. 2-5. This curvilinear portion of the flexible display 104 is sometimes referred to as the "roll edge" portion of the display.

In one or more embodiments, each of these usable parts are dynamically remapped as the flexible display 104 changes position relative to the single device housing 101. In one or more embodiments, applications can request windows on the usable portion upon which it intends to present content.

In one or more embodiments, the orientation of the rear-facing portion and the roll edge portion is not the same as that of the front-facing portion when the flexible display 104 translates along the single device housing 101 from the extended position 200 shown in FIG. 2 to the retracted position 300 shown in FIG. 3-4 or the peek position 500 of FIG. 5. To address this, as can be seen by comparing FIGS. 3-4, in one or more embodiments content presented on the rear-facing portion is rotated by 180-degrees so that its "up" side is the same as the "up" side on the front-facing portion.

In one or more embodiments, the orientation of content presented on the roll edge portion can change based upon the orientation of the electronic device 100. If, for example, the front-facing side is up the orientation of content presented on the roll edge will have a first orientation. By contrast, if the rear-facing side is up, the orientation of that same content presented on the roll edge will have a second orientation that is rotated 180-degrees relative to the first orientation.

In one or more embodiments, any content presented on the front-facing portion of the flexible display 104 is oriented in accordance with user preferences. In one or more embodiments, this front-facing portion is oriented in accordance with the orientation of the electronic device 100 in three-dimensional space.

On the roll edge portion of the translating display, in one or more embodiments this segment is oriented in the same orientation as the front-facing portion when the electronic device 100 is not oriented with the front-facing side facing the negative z-direction in three-dimensional space (it is rotated by 180-degrees when this is the case). In one or more embodiments, the roll edge portion does not obey user preferences for display orientation and auto rotate/device orientation.

In one or more embodiments, content presented on the rear-facing portion of the flexible display 104 is always rotated by 180-degrees relative to content presented on the front-facing portion when the electronic device 100 is being held vertically, as is the case, and as can be seen, in FIGS. 3-4. In one or more embodiments, the rear-facing portion does not obey user preferences for display orientation and auto-rotate/device orientation.

Accordingly, in one or more embodiments one or more processors (114) of the electronic device (100) dynamically remap multiple translating display root segments based upon the position of the flexible display 104 relative to the single device housing 101. The one or more processors 114 can independently manage orientation and rotation on each of the root segments of the flexible display 104, be they the front-facing portion, the rear-facing portion, or the roll edge portion. In one or more embodiments, this management occurs independently based upon which side of the electronic device 100 the segment is currently positioned upon, combined with sensor inputs to identify if the electronic device 100 is face down or face up.

As shown in FIG. 2, the blade assembly 102 is operable to slide around the single device housing 101 such that the blade 126 slides away from the single device housing 101 to change an overall length of the flexible display 104 as viewed from the front of the electronic device 100. As shown in FIGS. 3-4, the blade assembly 102 can slide in an opposite direction around the single device housing 101 to a retracted position 300 with similar amounts of the flexible display 104 being visible on the front side of the electronic device 100 and the rear side of the electronic device 100.

Accordingly, in one or more embodiments the electronic device 100 includes a single device housing 101 with a blade assembly 102 coupled to two major surfaces of the single device housing 101 and wrapping around at least one minor surface of the electronic device 100 such that the blade assembly 102 can slide relative to the single device housing 101 between the retracted position 300, the extended position 200, and the peek position 500 revealing a front-facing image capture device 501.

Figure 8:
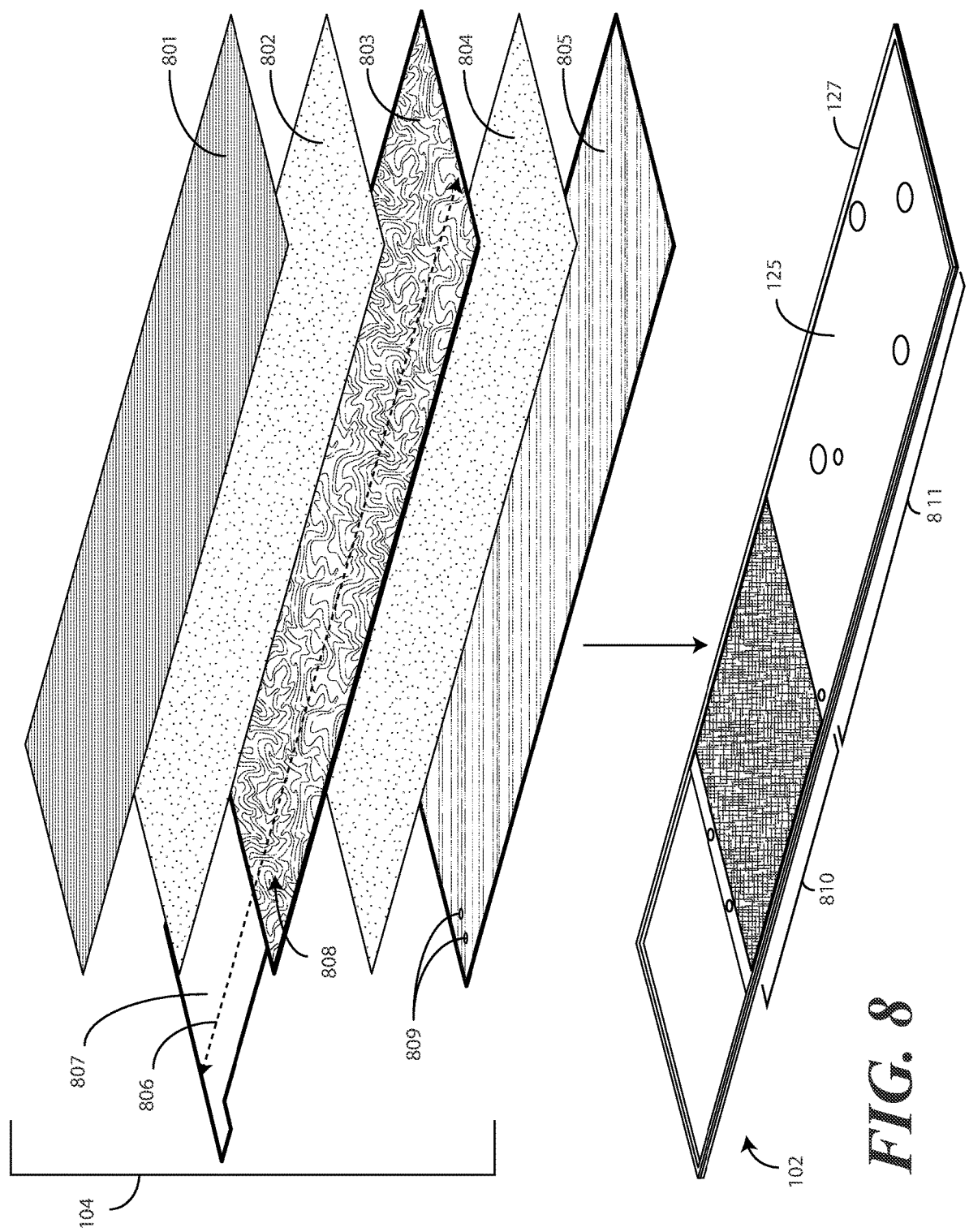
FIG. 8 illustrates portions of one explanatory display assembly in an exploded view in accordance with one or more embodiments of the disclosure.

Turning now to FIG. 8, illustrated therein is the flexible display 104 shown in an exploded view, along with the blade assembly 102. As shown in FIG. 8, in one or more embodiments the flexible display 104 comprises one or more layers that are coupled or laminated together to complete the flexible display 104. In one or more embodiments, these layers comprise a flexible protective cover 801, a first adhesive layer 802, a flexible display layer 803, a second adhesive layer 804, and a flexible substrate 805. Other configurations of layers suitable for manufacturing the flexible display 104 will be obvious to those of ordinary skill in the art having the benefit of this disclosure.

Beginning from the top of the layer stack, in one or more embodiments the flexible protective cover 801 comprises an optically transparent substrate. In one or more embodiments the flexible protective cover 801 may be manufactured from an optically transparent material such a thin film sheet of a thermoplastic material. Illustrating by example, in one embodiment the flexible protective cover 801 is manufactured from a layer of optically transparent polyamide having a thickness of about eighty microns. In another embodiment, the flexible protective cover 801 is manufactured from a layer of optically transparent polycarbonate having a thickness of about eighty microns. Other materials suitable for manufacturing the flexible protective cover 801 will be obvious to those of ordinary skill in the art having the benefit of this disclosure.

In one or more embodiments the flexible protective cover 801 functions as a fascia by defining a cover for the flexible display layer 803. In one or more embodiments the flexible protective cover 801 is optically transparent, in that light can pass through the flexible protective cover 801 so that objects behind the flexible protective cover 801 can be distinctly seen. The flexible protective cover 801 may optionally include an ultra-violet barrier. Such a barrier can be useful in improving the visibility of flexible display layer 803 in one or more embodiments.

Beneath the flexible protective cover 801 is a first adhesive layer 802. In one or more embodiments, the first adhesive layer 802 comprises an optically transparent adhesive. The optically transparent adhesive can be applied to two sides of a thin, optically transparent substrate such that the first adhesive layer 802 functions as an optically transparent layer having optically transparent adhesive on both sides. Where so configured, in one or more embodiments the first adhesive layer 802 has a thickness of about fifty microns. This optically transparent version of "double-sided tape" can then be spooled and applied between the flexible protective cover 801 and the flexible display layer 803 to couple the two together.

In other embodiments the first adhesive layer 802 will instead be applied between the flexible protective cover 801 and the flexible display layer 803 as an optically transparent liquid, gel, as a homogeneous adhesive layer, or in the form of another medium. Where so configured, the first adhesive layer 802 can optionally be cured by heat, ultraviolet light, or other techniques. Other examples of materials suitable for use as the first adhesive layer 802 will be obvious to those of ordinary skill in the art having the benefit of this disclosure. In one or more embodiments, the first adhesive layer 802 mechanically couples the flexible display layer 803 to the flexible protective cover 801.

In one or more embodiments, the flexible display layer 803 is situated between the flexible substrate 805 and the flexible protective cover 801. In one or more embodiments, the flexible display layer 803 is longer along a major axis 806 of the flexible display layer 803, and thus the flexible display 104 itself, than is the image producing portion 808 of the flexible display 104. For instance, as shown in FIG. 8 the flexible display layer 803 includes a T-shaped tongue 807 that extends beyond the image producing portion 808 of the flexible display layer 803. As will be shown in FIG. 10 below, in one or more embodiments electronic circuit components configured to operate the image producing portion 808 of the flexible display layer 803, connectors, and other components can be coupled to this T-shaped tongue 807 in one or more embodiments. Thus, in this illustrative embodiment the T-shaped tongue 807 extends distally beyond terminal ends of the other layers of the flexible display 104. While the T-shaped tongue 807 is T-shaped in this illustrative embodiment, it can take other shapes as well as will be obvious to those of ordinary skill in the art having the benefit of this disclosure.

The flexible display layer 803 can optionally be touch-sensitive. In one or more embodiments, the flexible display layer 803 is configured as an organic light emitting diode (OLED) display layer. When coupled to the flexible substrate 805, the flexible display layer 803 can bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 803 may be formed from multiple layers of flexible material such as flexible sheets of polymer or other materials. Illustrating by example, the flexible display layer 803 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 803 has a thickness of about 130 microns.

In one or more embodiments, to be touch sensitive the flexible display layer 803 includes a layer including one or more optically transparent electrodes. In one or more embodiments, the flexible display layer 803 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 803. Other layers suitable for inclusion with the flexible display layer 803 will be obvious to those of ordinary skill in the art having the benefit of this disclosure.

In one or more embodiments, the flexible display layer 803 is coupled to a flexible substrate 805 by a second adhesive layer 804. In other embodiments, a layer above the flexible display layer 803 can be configured with enough stiffness to make the flexible substrate 805 unnecessary. For example, in an embodiment where the flexible protective cover 801 is configured with enough stiffness to provide sufficient protection for the flexible display 104 during bending, the flexible substrate 805 may be omitted.

In one or more embodiments, the flexible substrate 805 comprises a thin layer of steel. Illustrating by example, in one or more embodiments the flexible substrate 805 comprises a steel layer with a thickness of about thirty microns. While thin, flexible steel works well in practice, it will be obvious to those of ordinary skill in the art having the benefit of this disclosure that other materials can be used for the flexible substrate 805 as well. For instance, in another embodiment the flexible substrate 805 is manufactured from a thin layer of thermoplastic material.

In one or more embodiments, to simplify manufacture, the second adhesive layer 804 is identical to the first adhesive layer 802 and comprises an optically transparent adhesive. However, since the second adhesive layer 804 is coupled between the flexible display layer 803 and the flexible substrate 805, i.e., under the flexible display layer 803, an optically transparent adhesive is not a requirement. The second adhesive layer 804 could be partially optically transparent or not optically transparent at all in other embodiments.

Regardless of whether the second adhesive layer 804 is optically transparent, in one or more embodiments the adhesive of the second adhesive layer 804 is applied to two sides of a thin, flexible substrate. Where so configured, in one or more embodiments the second adhesive layer 804 has a thickness of about fifty microns. This extremely thin version of "double-sided tape" can then be spooled and applied between the flexible display layer 803 and the flexible substrate 805 to couple the two together.

In other embodiments, as with the first adhesive layer 802, the second adhesive layer 804 will instead be applied between the flexible display layer 803 and the flexible substrate as a liquid, gel, as a homogeneous layer, or in the form of another medium. Where so configured, the second adhesive layer 804 can optionally be cured by heat, ultraviolet light, or other techniques. Other examples of materials suitable for use as the second adhesive layer 804 will be obvious to those of ordinary skill in the art having the benefit of this disclosure.

In this illustrative embodiment, the flexible display 104 is supported by not only the flexible substrate 805, but by the blade assembly 102 as well. As previously described, in one or more embodiments the blade assembly 102 includes a blade substrate 125. In one or more embodiments, the blade substrate 125 comprises a layer of steel. In one or more embodiments, the blade substrate 125 is thicker than the flexible substrate 805. Illustrating by example, in one or more embodiments when the flexible substrate 805 comprises a steel layer with a thickness of about thirty microns, the blade substrate 125 comprises a layer of steel having a thickness of about one hundred microns.

In one or more embodiments, the blade substrate 125 comprises a rigid, substantially planar support layer. Illustrating by example, the blade substrate 125 can be manufactured from stainless steel in one or more embodiments. In another embodiment, the blade substrate 125 is manufactured from a thin, rigid thermoplastic sheet. Other materials can be used in manufacturing the blade substrate 125 as well. For example, the material nitinol, which is a nickel-titanium alloy, can be used to manufacture the blade substrate 125. Other rigid, substantially planar materials will be obvious to those of ordinary skill in the art having the benefit of this disclosure.

Accordingly, the blade substrate 125 defines another mechanical support for the flexible display 104. In one or more embodiments, the blade substrate 125 is the stiffest layer of the overall assembly of FIG. 8. In one or more embodiments the blade substrate 125 is manufactured from stainless steel with a thickness of about one hundred microns. In another embodiment, the blade substrate 125 is manufactured from a flexible plastic. Other materials from which the blade substrate 125 can be manufactured will be obvious to those of ordinary skill in the art having the benefit of this disclosure. For instance, in another embodiment the blade substrate 125 is manufactured from carbon fiber, and so forth. In one or more embodiments, the blade substrate 125 includes a reinforcing border comprising a thicker layer of material to further protect the flexible display 104 when the blade assembly 102 is in the extended position (200).

In one or more embodiments, the flexible substrate 805 is slightly longer along a major axis of the flexible substrate 805 than is the image producing portion 808 of the flexible display 104. Since the T-shaped tongue 807 is T-shaped, this allows one or more apertures 809 to be exposed on either side of the base of the T of the T-shaped tongue 807. As will be described in more detail below, this extra length along the major axis provided by the flexible substrate 805 allows one or more fasteners to rigidly couple the first end of the flexible substrate 805 to a tensioner.

Embodiments of the disclosure contemplate that some of the layers comprising the flexible display 104 are stiffer than others. Similarly, other layers of the flexible display 104 are softer than others. For example, where the flexible substrate 805 is manufactured from a metal, one example of which is stainless steel, this layer is stiffer than either the first adhesive layer 802 or the second adhesive layer 804. In one or more embodiments, the stainless steel is stiffer than the flexible display layer 803 as well. In one or more embodiments, the flexible substrate 805 is the stiffest layer in the flexible display 104 while the first adhesive layer and the second adhesive layer 804 are the softest layers of the flexible display 104. The flexible protective cover 801 and the flexible display layer 803 have a stiffness that falls between that of the flexible substrate 805 and the adhesive layers in one or more embodiments.

In one or more embodiments, the various layers of the flexible display 104 are laminated together in a substantially planar configuration. Said differently, in one or more embodiments the flexible substrate 805 is configured as a substantially planar substrate. The second adhesive layer 804 can be attached to this substantially planar substrate, with the flexible display layer 803 then attached to the second adhesive layer 804. The first adhesive layer 802 can be attached to the flexible display layer 803, with the flexible protective cover 801 attached to the first adhesive layer 802.

To ensure proper coupling, the resulting flexible display layer 803 can be cured, such as in an autoclave at a predefined temperature for a predefined duration. Where employed, such curing allows any air bubbles or other imperfections in the various layers to be corrected. In one or more embodiments, since the flexible substrate 805 is configured as a substantially planar substrate, the resulting flexible display 104 is substantially planar as well.

In one or more embodiments, the blade substrate 125 of the blade assembly 102 includes both a flexible portion 810 and a rigid portion 811. Since the blade substrate 125 is manufactured from a metal in one or more embodiments, one example of which is steel having a thickness of one hundred microns, the rigid portion 811 gets its rigidity from the material from which it is manufactured. If, for example, the blade substrate 125 were manufactured from a thermoplastic material, in one or more embodiments this thermoplastic material would have enough rigidity that the rigid portion 811 would be rigid. Since the rigid portion 811 only slides along flat major surfaces of the translation surfaces defined by the single device housing (101), it does not need to bend. Moreover, rigidity helps to protect portions of the flexible display 104 that extend beyond ends of the single device housing (101).

By contrast, the flexible portion 810 need to wrap around minor faces of the single device housing (101) where the display roller mechanism (105) is situated. Since the flexible portion 810 is manufactured from the same material as the rigid portion 811 when the blade substrate 125 is manufactured as a single unitary part, in one or more embodiments it includes a plurality of apertures cut through the blade substrate 125 allowing the material to bend. Illustrating by example, in one or more embodiments where the blade substrate 125 is manufactured from steel, a plurality of chemically or laser etched apertures can allow the flexible portion 810 to tightly wrap around minor faces of the single device housing (101) where the display roller mechanism (105) is situated.

Thus, in one or more embodiments the blade substrate 125 is partially rigid and partially flexible. Portions of the blade substrate 125 that slide along the major surfaces of the single device housing (101) are configured to be substantially rigid, while portions of the blade substrate 125 that pass around the minor surfaces of the single device housing (101) are configured to be flexible so that they can curl around those minor surfaces.

In one or more embodiments, the blade assembly 102 also includes a silicone border 127 positioned around a perimeter of the blade substrate 125. In one or more embodiments, the silicone border 127 surrounds and protects the edges of the flexible display 104 when the flexible display 104 is attached to the blade substrate 125 of the blade assembly 102. In one or more embodiments, the silicone border 127 is co-molded around the perimeter of the blade substrate 125.

In one or more embodiments, the rigid portion 811 of the blade substrate 125 can define one or more apertures. These apertures can be used for a variety of purposes. Illustrating by example, some of the apertures can be used to rigidly fasten the blade assembly 102 to a translation mechanism, one example of which was the display roller mechanism (105) of FIG. 1. Additionally, some of the apertures can contain magnets. Hall-effect sensors positioned in the single device housing (101) to which the blade assembly 102 is coupled can then detect the positions of these magnets such that the one or more processors (114) can determine whether the blade assembly 102 and flexible display 104 are in the extended position (200), the retracted position (300), the peek position (500), or somewhere in between.

In one or more embodiments, the flexible display 104 coupled to the blade substrate 125 of the blade assembly 102 within the confines of the silicone border 127. Illustrating by example, in one or more embodiments a first end of the flexible display 104 is adhesively coupled to the rigid portion 811 of the blade substrate 125 of the blade assembly 102. The other end of the flexible display 104 can then be rigidly coupled to a tensioner by passing fasteners through the apertures 809 of the flexible substrate.

Figure 9:
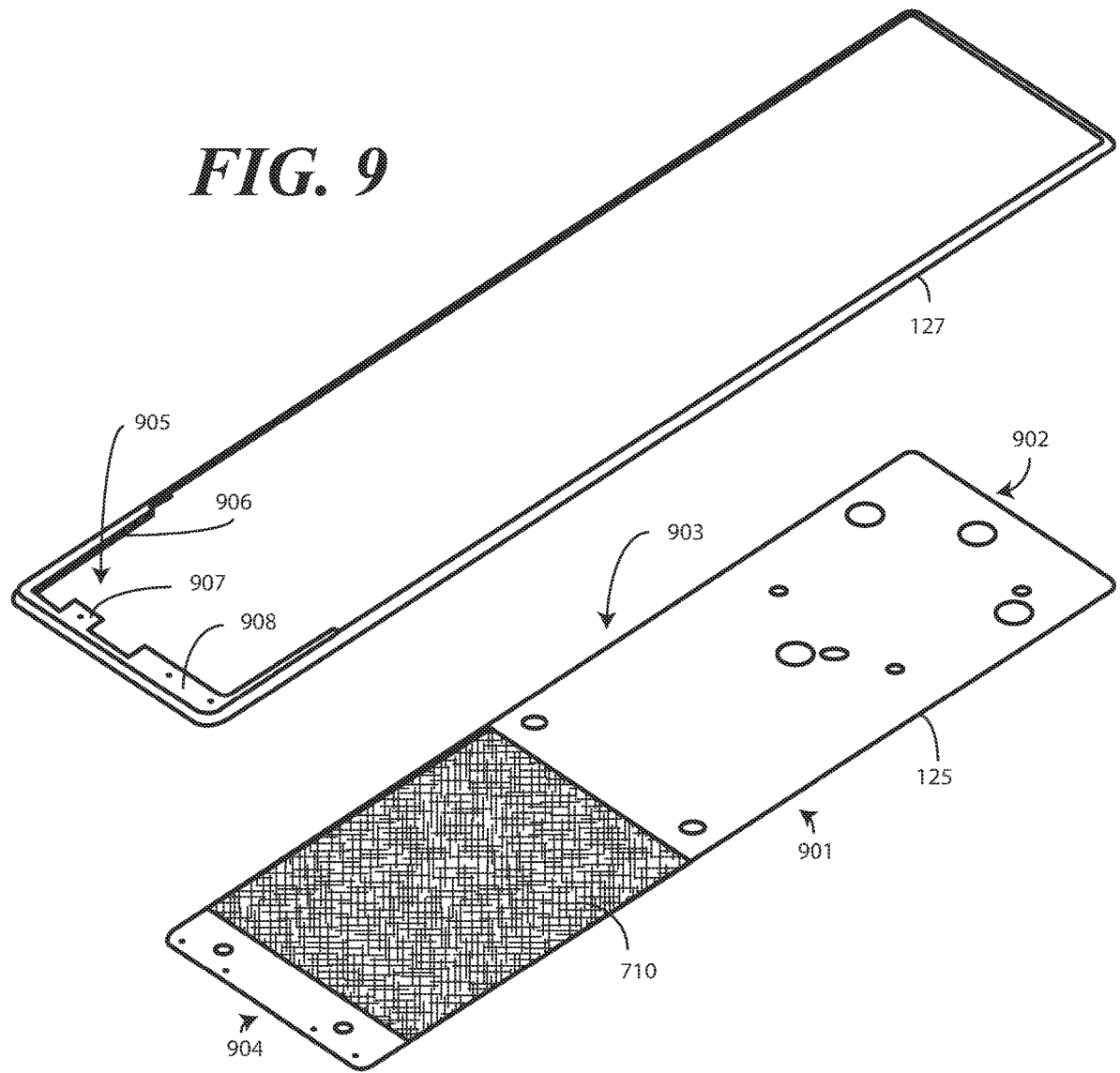
FIG. 9 illustrates portions of one explanatory display assembly in an exploded view in accordance with one or more embodiments of the disclosure.

Turning now to FIG. 9, illustrated therein is the blade substrate 125 and silicone border 127 shown in an exploded view. A shown, the silicone border 127 defines a singular, contiguous, unitary piece of silicone. In the illustrative embodiment of FIG. 9, the silicone border 127 surrounds three sides 901,902,903 of the blade substrate 125, and extends beyond minor side 904 to define a receiving recess 905 that can accommodate mechanical and electrical components such as electronic circuit components to power and control the flexible display (104) that will situate within the perimeter defined by the silicone border 127, a tensioner to keep the flexible display (104) flat across the flexible portion 810 of the blade substrate 125, flexible circuits, and other components.

In this illustrative embodiment, the portions 906,907,908 of the silicone border 127 extending beyond the minor side 904 of the blade substrate 125 surrounding the receiving recess 905 are thicker than are the other portions of the silicone border 127 that will surround the flexible display (104). This allows for components to be placed within the receiving recess 905.

Figure 10:
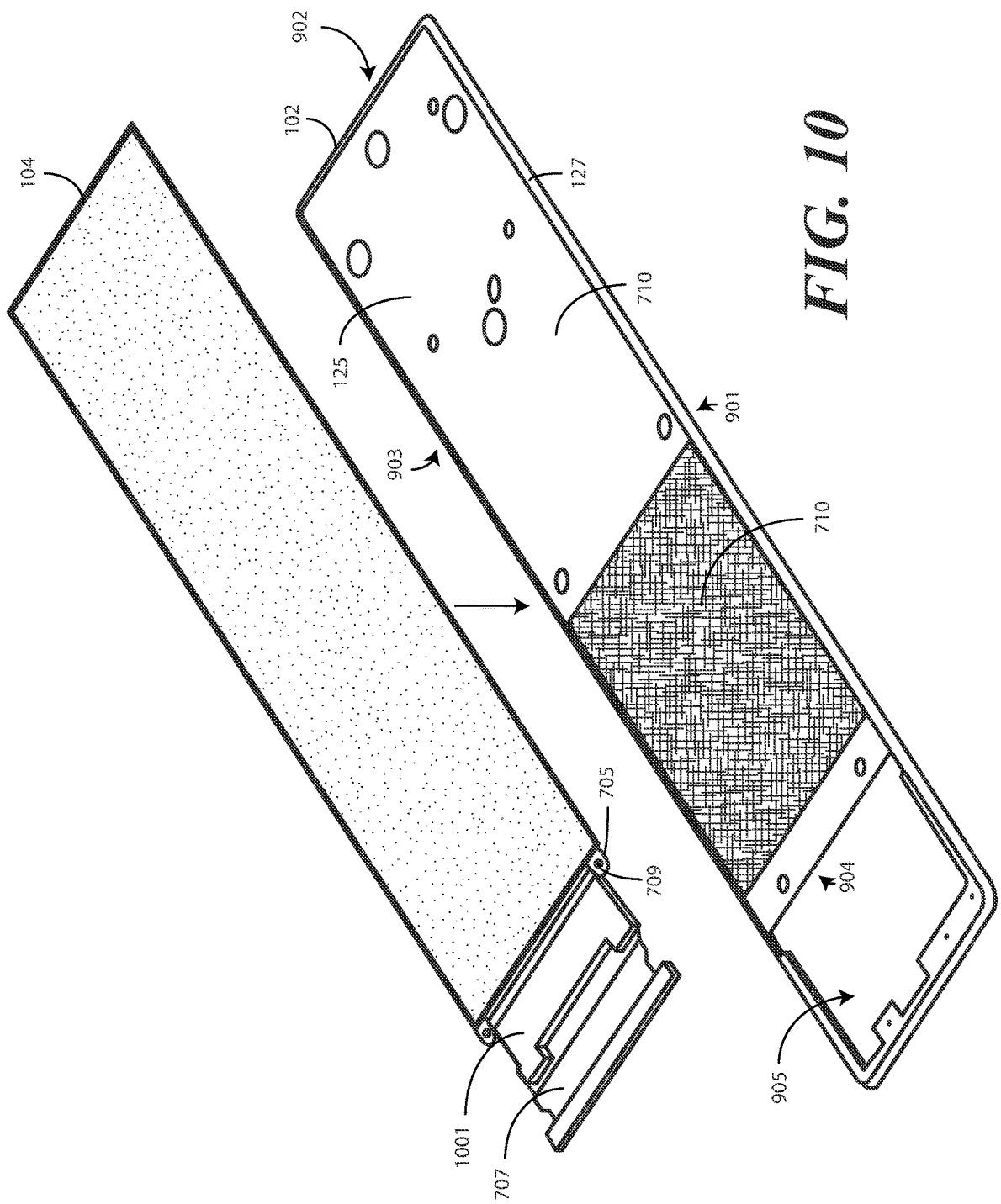
FIG. 10 illustrates one explanatory display assembly in an exploded view in accordance with one or more embodiments of the disclosure.

Turning now to FIG. 10, illustrated therein is the flexible display 104 and the blade assembly 102 with the silicone border 127 over-molded on the blade substrate 125. As shown, the silicone border 127 surrounds three sides 901, 902,903 of the blade substrate 125 and extends beyond minor side 904 to define a receiving recess 905 that can accommodate mechanical and electrical components.

Electronic circuits 1001 operable to power and control the flexible display 104 have been coupled to the T-shaped tongue 807 of the flexible display layer (803). Additionally, a mechanical connector 1002 has been connected to the top of the T on the T-shaped tongue 807. In this illustrative embodiment, the flexible substrate 805 extends beyond a distal end of the flexible display layer (803) so that the apertures 809 defined therein can be coupled to a tensioner to ensure that the flexible display 104 stays flat around the flexible portion 810 of the blade substrate 125 when the flexible portion 810 of the blade substrate 125 passes around a rotor positioned at the end of a single device housing (101).

The blade assembly 102 can be fixedly coupled to the flexible display 104 in one or more embodiments. Illustrating by example, where the blade substrate 125 defines both a rigid portion 811 and a flexible portion 810, in one or more embodiments the flexible display 104 is coupled to the rigid portion 811 by an adhesive or other coupling mechanism. A tensioner can then be positioned in the receiving recess 905. In one or more embodiments, the tensioner rigidly couples with fasteners to the apertures 809 of the flexible substrate 805 to keep the flexible display 104 flat across the flexible portion 810, regardless of how the flexible portion 810 is being bent around the minor surface of a single device housing or its corresponding rotor.

Figure 11:
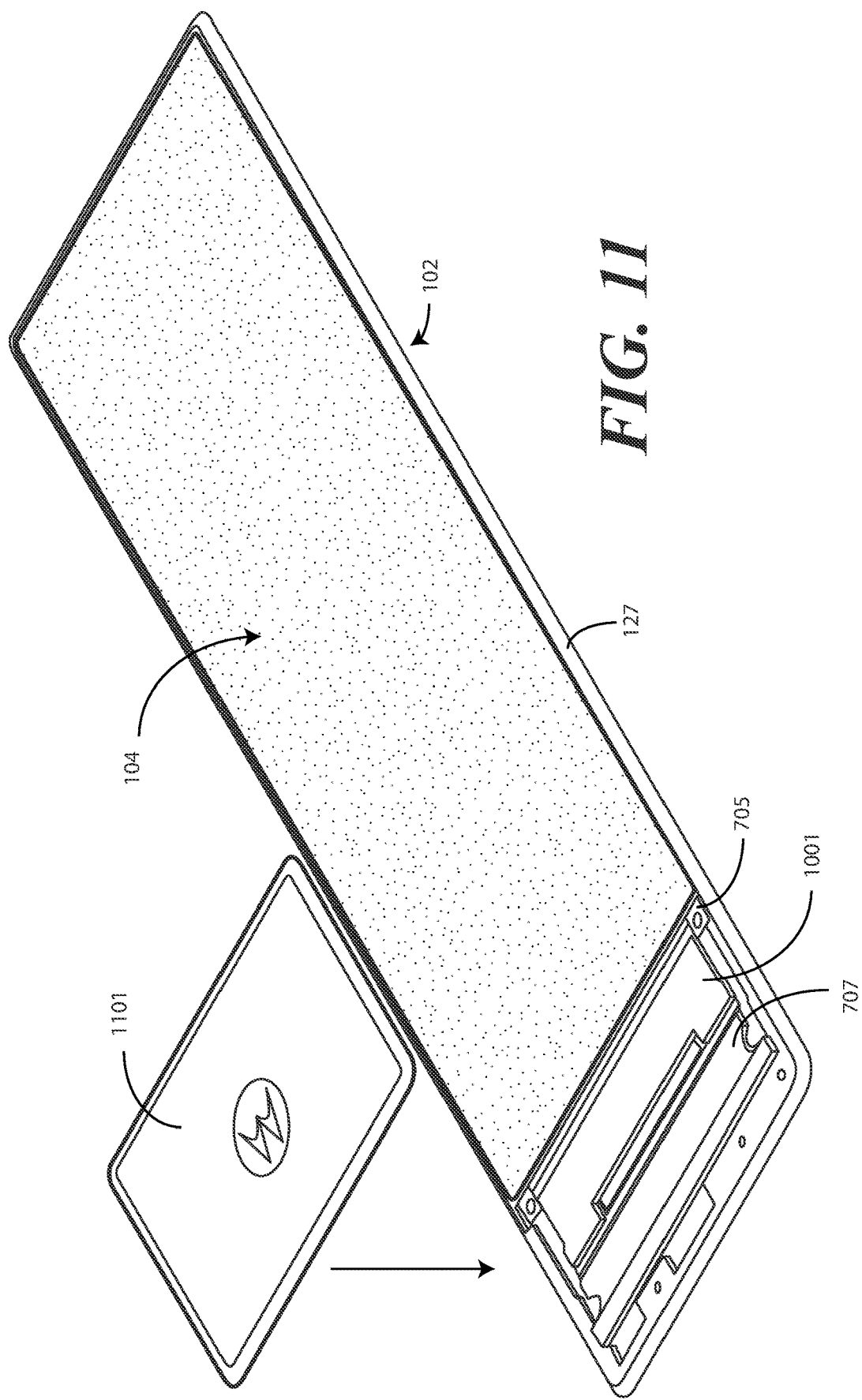
FIG. 11 illustrates explanatory display components in accordance with one or more embodiments of the disclosure.

Turning now to FIG. 11, illustrated therein is the flexible display 104 after being coupled to the blade assembly 102. As shown, the silicone border 127 surrounds the flexible display 104, with the silicone border 127 surrounding and abutting three sides of the flexible display layer (803).

Figure 12:
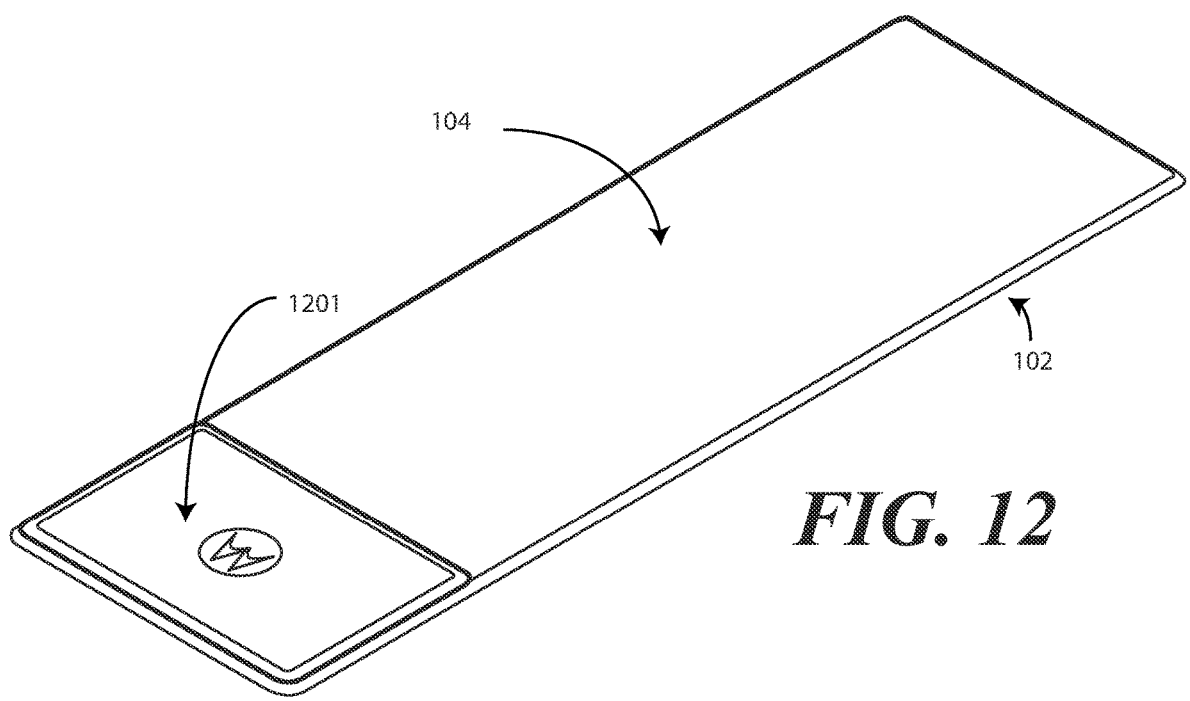
FIG. 12 illustrates one explanatory display assembly in an undeformed state.

A flexible substrate is then connected to the electronic circuits 1001 carried by the T-shaped tongue 807. Additionally, a tensioner can be coupled to the flexible substrate 805. Thereafter, a cover 1101 is attached to the silicone border 127 atop the electronic circuits 1001 and other components situated on or around the T-shaped tongue. This portion the blade assembly 102 where the components are stored beneath the cover 1101 is affectionately known as the "backpack." Turning to FIG. 12, illustrated therein is the blade assembly 102 with its backpack 1201 completely configured.

In one or more embodiments, the flexible display 104 and blade assembly 102 are configured to wrap around a minor surface of a device housing where a display roller mechanism is situated. In one or more embodiments, the display roller mechanism includes a rotor that is positioned within a curvilinear section of the flexible display 104 and blade assembly 102. When placed within a device housing of an electronic device, translation of a translation mechanism causes translation of the blade assembly 102, which in turn causes rotation of the rotor. The result is a linear translation of the flexible display 104 and blade assembly 102 across a translation surface of the device housing by drawing the flexible display 104 and the blade assembly 102 around the rotor.

Figure 13:
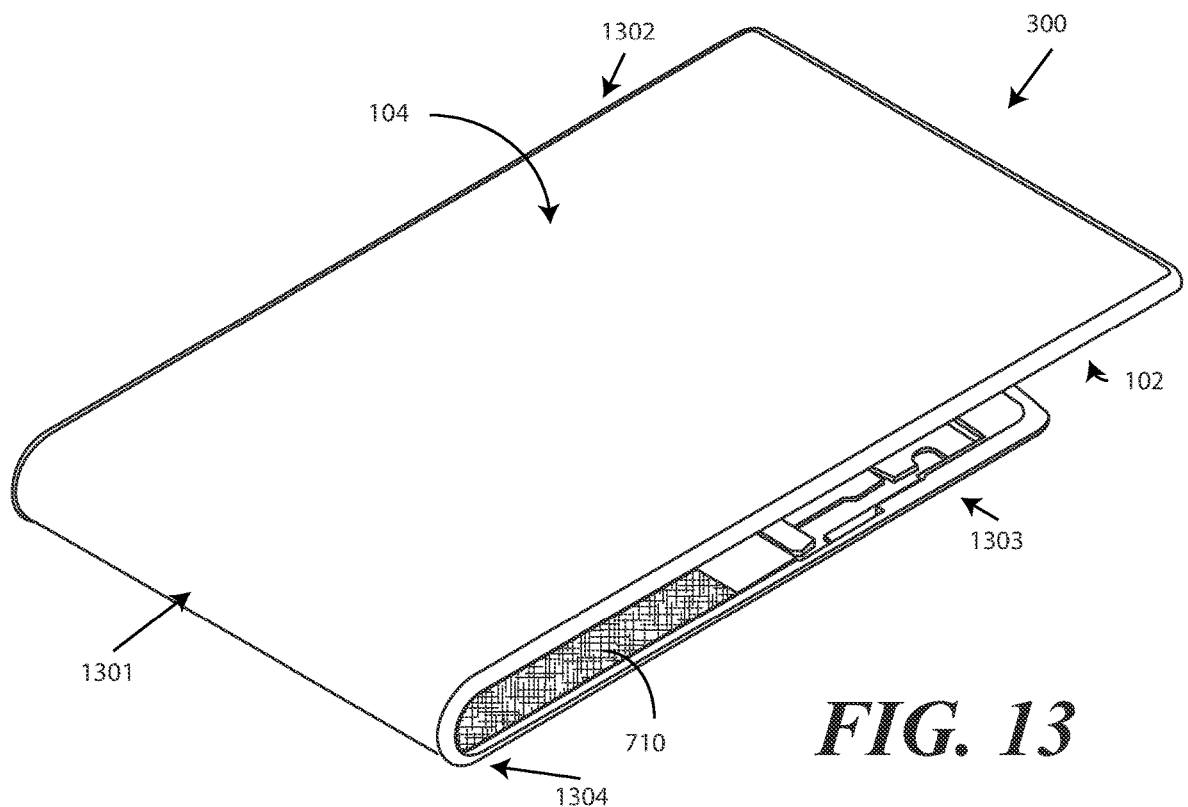
FIG. 13 illustrates the explanatory display assembly of FIG. 12 in a deformed state.
Figure 14:
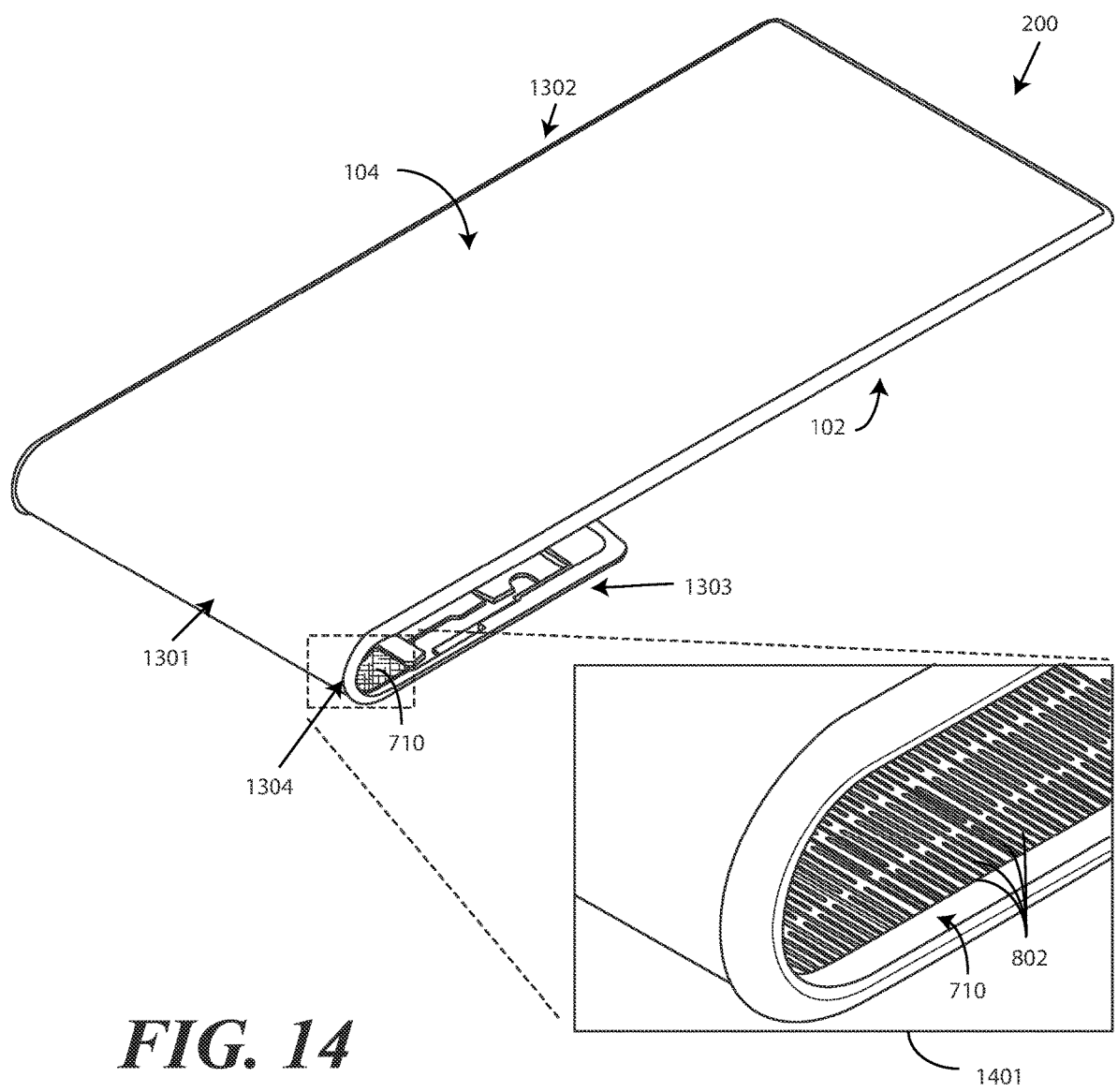
FIG. 14 illustrates the explanatory display assembly of FIG. 12 in another deformed state with an exploded view of a deformable portion of the display assembly shown in a magnified view.

That the blade substrate (125) of the blade assembly 102 includes a flexible portion (810) allows the blade assembly 102 and flexible display 104 to deform around a device housing, one example of which is the single device housing (101) of FIG. 1. Illustrating by example, turning now to FIGS. 13-14, illustrated therein is the blade assembly 102 and flexible display deformed to create a curvilinear section 1301 and two linear sections 1302,1303. The flexible display 104 and blade assembly 102 are shown as they would be in the retracted position 300 in FIG. 13. The flexible display 104 and the blade assembly 102 are shown as they would be in the extended position 200 in FIG. 14. The enlarged view 1401 of FIG. 14 shows how the apertures defined by the chemical etching of the blade substrate 125 easily allow the blade substrate 125 to bend around the curvilinear section 1301 while maintaining a rigid support structure beneath the flexible display 104 in the two linear sections 1302,1303.

In one or more embodiments, the first linear section 1302 and the second linear section 1303 are configured to slide between the retracted position 300 of FIG. 13 and the extended position 200 of FIG. 14. The flexible display 104 is coupled to the blade assembly 102 and therefore translates with the blade assembly 102 along a translation surface defined by a device housing of an electronic device.

In one or more embodiments, the linear sections 1302, 1303 of the blade assembly 102 are positioned between the flexible display 104 and the translation surface. A rotor is then positioned within a curvilinear section 1301 of the blade assembly 102. When a translation mechanism causes the linear sections 1302,1303 of the blade assembly 102 to move across the translation surface defined by the device housing, the rotor rotates with the flexible portion 810 passing along the rotor while the rotor rotates.

As shown in FIGS. 13-14, in one or more embodiments a cross section of both the blade assembly 102 and the flexible display 104 defines a J-shape with a curved portion of the J-shape, defined by the curvilinear section 1301, configured to wrap around a rotor and an upper portion of the J-shape, defined by linear section 1302, passing across a translation surface defined by a device housing. When the translators of a translation mechanism drive the blade assembly 102, the upper portion of the J-shape becomes longer as the flexible display 104 translates around the rotor with the blade assembly 102 extending further from of the device housing. This can be seen in FIGS. 13-14 by comparing the extended position 200 of FIG. 14 to the retracted position 300 of FIG. 13.

When the translators of the translation mechanism drive the blade assembly 102 in the opposite direction, e.g., driving the blade assembly 102 from the extended position 200 of FIG. 14 to the retracted position 300 of FIG. 13, the upper portion of the J-shape becomes shorter as the reverse operation occurs. Thus, when the translation mechanism drives the blade assembly 102 carrying the flexible display 104, the flexible display 104 deforms at different locations as it wraps and passes around the rotor.

It should be understood that a more traditional "J-shape" is principally defined when the blade assembly 102 is transitioned to the extended position 200 of FIG. 14. Depending upon the length of the blade assembly 102 and flexible display 104, combined with the amount the translation mechanism can cause the blade assembly 102 to slide around the rotor, the J-shape may transition to other shapes as well, including a U-shape where the upper and lower portions of the blade assembly 102 and/or flexible display 104 are substantially symmetrical. Such a U-shape forms when the blade assembly is in the peek position but is substantially formed in the retracted position 300 of FIG. 3. In other embodiments, depending upon construction, the blade assembly 102 may even transition to an inverted J-shape where the upper portion of the blade assembly 102 and/or flexible display 104 is shorter than the lower portion of the blade assembly 102 and/or flexible display 104, and so forth.

In one or more embodiments, the translators and rotor of the translation mechanism not only facilitate the "extension" of the flexible display 104 that occurs during an extending or "rising" operation, but also works to improve the reliability and usability of the flexible display 104 as well. This is true because the rotor defines a service loop 1304 in the curvilinear section 1301 with a relatively large radius compared to the minimum bending radius of the flexible display 104. The service loop 1304 prevents the flexible display 104 from being damaged or developing memory in the curved state occurring as the flexible display 104 defines the curvilinear section 1301 wrapping around the rotor in the extended position 200, retracted position 300, and peek position (500).

Using such a mechanical assembly, the flexible display 104 maintains a flat upper portion of the J-shape defined by the first linear section 1302 when sliding. Additionally, the flexible display 104 wraps tightly around the rotor with the lower portion of the J-shape defined by the second linear section 1303 remaining flat against the lower surface of a device housing as well. The blade assembly 102 and tensioner combination, which are rigidly affixed to the translation mechanism, precludes the flexible display 104 from crumpling or bunching when sliding around the device housing between the extended position 200, the retracted position 300, and the peek position (500). This rigid coupling combined with moving tensioner ensures a straight and true translation of the flexible display 104 across a first major surface of an electronic device, around the rotor of the electronic device positioned at a minor surface of the device housing, and across a second major surface of the electronic device.

In one or more embodiments additional support components can be attached to the blade assembly 102 to one or more of provide additional support for the flexible display 104, ease translation of the blade assembly 102 around a device housing, or combinations thereof.

As noted above, in one or more embodiments a blade assembly 102 is coupled to the flexible display 104. In contrast to sliding devices that include multiple device housings, embodiments of the disclosure provide an electronic device with a sliding display that includes only on device housing. The blade assembly 102 is configured as a mechanical chassis that allows the flexible display 104 to translate along a translation surface defined by major and minor surfaces of the single device housing.

In one or more embodiments, the blade assembly 102 also provides a mechanical support for portions of the flexible display 104 that extend beyond the top edge of the single device housing when the blade assembly 102 and flexible display 104 are in the extended position. The blade assembly 102 can include a blade substrate (125) that is unitary, but that defines both flexible portions and rigid portions. The blade substrate (125) can comprise the silicone border 127 that surrounds and protects the edges of the flexible display 104.

A low-friction dynamic bending laminate stack (128) and blade (126) can be positioned between the blade assembly 102 and the translation surfaces defined by the single device housing (101). In one or more embodiments, the blade (126) and the low-friction dynamic bending laminate stack (128) are positioned between the blade assembly 102 and the translation surfaces defined a device housing to which the blade assembly 102 is attached.

The blade (126) supports portions of the blade assembly 102 and flexible display 104 that extend beyond the top edge of the device housing when the blade assembly 102 is transitioned to the extended position. Since this blade (126) needs to be rigid to support those portions of the blade assembly 102 and the flexible display 104, it is not able to bend around the flexible portions of the blade substrate (125) of the blade assembly 102. To prevent gaps or steps from occurring where the blade (126) terminates, in one or more embodiments a low-friction dynamic bending laminate stack (128) spans the remainder of the blade assembly 102 and abuts the transition surfaces defined by the single device housing.

In one or more embodiments, the blade (126) comprises a layer of steel. In one or more embodiments, the blade (126) has a thickness that is greater than the thickness of either the blade substrate (125) of the blade assembly 102 or the flexible substrate (805) of the flexible display 104. Illustrating by example, in one or more embodiments the blade (126) comprises a layer of steel having a thickness of five hundred microns or 0.5 mils.

In one or more embodiments, the blade (126) comprises a rigid, substantially planar support layer. Illustrating by example, the blade (126) can be manufactured from aluminum, steel, or stainless steel in one or more embodiments. In another embodiment, the blade (126) is manufactured from a rigid thermoplastic sheet. Other materials can be used in manufacturing the blade substrate (125) as well. For example, nitinol can be used to manufacture the blade (126) as well.

In one or more embodiments, the blade (126) is the stiffest layer of the overall assembly. In one or more embodiments the blade (126) is manufactured from stainless steel with a thickness of about five hundred microns. In another embodiment, the blade (126) is manufactured from carbon fiber. Other materials from which the blade (126) can be manufactured will be obvious to those of ordinary skill in the art having the benefit of this disclosure.

In one or more embodiments, the low-friction dynamic bending laminate stack (128) comprises a plurality of layers. When assembled, the low-friction dynamic bending laminate stack (128) adds a layer to the blade assembly 102 that improves the lubricity of the overall assembly to allow for smooth motion of the blade assembly 102 and flexible display 104 across the translation surfaces of a device housing. Moreover, when abutting a blade (126), the low-friction dynamic bending laminate stack (128) prevents features on other layers of the assembly from degrading the ability of the blade assembly 102 and flexible display 104 to translate across those translation surfaces.

In one or more embodiments, the low-friction dynamic bending laminate stack (128) allows for "low-friction" sliding across a stationary surface combined with the ability to cyclically bend and/or roll around a rotor. In one or more embodiments, the low-friction dynamic bending laminate stack (128) interfaces and abuts the blade (126) to improve lubricity.

In one or more embodiments, the uppermost layer of the low-friction dynamic bending laminate stack (128) is a pressure sensitive adhesive layer. This pressure sensitive adhesive layer allows the low-friction dynamic bending laminate stack (128) to adhere to the underside of the blade assembly 102.

Beneath this pressure sensitive adhesive layer is a strain tolerant foam layer in one or more embodiments. Examples of strain tolerant foams suitable for use as the strain tolerant foam layer include silicone, low-density polyethylene, or other materials that provide sufficient thickness so as to allow the low-friction dynamic bending laminate stack (128) to match the thickness of the blade (126) while reducing internal stresses and allowing bending.

Beneath the strain tolerant foam layer is another pressure sensitive adhesive layer in one or more embodiments. This pressure sensitive adhesive layer couples a flexible substrate having a strain relief cutout pattern formed therein. The flexible substrate can be manufactured from metal or plastic or other materials. Illustrating by example, in one or more embodiments the flexible substrate comprises a steel layer with a thickness of about thirty microns. While thin, flexible steel works well in practice, it will be obvious to those of ordinary skill in the art having the benefit of this disclosure that other materials can be used for the flexible substrate as well. For instance, in another embodiment the flexible substrate is manufactured from a thin layer of thermoplastic material.

Another layer of pressure sensitive adhesive then couples the flexible substrate to a low-friction layer in one or more embodiments. In one or more embodiments, the low-friction layer comprises a substrate with Teflon.sup.™ attached thereto. In another embodiment, the low-friction layer comprises a layer of polytetrafluoroethylene, which is a synthetic fluoropolymer of tetrafluoroethylene. This material is best known for its non-stick properties and adds a lubricity to the low-friction dynamic bending laminate stack (128) that allows the overall assembly to slide smoothly. Moreover, the low-friction layer prevents the strain relief cutout pattern in the flexible substrate from snagging on surface imperfections and transitions on the device housing to which the assembly is attached. In short, the low-friction layer greatly improves the lubricity of the overall assembly.

FIGS. 15-20 illustrate the electronic device 100 of FIG. 1 as fully assembled in both the extended position 200 and retracted position 300. Embodiments of the disclosure contemplate that in addition to having distinctly unique utilitarian features, electronic devices configured in accordance with embodiments of the disclosure have distinctly unique ornamental features as well. Many of these ornamental features are visible in FIGS. 15-20.

FIG. 15 illustrates a front elevation view of the electronic device 100 in the extended position 200, while FIG. 16 illustrates a side elevation view of the electronic device 100 in the extended position 200. FIG. 17 then provides a rear elevation view of the electronic device 100 in the extended position 200 as well.

FIG. 18 illustrates a front elevation view of the electronic device 100 in the retracted position 300, while FIG. 19 illustrates a side elevation view of the electronic device 100 in the retracted position 300. FIG. 20 then provides a rear elevation view of the electronic device 100 in the retracted position 300.

As can be seen by comparing these figures, the blade assembly 102 is able to slide around the single device housing 101 such that the blade 126 slides away from the single device housing 101 to change the apparent overall length of the flexible display 104 as viewed from the front of the electronic device 100. The blade assembly 102 can also slide in an opposite direction around the single device housing 101 to the retracted position 300, where similar amounts of the flexible display 104 are visible on the front side of the electronic device 100 and the rear side of the electronic device 100. Graphics, images, user actuation targets, and other indicia can be presented anywhere on the flexible display 104, including on the front side of the electronic device 100, the rear side of the electronic device 100, or the lower end of the electronic device 100.

While much attention to this point has been paid to the unique translation of the blade assembly and flexible display between the extended position and the retracted position, one of the other truly unique features offered by embodiments of the disclosure occur when the blade assembly and flexible display transition to the peek position. Turning now to FIGS. 21-22, illustrated therein is the electronic device 100 in this peek position 500.

As shown in FIG. 21, in one or more embodiments when the blade assembly 102 and flexible display 104 transition to the peek position 500, the backpack 1201 moves toward beyond the retracted position (300) toward the rear-facing image capture devices 108. When this occurs, an upper edge 2101 of the blade assembly 102 moves below an upper edge 2102 of the single device housing 101. In one or more embodiments, this reveals a front-facing image capture device 501 that situates beneath the blade assembly 102 when the blade assembly 102 is in the retracted position (300).

In one or more embodiments, the translation of the blade assembly 102 and flexible display 104 to the peek position 500 occurs automatically. Illustrating by example, in one or more embodiments when the front-facing image capture device 501 is actuated, the one or more processors (114) of the electronic device 100 cause the blade assembly 102 to translate to the peek position 500, thereby revealing this image capture device 501. (In the explanatory embodiment of FIGS. 21-22, a loudspeaker 502 is also revealed.) Once image capture operations utilizing the image capture device 501 are complete, the one or more processors (114) can cause the blade assembly 102 to transition back to the retracted position, which again covers and occludes the image capture device 501.

In other embodiments, the transition to the peek position 500 is manually initiated through actuation of a button or other user interface control. Illustrating by example, a single press of the button 2103 might cause the blade assembly 102 to transition to the extended position (200), while a double press of the button 2103 causes the blade assembly 102 to return to the retracted position (300). A long press of the button 2103 may cause the blade assembly 102 to transition to the peek position 500 of FIG. 5, and so forth. Other button operation schema will be obvious to those of ordinary skill in the art having the benefit of this disclosure.

By positioning the front-facing image capture device 501 beneath the blade assembly 102 and its corresponding opaque blade (126) when in normal operation, embodiments of the disclosure provide a privacy guarantee to users of the electronic device 100. Said differently, by positioning the image capture device 501 beneath the blade assembly 102 and the flexible display 104 when these components are in either the retracted position (300) or the extended position (200), a user of the electronic device 100 is mechanically assured of privacy due to the fact that it is physically impossible for the image capture device 501 to perform image capture operations through the blade (126) of the blade assembly 102. Accordingly, even if the electronic device 100 is accessed by a hacker or other nefarious actor, the user can be assured that the image capture device 501 cannot capture images or videos while the blade assembly 102 and flexible display 104 are in the retracted position (300), the extended position (200), or in positions therebetween. Only when the blade assembly 102 and the flexible display 104 transition to the peek position 500, thereby revealing the image capture device 501, can the image capture device 501 capture front-facing images or front-facing videos.

Figure 23:
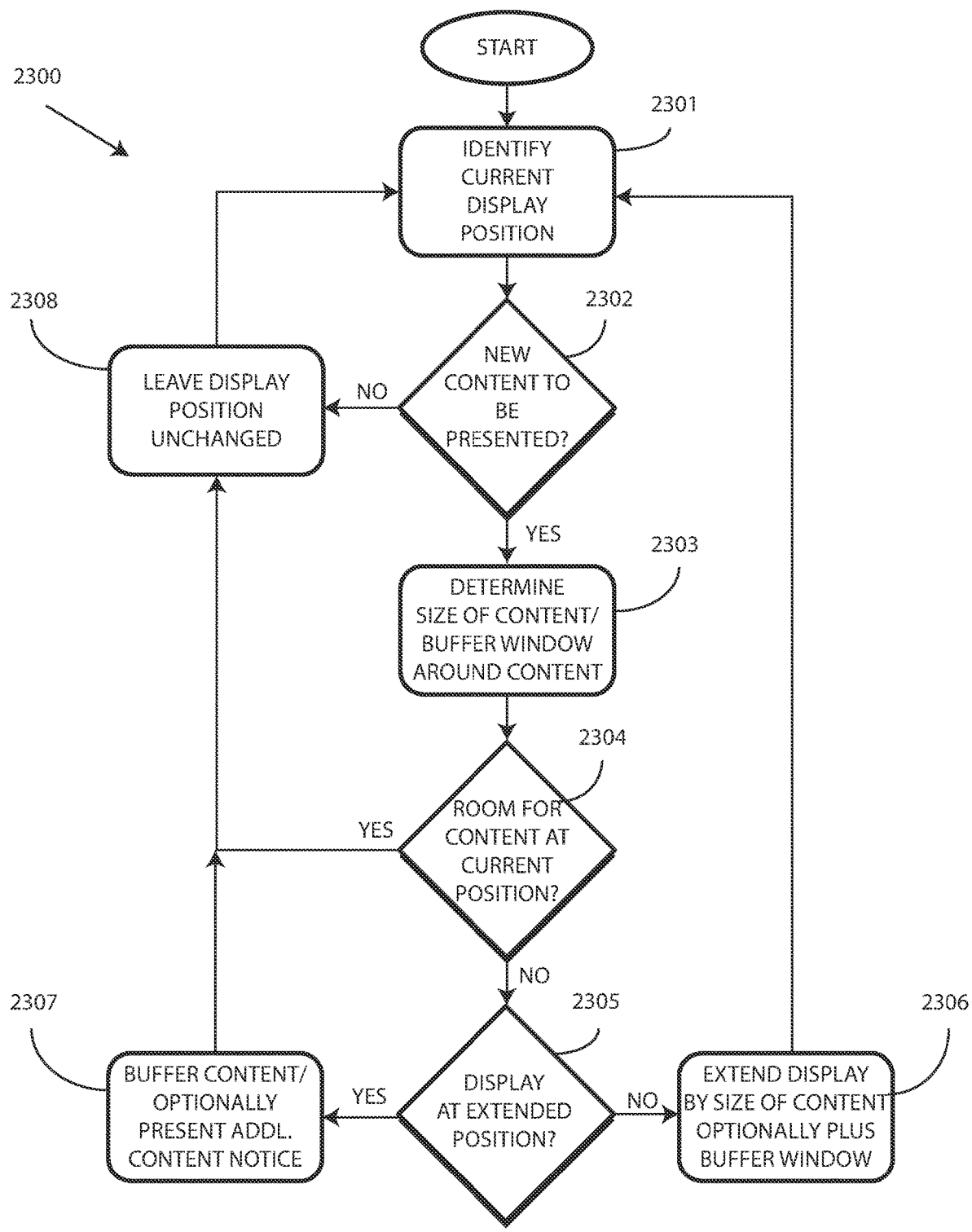
FIG. 23 illustrates one explanatory method in accordance with one or more embodiments of the disclosure.

Attention will now be turned to the former method (the automatic one) of moving the flexible display 104 and blade assembly 102 in accordance with one or more embodiments of the disclosure. Turning now to FIG. 23, illustrated therein is one explanatory method 2300 in accordance with one or more embodiments of the disclosure. The method 2300 of FIG. 23 is intended for use in an electronic device having a device housing, a blade assembly carrying a blade and a flexible display, with the blade assembly being slidably coupled to the device housing, a translation mechanism operable to slide the blade assembly relative to the device housing between at least an extended position and a retracted position, and one or more processors operable with the translation mechanism.

The method 2300 of FIG. 23 solves situations where the blade assembly of the electronic device is in a position where not all content items that need to be presented can be presented on a particular portion, e.g., the front-facing portion of the flexible display. Illustrating by example, if the electronic device is in a locked operating state and notifications are being presented on the front-facing portion of the flexible display, embodiments of the disclosure contemplate that there may be insufficient room to present all the notifications on the front-facing portion when the number of notifications is large. Advantageously, the method 2300 of FIG. 23 comprises transitioning, by a translation mechanism, a blade assembly carrying a blade and a flexible display, and that is slidably coupled to a device housing and moveable between an extended position, a retracted position, and a peek position, to a position between the retracted position and the extended position when content is to be newly presented on the flexible display. Accordingly, if the electronic device is in the retracted position and is presenting four notifications, and a fifth notification is received that would spill over the edge of the front-facing portion of the flexible display if presented, the method 2300 of FIG. 23 advantageously causes the blade assembly to transition from the retracted position toward the extended position to provide sufficient room for the fifth notification.

The method 2300 can be used when the electronic device is in an unlocked operating condition as well. Illustrating by example, if a user is employing an electronic device to read email, the translation mechanism may transition the blade assembly toward the retracted position when the user is reading a short email to maintain the electronic device in its most compact form factor. However, if the user starts to read a longer email, the translation mechanism may translate the blade assembly toward the extended position so that the longer email can be presented in its entirety.

The method 2300 of FIG. 23 can also be used in split-screen situations. In one or more embodiments, the method 2300 includes a translation mechanism transitioning the blade assembly carrying the blade and flexible display to a position between the extended position and the retracted position when split-screen content is to be newly presented on the flexible display. This split-screen content can include a first window presented by a first application and a second window presented by a second application, picture-in-a-picture content, or other types of split-screen content. Advantageously, embodiments of the disclosure satisfy the desire to make the front-facing portion of the flexible display expand as a function of content presentation that needs to be rendered in a given instance.

In one or more embodiments, one or more processors of the electronic device determine an area amount of the front-facing portion of the flexible display that is required for the presentation of content during a presently occurring activity. In one or more embodiments, the one or more processors then choose the closest possible size among the possible sizes afforded by the multitude of positions in which the blade assembly can be placed from the most compact, i.e., the retracted position or peek position, to the most expansive, i.e., the extended position.

Since this area amount of the front-facing portion can be changed automatically in the electronic device, in one or more embodiments the area amount of the front-facing portion of the flexible display is adapted at run time based upon an area needed to accommodate content to be presented. The method 2300 of FIG. 23 can be used when the electronic device is in a locked state or an unlocked state.

Illustrating by example, when the electronic device is in a locked state, if there are no pending notifications, the one or more processors of the electronic device can cause the translation mechanism to translate the blade assembly to the retracted position. However, as content to be newly presented on the front-facing portion of the flexible display is received, e.g., notifications, reminders, messages, and so forth, the one or more processors can cause the translation mechanism to translate the blade assembly toward the extended position so that there is sufficient real estate on the front-facing portion of the flexible display to present this content. This results in the area amount of the front-facing portion of the flexible display continuing to expand until it reaches the extended position and maximum "content presentation capacity" has been reached. Once the notifications are consumed, deleted, or otherwise removed from the front-facing portion of the flexible display, the one or more processors can cause the translation mechanism to translate the blade assembly back toward the retracted position.

When the electronic device is in an unlocked state, the method 2300 of FIG. 23 allows the area amount of the front-facing portion to be expanded per application and per activity. For instance, if a person is reading a short email, the translation mechanism can retain the blade assembly in the retracted position. However, if a longer email will not sufficiently fit on the front-facing portion of the flexible display when the blade assembly is in the retracted position, in one or more embodiments the method 2300 of FIG. 23 allows the translation mechanism to move the blade assembly toward the extended position so the longer email can be presented in its entirety. In one or more embodiments, this occurs automatically and without the need of a user executing a manual scroll command by manipulating a user interface control.

Thus, in one or more embodiments the method 2300 of FIG. 23 determines what content is required to be presented on a front-facing portion of the flexible display. The method 2300 then determines an area amount of the flexible display required to render that content. The method 2300 then chooses the position of the blade assembly that is closest to the retracted position while still allowing the area amount to be present so that the content can be presented. Advantageously, this maintains the electronic device in the most compact configuration possible while still presenting the content required.

Since the translation mechanism can translate the flexible display around the device housing, thereby expanding and contracting the amount of the flexible display positioned on the front-facing side of the electronic device, the method 2300 of FIG. 23 advantageously adapts so that front-facing portions of the flexible display are optimized to accommodate content that needs to be presented on the flexible display.

In some embodiments, the one or more processors of the electronic device query a foreground application to determine the area amount. Illustrating by example, in one illustrative embodiment the translation mechanism may transition the blade assembly toward the extended position such that the front-facing portion of the flexible display was large enough to show content items in a split-screen format when a user elects to consume picture-in-a-picture content. In other embodiments, the translation mechanism may translate the blade assembly toward the extended position such that the front-facing portion of the flexible display is large enough to present all content items associated with a particular application, e.g., all text messages received while the electronic device is in a locked state.

Turning to the particulars of the method 2300 of FIG. 23, at step 2301 one or more processors of an electronic device comprising a device housing, a blade assembly slidably coupled to the device housing and carrying a blade and a flexible display, and a translation mechanism operable to slide the blade assembly relative to the device housing between an extended position and a retracted position, determine where the blade assembly is relative to the device housing. Determining the position is necessary to determine whether a content presentation size identified at step 2303 will fit on a front-facing portion of the flexible display in one or more embodiments.

Decision 2302 determines whether there is content to be newly presented on the flexible display. Where content is to be newly presented on the display, the content can take various forms. Illustrating by example, the content can comprise notifications, calendar events, reminders, and so forth when the electronic device is in a locked state. When in an unlocked state, the content can comprise application output content, examples of which include lists of emails, query results, websites, documents, spreadsheets, pictures, videos, and so forth. The content can also comprise split-screen content. Examples of split-screen content include picture-in-a-picture content from a single application and multi-window content such as when a first application renders application output content in a first window and a second application renders other application output content in a second window. Additional examples of content to be newly presented on the flexible display will be illustrated and described below with reference to FIGS. 25-30. Still other examples will be obvious to those of ordinary skill in the art having the benefit of this disclosure.

Where no content is to be newly presented on the flexible display, the translation mechanism can leave the blade assembly in its current position at step 2308. However, when the one or more processors identify content to be newly presented on the flexible display, in one or more embodiments step 2303 determine a content presentation size of content that is to be newly presented on the flexible display. Illustrating by example, if the content determined to be newly presented at decision 2302 is that of an electronic communication application operating on the one or more processors, step 2303 may comprise the one or more processors determining a content presentation size of electronic communication messages that need to be presented on the flexible display, and so forth.

In one or more embodiments, the content presentation size comprises a size of a presentation item identifying the content to be newly presented on the flexible display. The content presentation size can optionally include the addition of a buffer window situated around the presentation item that causes the presentation item to appear physically separated from other presentation items presented on the flexible display.

Where the content to be newly presented on the flexible display comprises split-screen content, in one or more embodiments this split-screen content comprises at least a first window presented by a first application operating on the one or more processors of the electronic device and a second window presented by a second application operating on the one or more processors of the electronic device. In such an embodiment, the content presentation size may comprise a size of at least the first window, the second window, and optionally a buffer window situated around each of the first window and the second window. Where the content to be newly presented on the flexible display comprises picture-in-a-picture content, the content presentation size of the content may comprise an overall aspect ratio of the picture-in-a-picture content presentation, optionally with a buffer window situated around the picture-in-a-picture content presentation, and so forth.

Decision 2304 determines whether the content to be newly presented on the flexible display can be presented on the flexible display while the blade assembly is in its current position. Where it can, step 2308 leaves the blade assembly in its current position since there is sufficient room to accommodate the content presentation size determined at decision 2302 without translation of the blade assembly.

Where it cannot, decision 2305 determines whether the blade assembly carrying the flexible display is in the extended position. Where the blade assembly is in the retracted position, peek position, or a position between the retracted position and the extended position, step 2306 comprises the translation mechanism translating the blade assembly, which carries the blade and flexible display and is slidable around the device housing between an extended position, retracted position, and peek position, to a position accommodating the content presentation size determined at step 2303. In one or more embodiments, that position is between the extended position and the retracted position. Step 2306 also comprises the one or more processors presenting the content to be newly presented on the flexible display on the flexible display.

If the blade assembly is in the extended position, as determined at decision 2305, and there is insufficient room for the content to be newly presented on the flexible display as determined at decision 2304, the one or more processors can optionally buffer the content at step 2307. In one or more embodiments, step 2307 also comprises presenting a prompt on the flexible display indicating that there are additional content items to be viewed.

Figure 24:
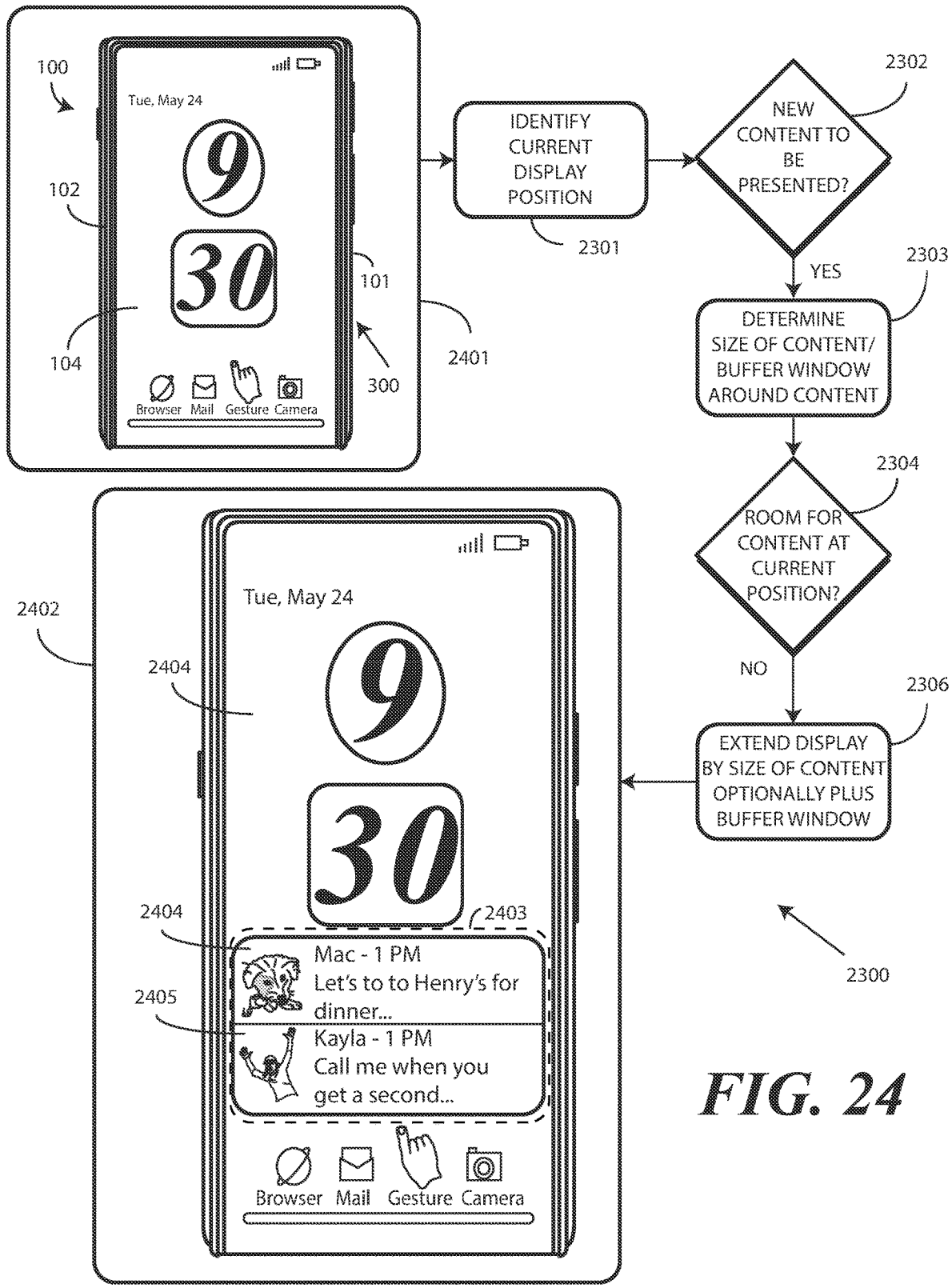
FIG. 24 illustrates another explanatory method in accordance with one or more embodiments of the disclosure.

Turning now to FIG. 24, illustrated therein is one explanatory example of how the method 2300 of FIG. 23 can be used to affect not only the presentation of content items on the flexible display 104 of an electronic device 100, but also the position of the blade assembly 102 relative to the device housing 101 of the electronic device.

Beginning at step 2401, the electronic device 100 is initially shown—for illustrative purposes—with the blade assembly 102 being in the retracted position 300. The electronic device 100 is also shown being in a locked state, with a default display being presented on the flexible display 104. In this illustration, the default display for the locked state presents the time of day, the date, and one or more user actuation targets with which a user can interact to launch applications or perform other operations.

At step 2301, one or more processors (114) of the electronic device 100 determine a position of the blade assembly 102 relative to the device housing 101. At decision 2302, the one or more processors (114) of the electronic device 100 identify that content is to be newly presented on the flexible display 104. In this illustrative example, since the electronic device 100 is in the locked state, the content identified to be newly presented on the flexible display 104 comprises notification content.

In other situations, the content identified at decision 2302 can take other forms. Illustrating by example, if the electronic device 100 were in an unlocked state, the content identified to be newly presented on the flexible display 104 at decision 2302 may comprise application output content, examples of which will be illustrated and described below with reference to FIGS. 27-28. In other embodiments, the content identified to be newly presented on the flexible display 104 at decision 2302 may comprise split-screen content, examples of which will be illustrated and described with reference to FIGS. 29 and 31. Other examples of the content identified to be newly presented on the flexible display 104 at decision 2302 will be obvious to those of ordinary skill in the art having the benefit of this disclosure.

At step 2303, the one or more processors (114) of the electronic device 100 determine a content presentation size 2403 of content to be newly presented on the flexible display 104. This step 2303 is performed because in one or more embodiments any transitioning of the blade assembly 102 by a translation mechanism to a position between the retracted position 300 and the extended position that allows content identified to be newly presented on the flexible display 104 at decision 2302 occurs as a function of a content presentation size of the content to be newly presented on the flexible display. As noted above, in one or more embodiments, the content presentation size 2403 comprises a size of a presentation item 2404 identifying the content to be newly presented on the flexible display 104. The content presentation size 2403 can optionally include another size of a buffer window situated around the presentation item 2404. Such buffer windows allow each presentation item 2404 to be set off from each other. In the illustrating by example of FIG. 24, the content identified to be newly presented on the flexible display 104 at decision 2302 comprises two presentation items 2404,2405, each of which is presented without a buffer window.

In this illustrative embodiment, each presentation item 2404,2405 comprises notifications of electronic communications of an electronic communication application operating on one or more processors (114) of the electronic device. In this illustrative embodiment, the content items comprise notifications of electronic communications in the form of email messages. However, other types of content items for which the method 2300 would work will be obvious to those of ordinary skill in the art having the benefit of this disclosure. Illustrating by example, the two or more content items may comprise notifications of text messages, chat messages, multimedia messages, electronic mail messages, or combinations thereof.

Decision 2304 determines whether it is necessary to translate the blade assembly 102 relative to the device housing 101 such that a front-facing portion of the flexible display 104 has sufficient area available to accommodate the content presentation size 2403. In this illustrative example, translation is required. This is true because the electronic device 100 is in the retracted position 300 at step 2301 and the content presentation size 2403 determined at decision 2304 is larger than are the open portions of the front-facing portion of the flexible display 104 around the default screen at step 2501.

Accordingly, step 2306 causes the translation mechanism to transition the blade assembly 102 to a position between the extended position and the retracted position (shown at step 2402) where a front-facing portion of the flexible display 104 has an area larger than the content presentation size 2403. Step 2402 then comprises the one or more processors (114) presenting the content identified to be newly presented on the flexible display 104 at decision 2302 in the form of the two presentation items 2404,2405 identifying notifications of electronic communications on the flexible display 104.

The method 2300 of FIG. 24 can then repeat as additional content is to be newly presented on the flexible display 104. Illustrating by example, when a new notification is received, as determined by decision 2302, step 2301 determine the current position of the blade assembly 102. Step 2303 can then determine the content presentation size of the additional content to be newly presented on the flexible display 104.

Decision 2304 can then determine whether the blade assembly 102 needs to be moved to present the additional content item. Since it will be based upon the state shown at step 2402, step 2306 can comprise again transitioning, by the translation mechanism, the blade assembly 102 to another position between the retracted position 300 and the extended position that is closer to the extended position when decision 2302 identifies that additional content is to be newly presented on the flexible display 104. Indeed, this process can continue to transition, by the translation mechanism, the blade assembly 102 toward the extended position as additional electronic communications are to be newly presented on the flexible display 104.

While the method 2300 of FIGS. 23 and 24 expands the electronic device 100 when the translation mechanism translates the blade assembly 102 from the retracted position toward the extended position to accommodate a content presentation size 2403 for the content items to be newly presented on the flexible display 104, embodiments of the disclosure contemplate if the number of content items to be newly presented on the flexible display 104 in common grows too large, the content presentation size 2403 may be too big for the front-facing portion of the flexible display 104 when the blade assembly 102 is in the extended position. At the same time, a user of the electronic device 100 may still want to see the newly arriving content items. In such a situation, step (2307) can comprise the one or more processors can optionally buffering the newly received content. In one or more embodiments, step (2307) also comprises presenting a prompt on the flexible display indicating that there are additional content items to be viewed.

Other techniques can be used as well. Illustrating by example, if the blade assembly 102 is fully positioned at the extended position when decision 2302 identifies additional content to be newly presented on the flexible display 104, the one or more processors (114) can at least partially collapse an earlier electronic communication presentation and then present the additional content to be newly presented on the flexible display 104.

Thus, to recap the method 2300 of FIGS. 23-24, with reference to these figures collectively, in one or more embodiments the method 2300 provides an automatic translation of a blade assembly that carries a flexible display and is slidably coupled to the device housing such that the blade assembly is slidable between an extended position, a retracted position, and optionally a peek position in accordance with one or more embodiments of the disclosure when content is to be newly presented on the flexible display and there is insufficient room for that content (translation toward the extended position), or alternatively when content is removed from the flexible display leaving excess space on the flexible display (translation toward the retracted position).

At step 2301, one or more processors of the electronic device determine the position of the flexible display by detecting the position of the blade assembly relative to the device housing. This can be done in a variety of ways. In one or more embodiments, a rigid portion of the blade substrate of the blade assembly can define one or more apertures. These apertures can be used to contain magnets. Hall-effect sensors positioned in the device housing to which the blade assembly is coupled can then detect the positions of these magnets such that the one or more processors of the electronic device can determine whether the blade assembly and flexible display are in the extended position, the retracted position, the peek position, or somewhere in between. Other techniques will be obvious to those of ordinary skill in the art having the benefit of this disclosure.

Decision 2302 then determines whether new content items need to be presented. Where they do, step 2303 comprises one or more processors of the electronic device determining an area amount of the flexible display that is required to present the new content items.

Decision 2304 then determines whether there is sufficient space on the front-facing portion of the flexible display to accommodate the area amount for the new content items. Decision 2305 determines whether the blade assembly is already in the extended position. This occurs because the translation mechanism only transitions toward the extended position for the presentation of additional, new content when the blade assembly is situated between the extended position and the retracted position when the two or more content items are selected at step 2303.

Where this is the case, step 2306 comprises causing the blade assembly to translate toward the extended position by the area amount determined at step 2303. The area amount can optionally include a buffer window situated around each new content item. The method 2300 can repeat with step 2306 causing the blade assembly to again translate toward the extended position as third, fourth, and fifth content items are to be newly presented on the display, as determined at decision 2302, until the blade assembly reaches the extended position.

When decision 2305 determines that the blade assembly is in the extended position, optional step 2307 can comprise buffering additional content items that would otherwise be newly presented on the flexible display. Step 2307 can further include presenting a notification on the flexible display that additional content items are available for display. Where this occurs, since the front-facing portion of the flexible display has been "maxed out" due to the fact that the blade assembly is transitioned to the extended position, step 2308 can comprise leaving the blade assembly in the extended position.

Figure 25:
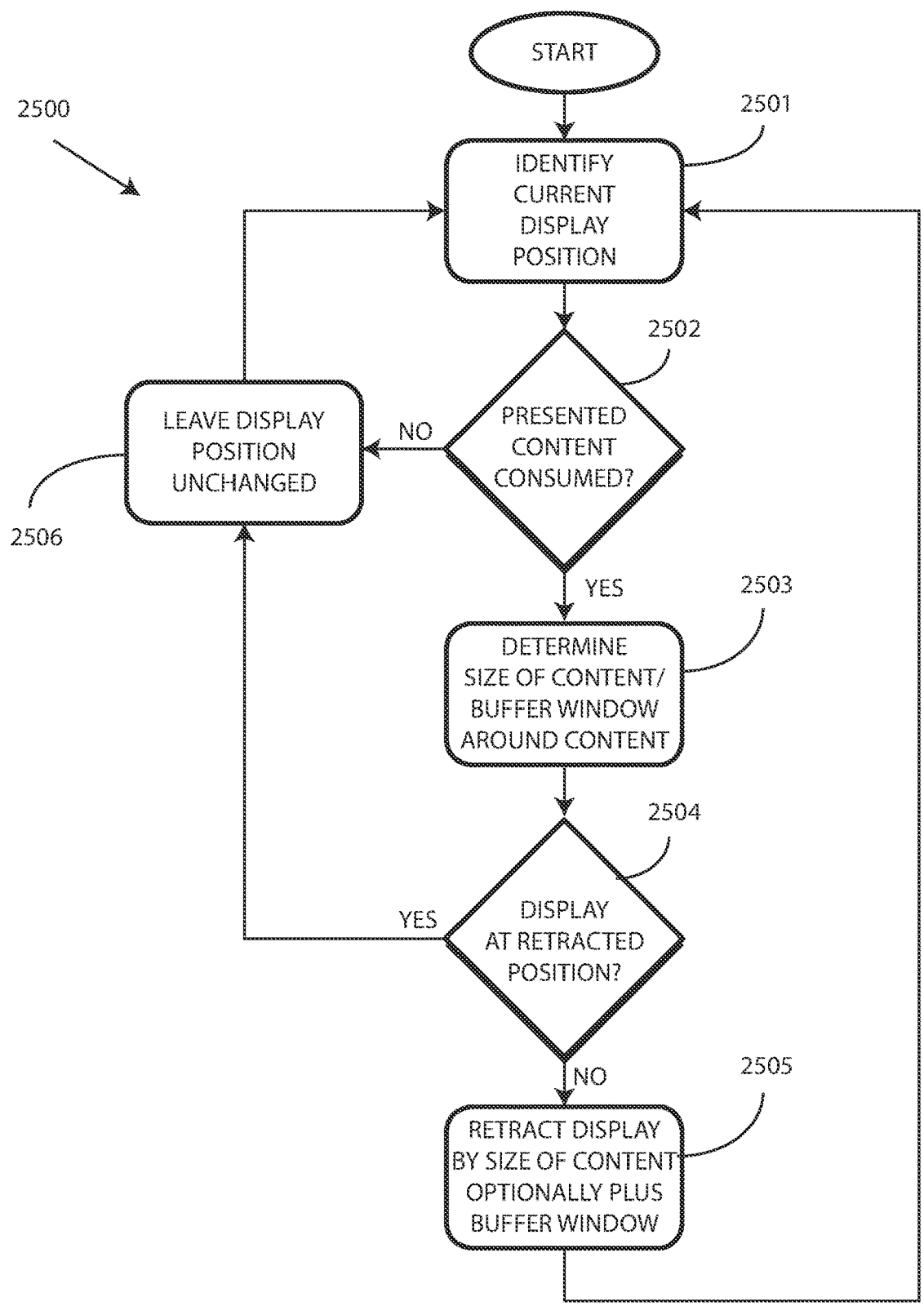
FIG. 25 illustrates another explanatory method in accordance with one or more embodiments of the disclosure.

While the method 2300 of FIGS. 23-24 expands the electronic device when the translation mechanism translates the blade assembly from the retracted position toward the extended position to accommodate a content presentation size for the content items to be newly presented on the flexible display, embodiments of the disclosure contemplate that the translation mechanism can perform a reverse operation when content items are consumed, deleted, or otherwise removed from the flexible display. Turning now to FIG. 25, illustrated therein one explanatory method 2500 for doing so.

Step 2501 determines the current position of the blade assembly as previously described. Decision 2502 then detects whether content items are being consumed. As used herein, "consumed" means that a user or an application interacts with, deletes, saves, manipulates, or otherwise deals with a content item such that it need not be displayed any longer on the flexible display. Where it has, the method 2500 moves to step 2503. Otherwise, the position of the blade assembly remains unchanged at step 2506.

Step 2503 then comprises determining a content presentation size of the remaining content items after one or more content items have been consumed. Decision 2504 then determines whether the blade assembly is in the retracted position. Where it is, the front-facing portion of the flexible display cannot be reduced any further and the electronic device is in the most compact position. Accordingly, the blade assembly is left in place at step 2506.

However, where the blade assembly is not in the retracted position, consumption of one or more content items allows the blade assembly to be translated back toward the retracted position in an effort to maintain the electronic device in its most compact form factor. Accordingly, step 2505 can comprise transitioning, by the translation mechanism, the blade assembly toward the retracted position by an amount corresponding to the area previously occupied by the consumed content.

Figure 26:
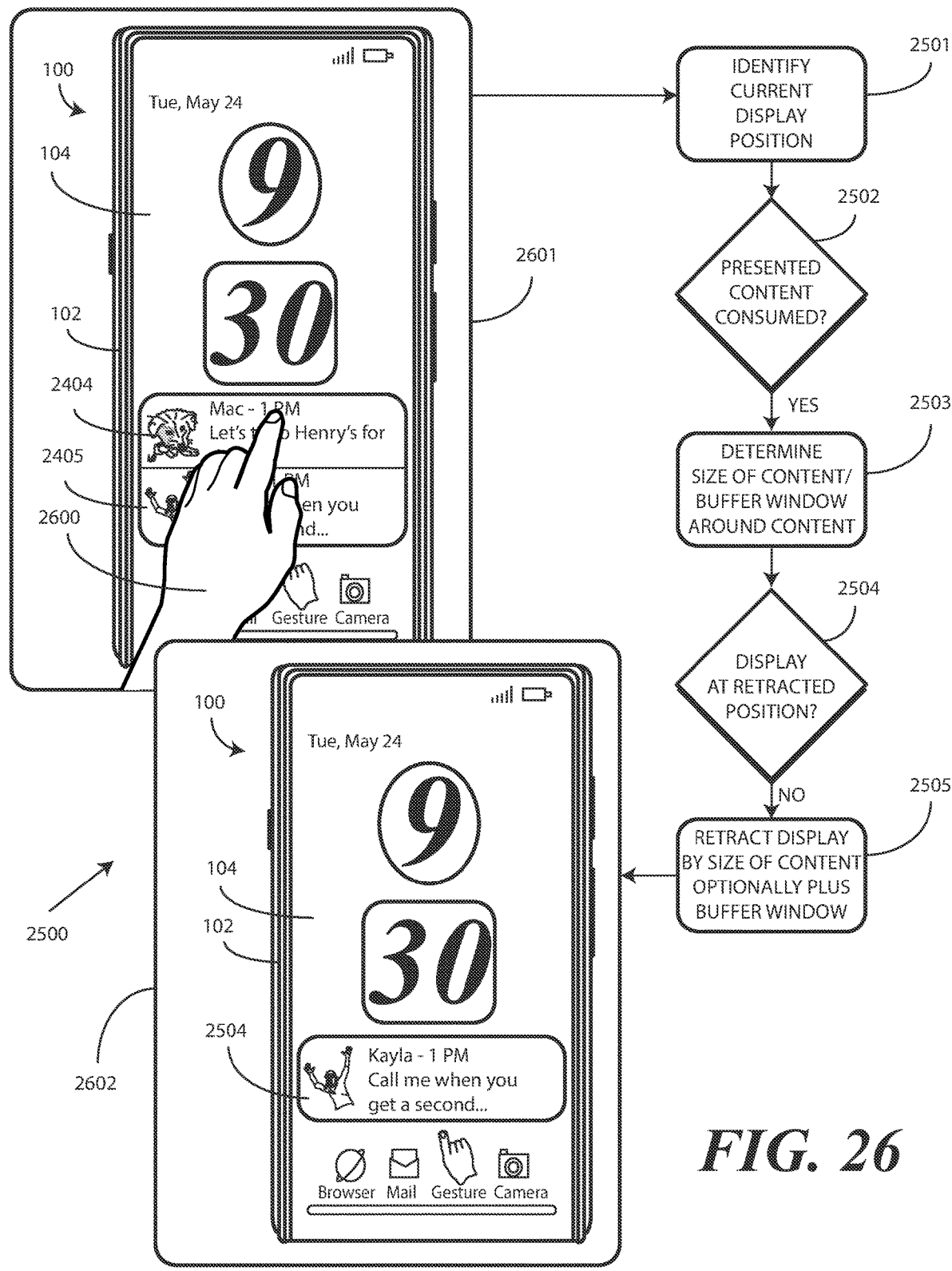
FIG. 26 illustrates still another explanatory method in accordance with one or more embodiments of the disclosure.

Turning now to FIG. 26, illustrated therein is the method 2500 of FIG. 25 in action. At step 2601, a user 2600 is interacting with a presentation item 2404 presented on the flexible display 104 of an electronic device 100 having a blade assembly 102 carrying the flexible display 104, with the blade assembly 102 being slidable around the device housing 101 of the electronic device 100 between an extended position, a retracted position, and optionally a peek position. In this illustrative example, the user 2600 is dismissing the message since the user 2600 can determine that it is not important since the user 2600 already has already confirmed with Mac via a phone call that lunch will be at Henry's later in the day.

Step 2501 determines the current position of the blade assembly 102 as previously described. At step 2601, the blade assembly 102 is situated at a position between the extended position and the retracted position so that the presentation items 2404,2405, each of which is a notification, can be presented along with the default locked mode screen layout.

Decision 2502 then detects that presentation item 2404 has indeed been consumed by way of the user 2600 delivering user input to the flexible display 104 to dismiss the presentation item 2404. Accordingly, the method 2500 moves to step 2503.

Step 2503 then comprises determining a content presentation size of the remaining content items, which in this example consists of a notification defined by presentation item 2405 after presentation item 2404 has been consumed. Decision 2504 then determines whether the blade assembly is in the retracted position. Since the blade assembly 102 is not in the retracted position in this example, consumption of one or more content items allows the blade assembly 102 to be translated back toward the retracted position in an effort to maintain the electronic device 100 in its most compact form factor. Accordingly, step 2505 can comprise transitioning, by the translation mechanism, the blade assembly 102 toward the retracted position by an amount corresponding to the area previously occupied by the consumed content. Said differently, the transitioning of step 2505 from the position between the retracted position and the extended position toward the retracted position in response to consumption of the content defined by presentation item 2404 occurs as a function of a content presentation size of the content in one or more embodiments.

As shown at step 2602, the electronic device 100 is now in a more compact position. The electronic device 100 is also in the locked state with the remaining notification defined by presentation item 2405 presented on the flexible display 104. It should be noted that this method 2500 can continue to retract the blade assembly 102 toward the retracted position as content continues to be consumed until the blade assembly reaches the retracted position.

Figure 27:
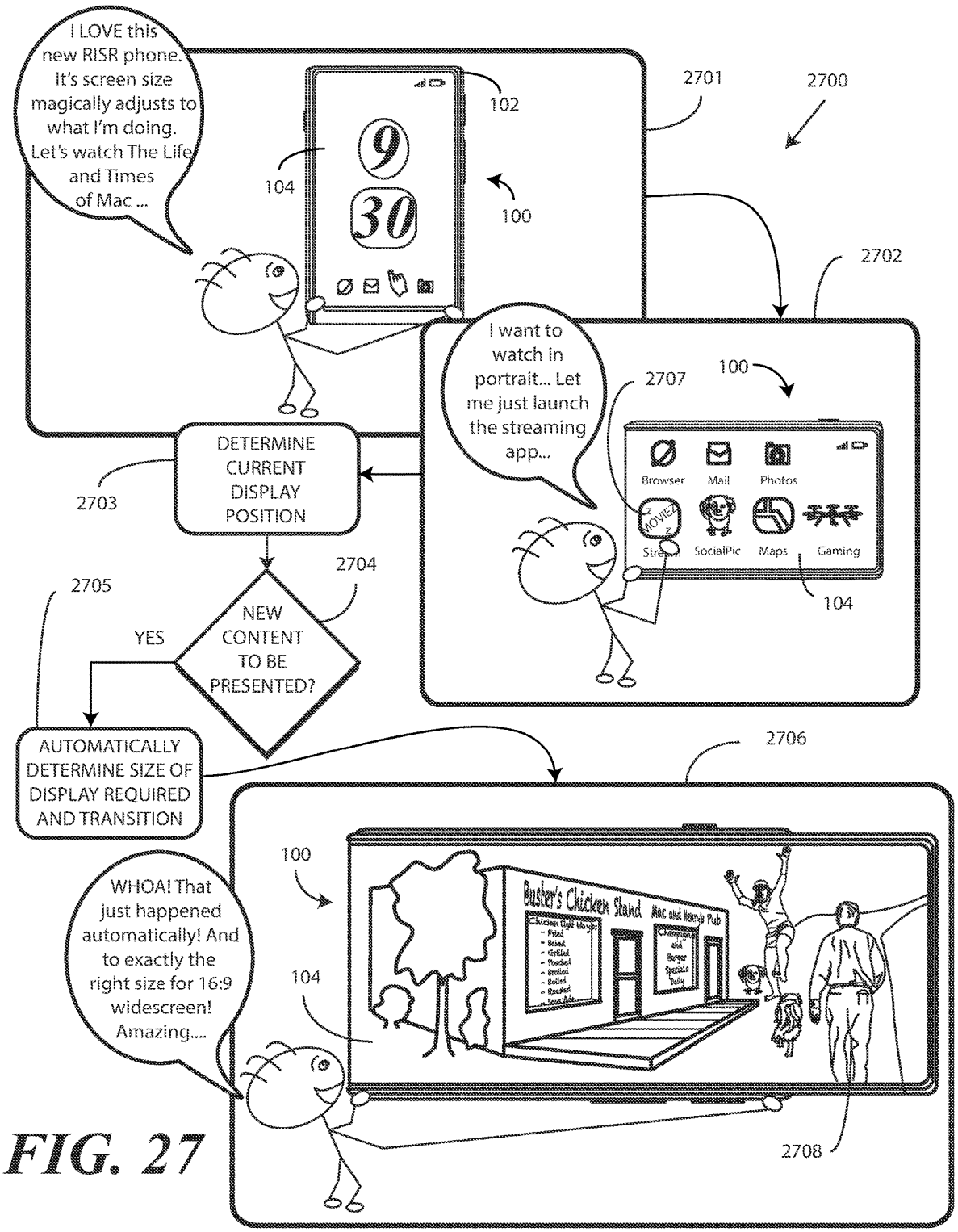
FIG. 27 illustrates another explanatory method in accordance with one or more embodiments of the disclosure.

FIGS. 24 and 26 illustrated the methods (2300),2500 of FIGS. 23 and 25 when the electronic device 100 was in a locked state. Consequently, the content to be newly presented on the flexible display 104, as well as the content consumed, were in the form of notifications that are presented on the flexible display 104 when the electronic device 100 is in the locked state. However, these methods (2300), 2500 can also be used when the electronic device 100 is in the unlocked state. In one or more embodiments, when the transitioning to accommodate content to be newly presented on the flexible display 104 occurs while the electronic device 100 is in the unlocked state, the content to be newly presented on the flexible display 104 comprises application output content. Turning now to FIG. 27, illustrated therein is another method 2700 illustrating how embodiments of the disclosure can work when an electronic device 100 is in an unlocked state.

As shown in FIG. 27, a method 2700 of automatically transitioning a translating display between an extended position and retracted position when content is to be newly presented on a flexible display 104 is shown. In FIG. 27, and in particular beginning at step 2702, the electronic device 100 is in the unlocked state and the content to be newly presented on the flexible display 104 comprises application output content. In this illustration, the application is a video streaming application and the application output content is a movie. However, it will be obvious to those of ordinary skill in the art having the benefit of this disclosure that the application output content can take other forms for other applications. Illustrating by example, if the application is a gaming application, the application output content may be a game, and so forth.

Beginning at step 2701, a user has an electronic device 100 configured in accordance with one or more embodiments of the disclosure. The electronic device 100 has a translating display comprising a flexible display 104 and a blade assembly 102. At step 2701, the translating display is in the retracted position. At step 2701, the electronic device 100 is in the portrait orientation in three-dimensional space.

As shown at step 2701, the user, particularly enamored with the new electronic device 100, wants to watch the new hit movie, "The Life and Times of Mac." However, to be sure to get a fully immersive experience, the user first turns the electronic device 100 to the landscape orientation in three-dimensional space at step 2702. Additionally, the user delivers user input to the flexible display 104 at step 2702 to launch a video streaming application 2707. While the video streaming application 2707 is one explanatory example of an application, the application could take other forms as well. Illustrating by example, in other embodiments the application could be a gaming application and so forth.

At step 2703, the one or more processors (114) of the electronic device determine the current position of the blade assembly 102 and flexible display 104. Decision 2704 then determines that the video streaming application 2707 has content to be newly presented on the flexible display 104. Since the electronic device 100 is in the unlocked state, the content to be newly presented on the flexible display 104 comprises a movie, which constitutes application output content from the video streaming application 2707.

Step 2705 then determines an area of the flexible display 104 required to newly present the content on the flexible display. This can be done in a variety of ways. In the illustrative embodiment of FIG. 27, the one or more processors (114) of the electronic device query the video streaming application 2707, which is the application requesting to newly present content on the flexible display 104, for the area of the flexible display 104 required to present the content on the flexible display 104. Illustrating by example, in one or more embodiments the video streaming application 2707, in response to the query from the one or more processors (114), provides an optimal list of aspect ratios that provide the best performance for the movie. In one or more embodiments, the one or more processors (114) of the electronic device 100 then calculate the corresponding content presentation size for each aspect ratio at step 2705.

Step 2705 then comprises the one or more processors (114) of the electronic device 100 causing the translation mechanism to translate the blade assembly 102 to a position between the retracted position and the extended position as a function of the area of the flexible display 104 required to accommodate the content presentation size of the movie. In addition, the video streaming application 2707 then starts the movie in the perfect aspect ratio for optimal viewing, thereby allowing the user to marvel at the beautiful images on the immersive display.

The result is shown at step 2706. In this example, the content comprises multimedia content 2708 in the form of a movie. Additionally, the area of the flexible display 104 required to present the multimedia content 2708 on the flexible display 104 is defined by an aspect ratio the video streaming application 2707 utilizes to present the multimedia content 2708. Had the application been a gaming application, the area of the flexible display 104 required to present the application output content may have been defined by optimal dimensions of a gaming portal, and so forth.

When the one or more processors (114) identify consumption or cessation of the presentation of the multimedia content 2708 on the flexible display 104, e.g., when the user finishes watching the movie, the one or more processors (114) can cause the translation mechanism to translate the blade assembly 102 back toward the retracted position shown at step 2701.

As shown at step 2706, the user is simply and completely blown away, nearly believing that the electronic device 100 only desires perfection in all of his experiences. The method 2700 of FIG. 27 is completely intuitive, as no user experimentation is required to figure out at what position the flexible display 104 should be in for the optimal viewing experience. Instead, the one or more processors (114) of the electronic device 100 automatically change the position of the flexible display 104 to one perfectly suited for the design of the video streaming application 2707. This type of happiness is just another of the many benefits offered by embodiments of the disclosure. Others have been described above. Still others will be obvious to those of ordinary skill in the art having the benefit of this disclosure.

Figure 28:
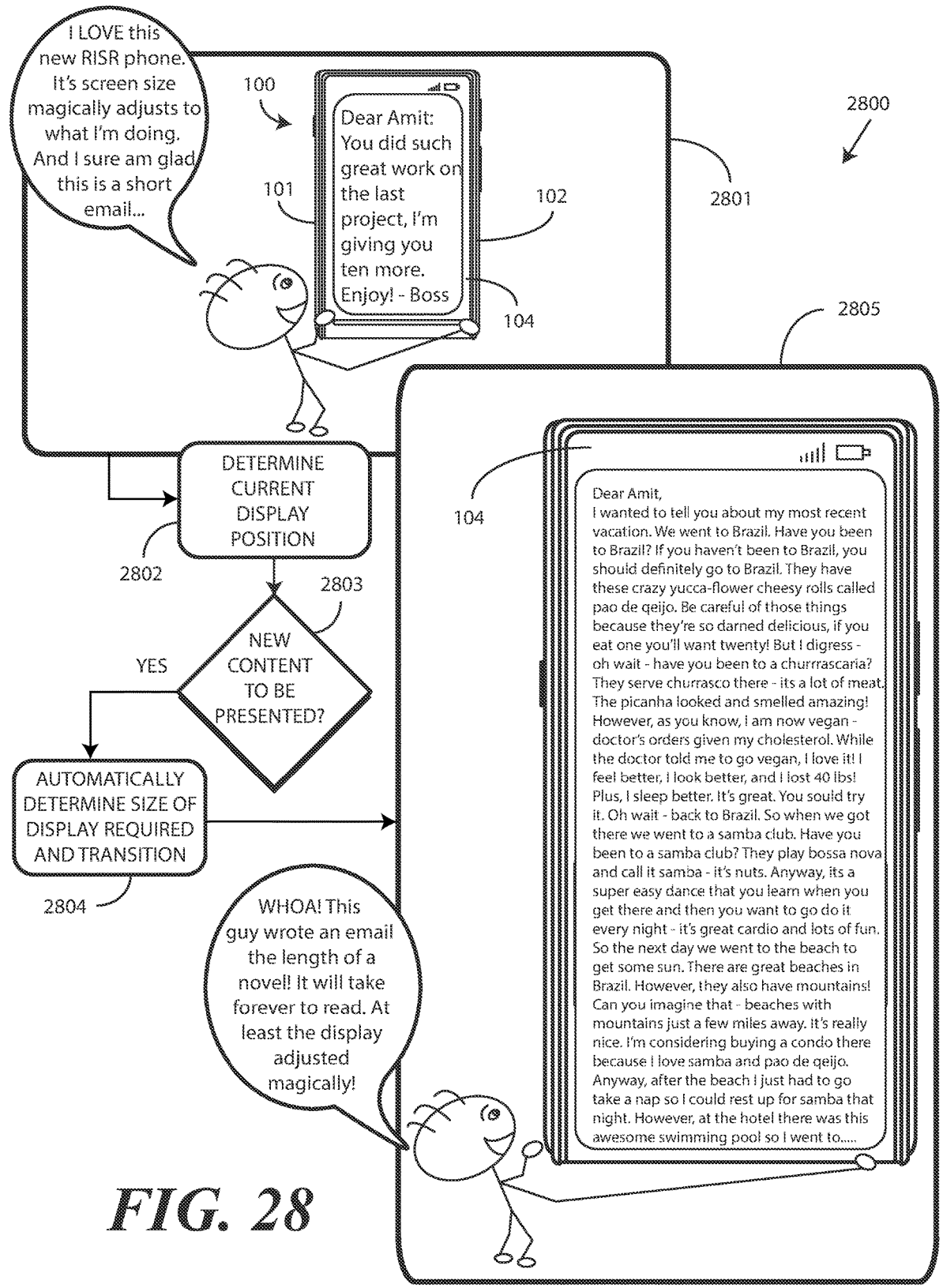
FIG. 28 illustrates still another explanatory method in accordance with one or more embodiments of the disclosure.

Turning now to FIG. 28, illustrated therein is another method 2800 of causing a blade assembly 102 of an electronic device 100 to translate when the electronic device 100 is in the unlocked state and content is to be newly presented on a flexible display 104 carried by the blade assembly 102 while the blade assembly 102 is slidable around a device housing 101 between a retracted position and an extended position, and optionally a peek position. In this example, the application operating on the one or more processors (114) of the electronic device 100 is an electronic communication application, and more particularly an email application. Accordingly, the application output content comprises emails.

As show at step 2801, a user is using an electronic device 100 having a flexible display 104 carried by a blade assembly 102 that is slidable around a device housing 101 between a retracted position and an extended position to read an email message. The email message is relatively short. Accordingly, its entirety fits on the flexible display 104 when the electronic device 100 is in the retracted position of step 2801. That the flexible display 104 is in the retracted position is identified by one or more processors (114) of the electronic device at step 2802.

Once the user is done reading the email, he delivers user input to the flexible display 104 causing the electronic communication application to remove the email from the flexible display 104. Since the user wants to read another email, decision 2803 determines that there is content to be newly presented on the flexible display 104. In one or more embodiments, this occurs when the one or more processors (114) of the electronic device 100 receive a request from an electronic communication application operating on the one or more processors (114) to present new content in the form of another email on the flexible display 104.

At step 2804, the one or more processors (114) of the electronic device 100 obtain, form the electronic communication application, an area amount of the flexible display 104 required to present the new content. As shown at step 2805, the next email message is really, really long. Accordingly, the front-facing area amount of the flexible display 104 when in the retracted position of step 2801 is insufficient to present this massive email.

As such, step 2804 comprises the one or more processors (114) causing a translation mechanism to translate the blade assembly 102 toward the extended position by the area amount received from the electronic communication application. As shown at step 2805, this allows the massive email, which constitutes the application output content of the electronic communication application, to be presented on the flexible display 104. As noted before, in one or more embodiments step 2805 only translates the blade assembly 102 toward the extended position when the blade assembly 102 is situated between the extended position and the retracted position when decision 2803 determines that content is to be newly presented on the flexible display 104 when the request from the electronic communication application to do so is received. Moreover, once the massive email is read, i.e., once the one or more processors (114) receive indicia of cessation of the presentation of the new content defined by the massive email on the flexible display 104, the translation mechanism can cause the blade assembly 102 to translate toward the retracted position by the area amount.

Figure 31:
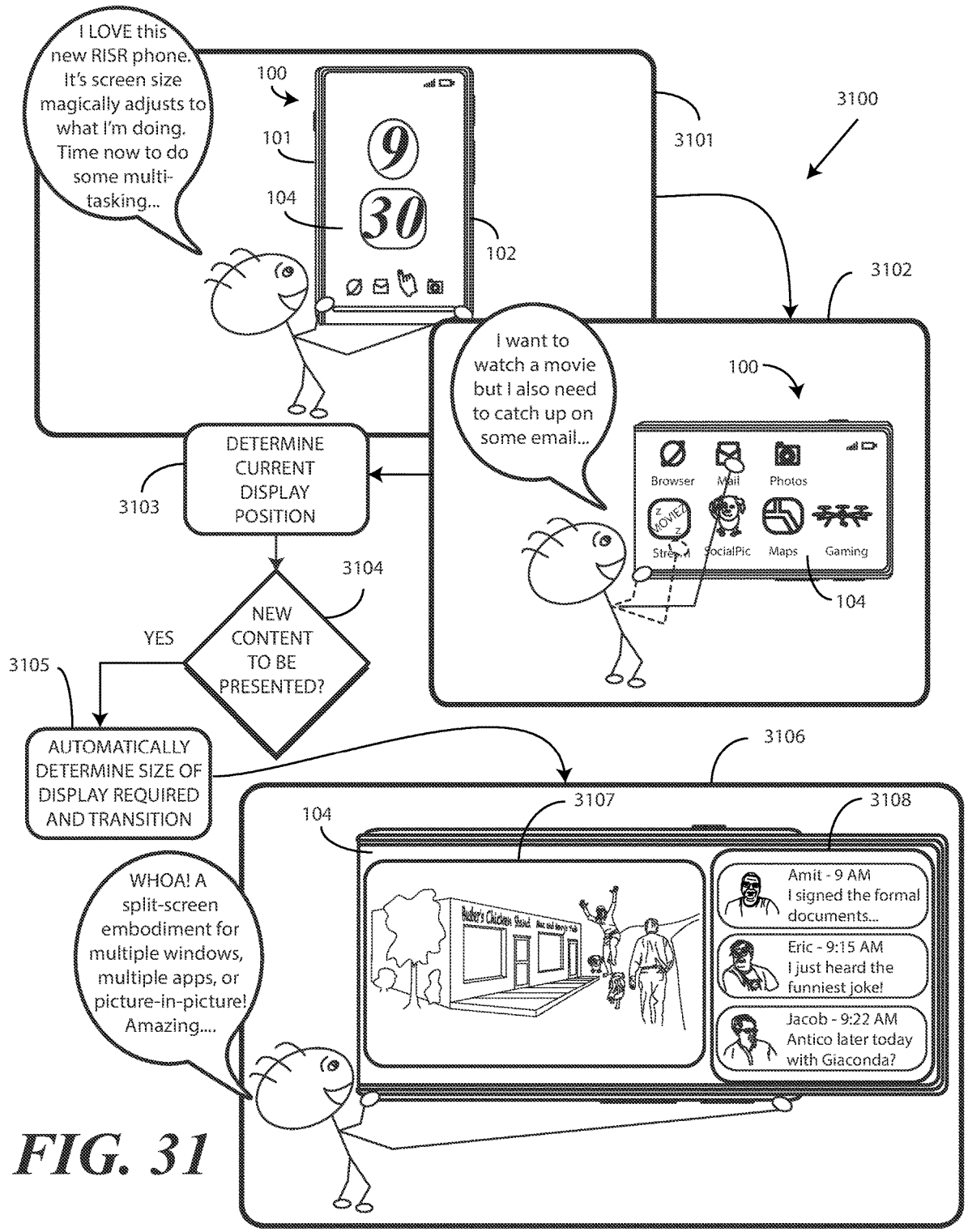
FIG. 31 illustrates yet another explanatory method in accordance with one or more embodiments of the disclosure.

To this point, the content to be newly presented on the display has been singular. For example, the content to be newly presented on the display in FIGS. 24 and 26 was notification content due to the fact that the electronic device was in a locked state. By contrast, the content to be newly presented on the display in FIGS. 27-28 was application output content due to the fact that the electronic device was in an unlocked state. While these are two examples of content that is identified to be newly presented on the display, embodiments of the disclosure are not so limited. In still other embodiments, the content to be newly presented on the flexible display can comprise split-screen content. Moreover, the split-screen content can be presented in different ways, with auxiliary content that is complementary to primary content being presented on a rear-facing portion of the flexible display while the primary content is presented on the front-facing portion of the flexible display. An example of this is shown in FIG. 29. In other embodiments, split-screen content can be presented on the front-facing portion of the flexible display. An example of this is shown in FIG. 31. Other examples of presentation of split-screen content will be obvious to those of ordinary skill in the art having the benefit of this disclosure.

Accordingly, in one or more embodiments a method comprises translating, by a translation mechanism, a blade assembly that carries a blade and flexible display and that is slidably coupled to a device housing and moveable between an extended position, and optionally a peek position, to a position between the retracted position and the extended position when split-screen content is to be newly presented on a flexible display. FIGS. 29 and 31 illustrate two explanatory methods by which this can occur.

Turning now to FIG. 29, illustrated therein is a method 2900 for translating a blade assembly 102 of an electronic device 100 to a position between a retracted position and an extended position when split-screen content is to be newly presented on the flexible display 104 carried by the blade assembly 102. In FIG. 29, the blade assembly 102 is slidable around a device housing 101 of the electronic device 100 between an extended position and a retracted position, and optionally a peek position.

Beginning at step 2901, a user 2600 of the electronic device 100 delivers user input to the flexible display 104 of the electronic device 100 to launch an application while the electronic device 100 is in an unlocked state. In this illustrative example, the user 2600 wants to watch a cricket match. Accordingly, the user 2600 touches a user actuation target associated with a cricket match monitoring application at step 2901. This causes the cricket match monitoring application to launch on the one or more processors. Since the cricket match monitoring application will need to present application output content on the flexible display 104 for the user 2600 to be able to monitor the cricket match, in one or more embodiments the cricket match monitoring application delivers a request to one or more processors (114) of the electronic device 100 indicating that content is to be newly presented on the flexible display 104. In this example, the content is split-screen content. This request for split-screen content to be newly presented on the flexible display 104 is identified at decision 2903.

Step 2902 then determines the position of the blade assembly 102 and, therefore, the position of the flexible display 104. At step 2901, the flexible display 104 is in the retracted position, which is too small for the cricket match monitoring application to present its application output content in a fully immersive mode. Accordingly, at step 2904 the one or more processors (114) of the electronic device 100 query the cricket match monitoring application to determine a content presentation size of the split-screen content.

It should be noted that the split-screen content can take a variety of forms. Illustrating by example, in one or more embodiments the split-screen content comprises at least a first window presented by a first application operating on the one or more processors (114) of the electronic device 100 and a second window presented by a second application operating on the one or more processors (114) of the electronic device 100. In other embodiments, the split-screen content comprises picture-in-a-picture content from a single application. In the illustrative embodiment of FIG. 29, the split-screen content comprises primary content for presentation on one portion of the flexible display 104 and auxiliary content corresponding to the primary content that will be presented on another portion of the flexible display 104.

Embodiments of the disclosure contemplate that when an electronic device 100 is equipped with a translating display, the position of the translating display relative to the device housing 101 will change the amount of the translating display that is visible from the front, visible from the rear, and visible in the curved end portions. Said differently, the viewable size of the translating display from each side of the electronic device 100 will vary as a function of the position of the translating display on the device housing. Advantageously, embodiments of the disclosure provide applications, methods, and systems that dynamically resize and adjust the interface layouts and content presentations as a function of the position of the translating display.

That the split-screen content comprises primary content and auxiliary content is determined at step 2905. Step 2906 then comprises translating the blade assembly 102 to a position between the retracted position and the extended position due to the fact that split-screen content is to be newly presented on the flexible display 104 by the cricket match monitoring application.

As shown at step 2908, the transitioning of step 2907 results in the flexible display 104 defining a front-facing portion 2909 and a rear-facing portion 2910. In this illustrative embodiment, the front-facing portion 2909 and the rear-facing portion 2910 are separated by a curvilinear portion 2913. As shown at 2908, the cricket match monitoring application presents the split-screen content as primary content 2911 presented on the front-facing portion 2909 of the flexible display 104 and auxiliary content 2912 that is supplemental content corresponding to the primary content 2911 on the rear-facing portion 2910. Accordingly, the user 2600 can watch the cricket match on the front-facing portion 2909 while the score is presented on the rear-facing portion 2910.

A feature illustrated in the method 2900 of FIG. 29 is that when the blade assembly 102 translates relative to the device housing 101, in one or more embodiments the flexible display 104 can be functionally segmented into three, individual, usable parts. These include the front-facing portion 2909 of the flexible display 104, the rear-facing portion 2910 of the flexible display 104, and the curvilinear portion 2913 of the flexible display 104. This curvilinear portion 2913 of the flexible display 104 is sometimes revered to as the "roll edge" portion of the flexible display 104.

Figure 30:
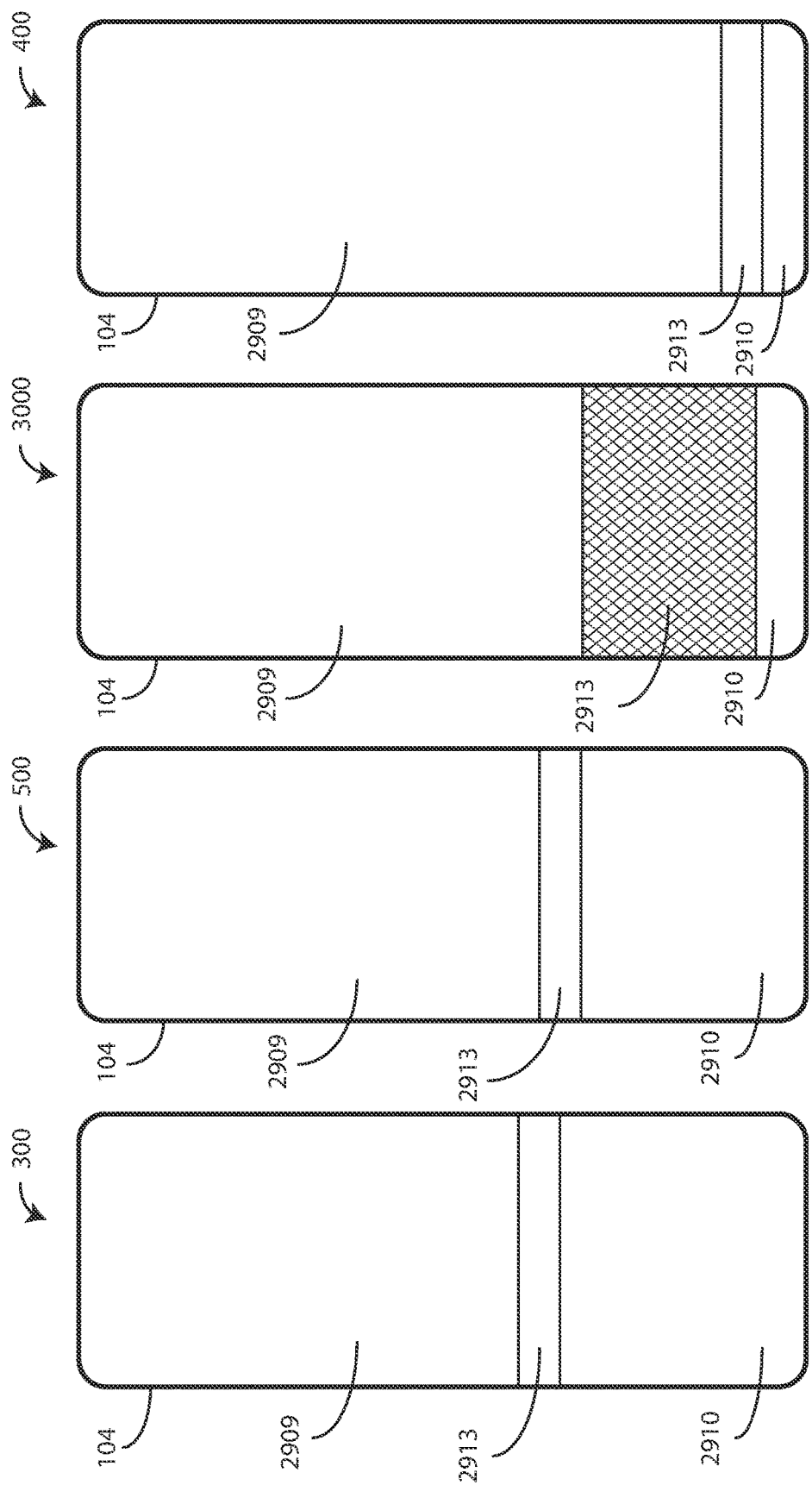
FIG. 30 illustrates plan views of one explanatory translating display in accordance with one or more embodiments of the disclosure in an undeformed state and defining a front portion of the translating display, a rear portions of the translating display, and a curved portions of the translating display as a function of display position relative to a device housing when the flexible display is coupled to a blade assembly that is slidably coupled to the device housing and slidable between an extended position, a retracted position, and a peek position.

Turning now to FIG. 30, the flexible display 104 of FIG. 29 is shown in an elongated position so that the front-facing portion 2909 of the flexible display 104, the rear-facing portion 2910 of the flexible display 104, and the curvilinear portion 2913 of the flexible display 104 can be more easily seen. From left to right, the flexible display 104 is shown in the retracted position 300, the peek position 500, positions 3000 between the extended position 400 and the retracted position 300, one example of which is the position from step (2908) of FIG. 29, and the extended position 400. In the positions 300 between the extended position 400 and the retracted position 300, the curvilinear portion 2913 is shown as a range because the flexible display 104 can take a variety of positions between the extended position 400 and the retracted position 300.

In one or more embodiments, receiving information from the one or more sensors of the electronic device, the one or more processors know where the flexible display 104 is relative to the device housing and "map" these portions as distinct and separate content presentation regions. In one or more embodiments, each of these content presentation regions are dynamically remapped as the flexible display 104 position changes relative to the device housing.

Illustrating by example, while the curvilinear portion 2913 of the flexible display 104 occupies the same area of the flexible display 104 regardless of position, it's location along the flexible display 104 changes as the flexible display 104 translates. By contrast, each of the front-facing portion 2909 of the flexible display 104 and the rear-facing portion 2910 of the flexible display 104 change size as the flexible display 104 translates. When the flexible display 104 moves to a particular position, the front-facing portion 2909 of the flexible display 104 gets larger while the rear-facing portion 2910 of the flexible display 104 gets smaller. When the flexible display 104 translates to the retracted position from the extended position, the opposite effect occurs.

In split-screen content applications, the one or more processors of an electronic device can cause the translation mechanism to translate the blade assembly carrying the flexible display 104 to a position accommodating the primary content on the front-facing portion 2909 of the flexible display 104 and the auxiliary content on the rear-facing portion 2910 of the flexible display 104. In other embodiments, the one or more processors can dynamically resize and remap content to one of the three content presentation sections. In one or more embodiments, each of these segments are dynamically resized and remapped to the display region when the flexible display 104 slides around the device housing of an electronic device. The orientation of the rear and roll edge of the flexible display 104 are not same as the primary as the display rolls around onto the rear of the device. In one or more embodiments, this is addressed by always rotating the rear portion of the display by 180-degrees, as was shown above in step (2908) of FIG. 29. The desired orientation of the roll edge of the display can change based on the side the device is facing and is dynamically changed based on the sensor input for which side of the device is facing down.

While the method (2900) of FIG. 9 presented split-screen content from a single application, embodiments of the disclosure are not so limited. As noted above, the split-screen content can comprise primary content and auxiliary content from a single application, primary content and supplemental content from a single application, and picture-in-a-picture content from a single application. In still other embodiments, the split-screen content can comprise at least a first window presented by a first application operating on one or more embodiments of an electronic device and a second window presented by a second application operating on the one or more processors of the electronic device. Turning now to FIG. 31, illustrated therein is one such method 3100 by which this can occur.

Beginning at step 3101, a user is using an electronic device 100 comprising a device housing 101, a blade assembly 102 carrying a blade and flexible display 104 that is slidably coupled to the device housing 101, a translation mechanism operable to slide the blade assembly 102 relative to the device housing between an extended position and an retracted position, and one or more processors (114) operable with the translation mechanism. The electronic device 100 is in a locked state. However, the user wants to "do some multi-tasking."

Consequently, at step 2902 the user unlocks the electronic device 100, thereby revealing a plurality of user actuation targets corresponding to applications operable to run on the one or more processors (114). Since the user wants to multi-task, the user launches both a movie streaming application and an email application.

At step 3103, the one or more processors (114) of the electronic device 100 determine the position of the blade assembly 102 and flexible display 104 as previously described. Decision 3104 then determines that split-screen content is to be newly presented on the flexible display 104 as a result of the user input the flexible display 104 received at step 3102.

Since two applications are being launched, the split-screen content to be newly presented on the flexible display 104 will comprise at least a first window presented by the movie streaming application and a second window presented by the email application. At step 3105, the one or more processors (114) of the electronic device 100 determine a content presentation size of the split-screen content to be newly presented on the flexible display 104. In one or more embodiments, this content presentation size comprises a size of at least a first window, a second window, and a buffer window situated around each of the first window and the second window.

Step 3105 also includes transitioning the blade assembly 102 to a position between the extended position and the retracted position as a function of the content presentation size determined at step 3105. The result is shown at step 3106, where a first window 3107 presented by the movie streaming application and a second window 3108 presented by the email application are both presented on a front-facing portion of the flexible display 104. In this illustrative embodiment, each of the first window 3107 and the second window 3108 includes a buffer window situated around the same, which causes the first window 3107 and the second window 3108 to be physically separated on the flexible display 104 as shown at step 3106.

It should be noted that the method 3100 of FIG. 31 could repeat or continue as additional windows are to be newly presented on the flexible display 104. Illustrating by example, the method 3100 can comprise again transitioning, by the translation mechanism, the blade assembly 102 to another position between the retracted position and the extended position that is closer to the extended position when a third window is to be newly presented on the flexible display 104. Moreover, the method 3100 could continue to transition the blade assembly 102 toward the extended position as additional windowed content is to be newly presented on the flexible display 104.

As described above, when the blade assembly 102 reaches the extended position when additional windowed content is to be newly presented on the flexible display, the one or more processors (114) of the electronic device 100 may preclude presentation of the additional windowed content on the flexible display 104. As also described above, when the split-screen content is consumed, or windows are closed, the one or more processors (114) can cause the translation mechanism to transition the blade assembly 102 toward the retracted position to maintain a compact form factor.

Figure 32:
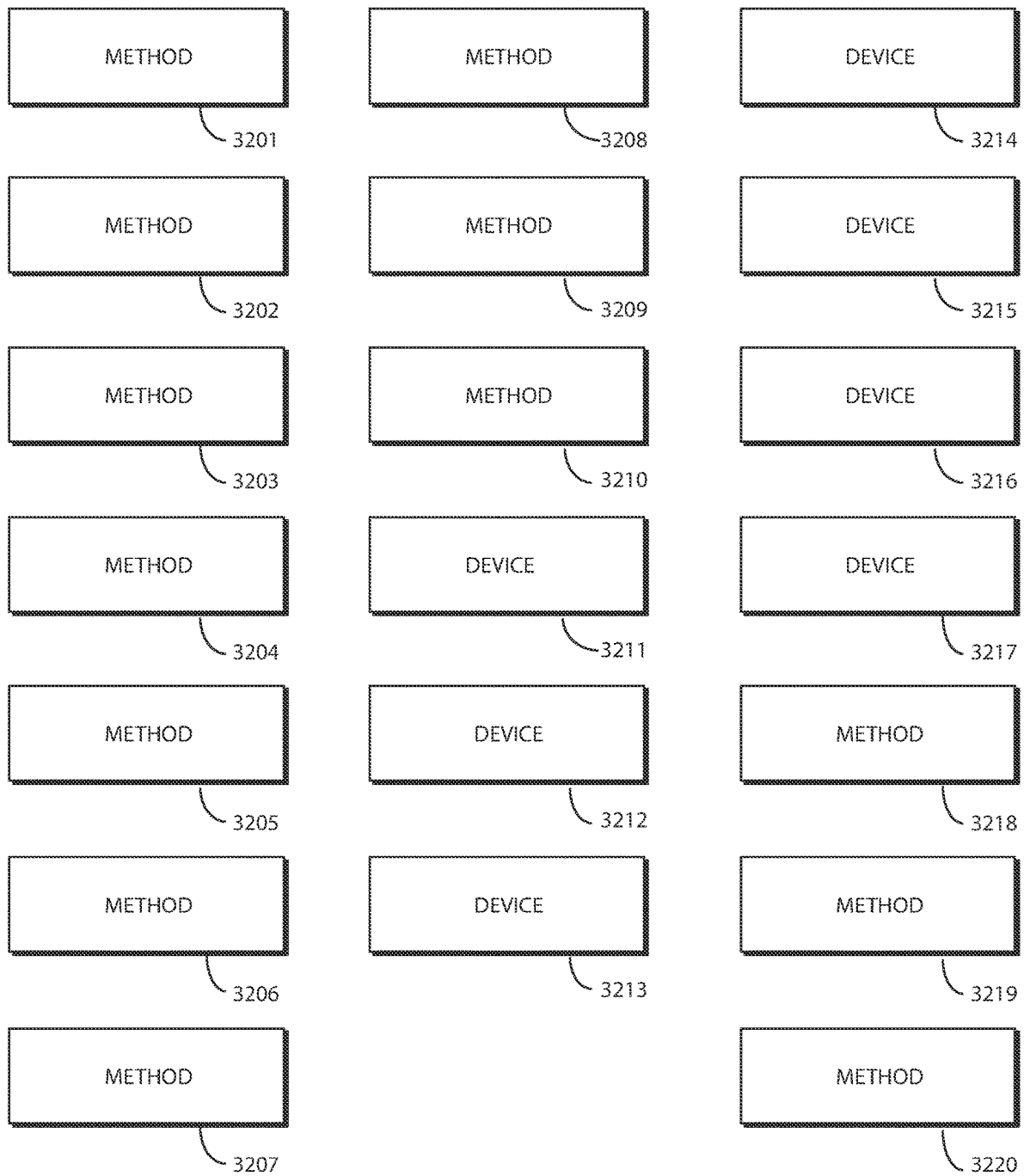
FIG. 32 illustrates various embodiments of the disclosure.
Figure 33:
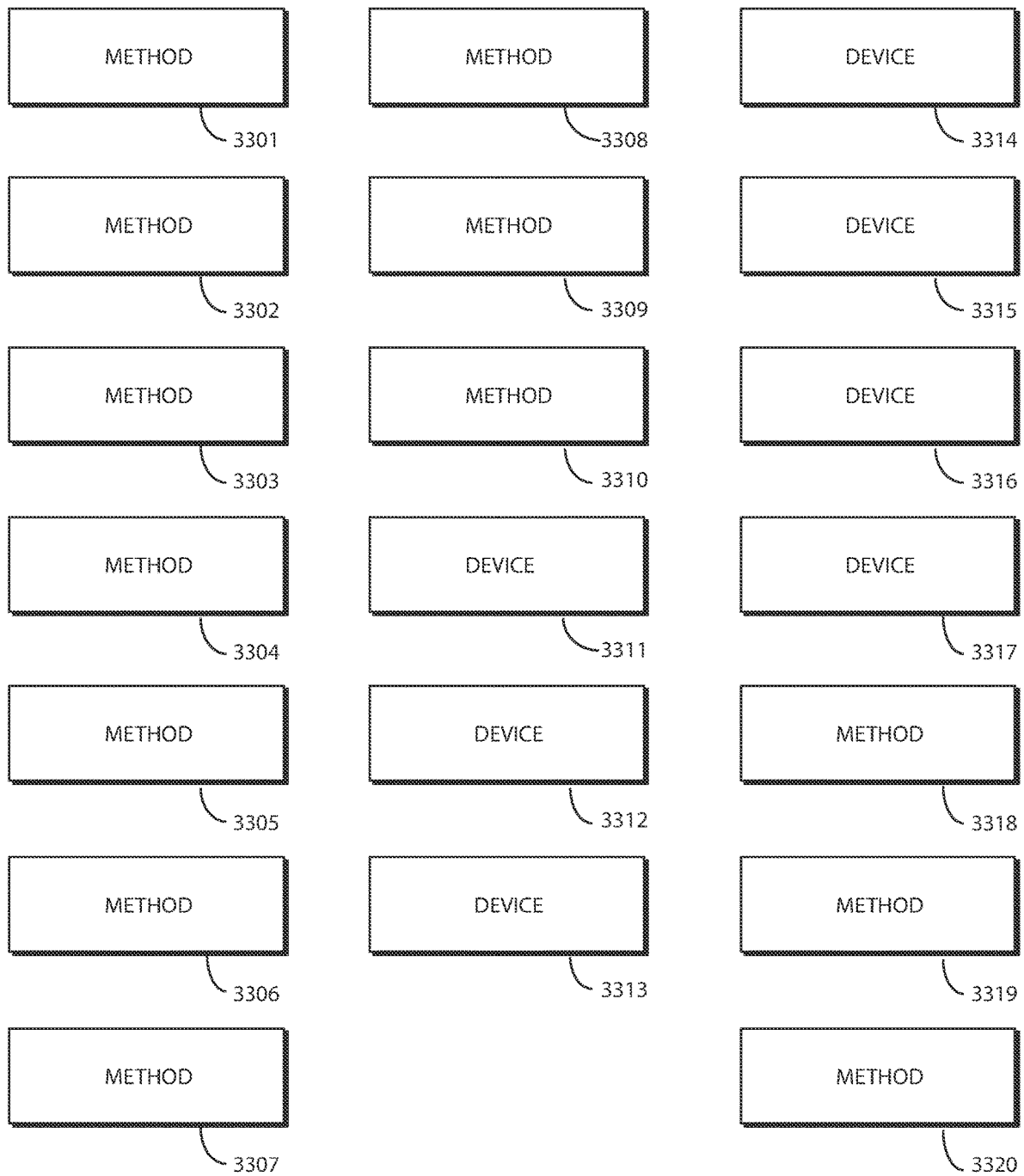
FIG. 33 illustrates various other embodiments of the disclosure.

Turning now to FIGS. 32-33, illustrated therein are various embodiments of the disclosure. The embodiments of FIGS. 32-33 are shown as labeled boxes in FIGS. 32-33 due to the fact that the individual components of these embodiments have been illustrated in detail in FIGS. 1-31, which precede FIGS. 32-33. Accordingly, since these items have previously been illustrated and described, their repeated illustration is no longer essential for a proper understanding of these embodiments. Thus, the embodiments are shown as labeled boxes.

Beginning with FIG. 32, at 3201 a method in an electronic device comprises transitioning, by a translation mechanism, a blade assembly that carries a blade and flexible display and is slidably coupled to a device housing and movable between an extended position, a retracted position, and a peek position to a position between the retracted position and the extended position when content is to be newly presented on the flexible display.

At 3202, the transitioning of 3101 to the position between the retracted position and the extended position occurs as a function of a content presentation size of the content to be newly presented on the flexible display. At 3203, the content presentation size of 3202 comprises a size of a presentation item identifying the content to be newly presented on the flexible display and another size of a buffer window situated around the presentation item.

At 3204, the method of 3101 further comprises again transitioning, by the translation mechanism, the blade assembly to another position between the retracted position and the extended position that is closer to the extended position when additional content is to be newly presented on the flexible display. At 3205, the method of 3201 further comprises continuing to transition, by the translation mechanism, the blade assembly toward the extended position as additional content is to be newly presented on the flexible display.

At 3206, the method of 3201 further comprises determining, by one or more processors operable with the translation mechanism, whether the blade assembly is in the extended position when additional content is to be newly presented on the flexible display. At 3206, where the blade assembly is in the extended position when the additional content is to be newly presented on the flexible display, the method comprises precluding presentation of the additional content on the flexible display and, otherwise, extending the blade assembly to another position between the retracted position and the extended position that is closer to the extended position.

At 3207, the method of 3201 further comprises detecting, by one or more processors operable with the flexible display, consumption of the content after the content is newly presented on the flexible display. At 3207, the method comprises transitioning, by the translation mechanism, the blade assembly toward the retracted position.

At 3208, the transitioning of 3207 from the position between the retracted position and the extended position toward the retracted position in response to consumption of the content occurs as a function of a content presentation size of the content.

At 3209, the transitioning of 3201 occurs while the electronic device is in a locked state and the content to be newly presented on the flexible display comprises notification content. At 3210, the transitioning of 3201 occurs while the electronic device is in an unlocked state and the content to be newly presented on the flexible display comprises application output content.

At 3211, the transitioning of 3201 results in the flexible display defining a front-facing portion and a rear-facing portion separated from the front-facing portion by a curvilinear portion. At 3211, the method further comprises presenting, by one or more processors, the content on the front-facing portion of the flexible display and also presenting, supplemental content corresponding to the content on the rear-facing portion of the flexible display.

At 3212, an electronic device comprises a device housing, a blade assembly carrying a blade and a flexible display and slidably coupled to the device housing, a translation mechanism operable to slide the blade assembly relative to the device housing between an extended position and a retracted position, and one or more processors operable with the translation mechanism. At 3212, the one or more processors identify content to be newly presented on the flexible display. At 3212, the one or more processors cause the translation mechanism to translate the blade assembly to a position between the retracted position and the extended position as a function of an area of the flexible display required to present the content on the flexible display.

At 3213, the one or more processors of 3212 further query an application requesting to newly present the content on the flexible display for the area of the flexible display required to present the content on the flexible display. At 3214, the application of 3213 comprises a gaming application or a video presentation application defining the area of the flexible display required to present the content on the flexible display. At 3215, the content of 3213 comprises multimedia content and the area of the flexible display required to present the multimedia content on the flexible display is defined by an aspect ratio the application utilizes to present the multimedia content.

At 3216, the one or more processors of 3212 identify consumption or cessation of presentation of the content on the flexible display. At 3216, the one or more processors cause the translation mechanism to translate the blade assembly from the position between the retracted position and the extended position toward the retracted position.

At 3217, a method in an electronic device comprises receiving, by one or more processors, a request from an application operating on the one or more processors to present new content on a flexible display carried by a blade assembly that is slidable around a device housing between a retracted position and an extended position. At 3217, the method comprises obtaining, by the one or more processors from the application operating on the one or more processors, an area amount of the flexible display required to present the new content. At 3217, the method comprises causing, by a translation mechanism, the blade assembly to translate toward the extended position by the area amount.

At 3218, the causing the blade assembly to translate toward the extended position of 3217 only occurs when the blade assembly is situated between the extended position and the retracted position when the request is received. At 3219, the method of 3218 further comprises receiving, by the one or more processors from the application operating on the one or more processors, indicia of a cessation of presentation of the new content on the flexible display and causing the blade assembly to translate toward the retracted position by the area amount.

At 3220, the method of 3219 further comprises presenting, by the one or more processors, the new content on a front-facing portion of the flexible display. At 3220, the method comprises also presenting, by the one or more processors, new auxiliary content corresponding to the new content on a rear-facing portion of the flexible display that is separated from the front-facing portion by a curvilinear portion of the flexible display.

Turning now to FIG. 33, at 3301 a method in an electronic device comprises transitioning, by a translation mechanism, a blade assembly that carries a blade and flexible display and is slidably coupled to a device housing and movable between an extended position, a retracted position, and a peek position to a position between the retracted position and the extended position when split-screen content is to be newly presented on the flexible display. At 3302, the split-screen content of 3301 comprises at least a first window presented by a first application operating on one or more processors of the electronic device and a second window presented by a second application operating on the one or more processors of the electronic device.

At 3303, the transitioning of 3301 to the position between the retracted position and the extended position occurs as a function of a content presentation size of the split-screen content to be newly presented on the flexible display. At 3304, the content presentation size of 3303 comprises a size of at least a first window, a second window, and a buffer window situated around each of the first window and the second window.

At 3305, the method of 3304 further comprises again transitioning, by the translation mechanism, the blade assembly to another position between the retracted position and the extended position that is closer to the extended position when a third window is to be newly presented on the flexible display. At 3306, the method of 3303 further comprises continuing to transition, by the translation mechanism, the blade assembly toward the extended position as additional windowed content is to be newly presented on the flexible display.

At 3307, the method of 3303 further comprises determining, by one or more processors operable with the translation mechanism, whether the blade assembly is in the extended position when additional windowed content is to be newly presented on the flexible display. At 3307, where the blade assembly is in the extended position when the additional windowed content is to be newly presented on the flexible display, the method comprises precluding presentation of the additional windowed content on the flexible display. Otherwise, the method of 3307 comprises extending the blade assembly to another position between the retracted position and the extended position that is closer to the extended position.

At 3308, the method of 3303 further comprises detecting, by one or more processors operable with the flexible display, closure of one or more of the first window and/or the second window. At 3308, the method comprises transitioning, by the translation mechanism, the blade assembly toward the retracted position. At 3309, the transitioning from the position between the retracted position and the extended position of 3308 toward the extended position in response to the closure of the one or more of the first window and/or the second window occurs as a function of a content presentation size of the one or more of the first window and/or the second window.

At 3310, the split-screen content of 3301 comprises picture-in-a-picture content. At 3311, the transitioning of 3301 results in the flexible display defining a front-facing portion and a rear-facing portion separated from the front-facing portion by a curvilinear portion. At 3311, the method further comprising presenting, by one or more processors, the split-screen content on the front-facing portion of the flexible display.

At 3312, an electronic device comprises a device housing, a blade assembly carrying a blade and a flexible display and slidably coupled to the device housing, a translation mechanism operable to slide the blade assembly relative to the device housing between an extended position and a retracted position, and one or more processors operable with the translation mechanism. At 3312, when the one or more processors identify split-screen content to be newly presented on the flexible display, the one or more processors cause the translation mechanism to translate to a position between the retracted position and the extended position as a function of an area of the flexible display required to present the split-screen content on the flexible display.

At 3313, the split-screen content of 3312 comprises a first window of a first application and a second window of a second application. At 3313, the first application and the second application are different applications.

At 3314, at least one of the first application and/or the second application of 3313 comprises a video presentation application. At 3315, the split-screen content of 3313 comprises multimedia content and the area of the flexible display required to present the multimedia content on the flexible display is defined by a plurality of windows utilized to present the multimedia content. At 3316, the split-screen content of 3312 comprises picture-in-a-picture content.

At 3317, a method in an electronic device comprises receiving, by one or more processors, a request from two or more applications operating on the one or more processors to present at least first content from a first application and second content from a second application on a flexible display carried by a blade assembly that is slidable around a device housing between a retracted position and an extended position. At 3317, the method comprises obtaining, by the one or more processors from the first application and the second application, an area amount of the flexible display required to present the first content and the second content. At 3317, the method comprises causing, by a translation mechanism, the blade assembly to translate toward the extended position by the area amount.

At 3318, the causing the blade assembly to translate toward the extended position of 3317 only occurs when the blade assembly is situated between the extended position and the retracted position when the request is received. At 3319, the method of 3318 further comprises receiving, by the one or more processors from the application operating on the one or more processors, indicia of a cessation of presentation of the at least first content from a first application and second content from a second application on the flexible display and causing the blade assembly to translate toward the retracted position. At 3320, the method of 3319 further comprises presenting, by the one or more processors, the at least first content from a first application and second content from a second application only on a front-facing portion of the flexible display.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising transitioning, by a translation mechanism, a blade assembly that carries a blade and flexible display and is slidably coupled to a device housing, is coupled to two major surfaces of the device housing and wraps around a minor surface of the device housing, and is movable between an extended position concealing an imager, a peek position revealing the imager, and a retracted position between the extended position and the peek position and also concealing the imager, to a position between the retracted position and the extended position when content is to be newly presented on the flexible display.

2. The method of claim 1, wherein the transitioning to the position between the retracted position and the extended position occurs as a function of a content presentation size of the content to be newly presented on the flexible display.

3. The method of claim 2, wherein the content presentation size comprises a size of a presentation item identifying the content to be newly presented on the flexible display and another size of a buffer window situated around the presentation item.

4. The method of claim 1, further comprising again transitioning, by the translation mechanism, the blade assembly to another position between the retracted position and the extended position that is closer to the extended position when additional content is to be newly presented on the flexible display.

5. The method of claim 1, further comprising continuing to transition, by the translation mechanism, the blade assembly toward the extended position as additional content is to be newly presented on the flexible display.

6. The method of claim 1, further comprising determining, by one or more processors operable with the translation mechanism, whether the blade assembly is in the extended position when additional content is to be newly presented on the flexible display and, where the blade assembly is in the extended position when the additional content is to be newly presented on the flexible display, precluding presentation of the additional content on the flexible display and, otherwise, extending the blade assembly to another position between the retracted position and the extended position that is closer to the extended position.

7. The method of claim 1, further comprising detecting, by one or more processors operable with the flexible display, consumption of the content after the content is newly presented on the flexible display and transitioning, by the translation mechanism, the blade assembly toward the retracted position.

8. The method of claim 7, wherein the transitioning from the position between the retracted position and the extended position toward the retracted position in response to consumption of the content occurs as a function of a content presentation size of the content.

9. The method of claim 1, wherein the transitioning occurs while the electronic device is in a locked state and the content to be newly presented on the flexible display comprises notification content.

10. The method of claim 1, wherein the transitioning occurs while the electronic device is in an unlocked state and the content to be newly presented on the flexible display comprises application output content.

11. The method of claim 1, wherein the transitioning results in the flexible display defining a front-facing portion and a rear-facing portion separated from the front-facing portion by a curvilinear portion, further comprising presenting, by one or more processors, the content on the front-facing portion of the flexible display and also presenting, supplemental content corresponding to the content on the rear-facing portion of the flexible display.

12. An electronic device, comprising:
a device housing;
a blade assembly coupled to two major surfaces and one minor surface of the device housing, carrying a blade and a flexible display, and slidably coupled to the device housing;
a translation mechanism operable to slide the blade assembly relative to the device housing between an extended position, a retracted position, and a peek position revealing an image capture device; and
one or more processors operable with the translation mechanism;

wherein when the one or more processors identify content having an area amount required to present the content to be newly presented on the flexible display, the one or more processors cause the translation mechanism to translate the blade assembly by the area amounts to a position between the retracted position and the extended position as a function of an area of the flexible display required to present the content on the flexible display.

13. The electronic device of claim 12, wherein the one or more processors further query an application requesting to newly present the content on the flexible display for the area of the flexible display required to present the content on the flexible display.

14. The electronic device of claim 13, wherein the application comprises a gaming application or a video presentation application defining the area of the flexible display required to present the content on the flexible display.

15. The electronic device of claim 13, wherein the content comprises multimedia content and the area of the flexible display required to present the multimedia content on the flexible display is defined by an aspect ratio the application utilizes to present the multimedia content.

16. The electronic device of claim 12, wherein when the one or more processors identify consumption or cessation of presentation of the content on the flexible display, the one or more processors cause the translation mechanism to translate the blade assembly from the position between the retracted position and the extended position toward the retracted position.

17. A method in an electronic device, the method comprising:
receiving, by one or more processors, a request from an application operating on the one or more processors to present new content on a flexible display carried by a blade assembly that is coupled to two exterior major surfaces of a device housing and wraps around an exterior minor surface of the device housing and is slidable around the device housing between at least a retracted position and an extended position concealing an image capture device and a peek position revealing the image capture device;
obtaining, by the one or more processors from the application operating on the one or more processors, an area amount of the flexible display required to present the new content; and
causing, by a translation mechanism, the blade assembly to translate toward the extended position by the area amount.

18. The method of claim 17, wherein the causing the blade assembly to translate toward the extended position only occurs when the blade assembly is situated between the extended position and the retracted position when the request is received.

19. The method of claim 18, further comprising receiving, by the one or more processors from the application operating on the one or more processors, indicia of a cessation of presentation of the new content on the flexible display and causing the blade assembly to translate toward the retracted position by the area amount.

20. The method of claim 19, further comprising:
presenting, by the one or more processors, the new content on a front-facing portion of the flexible display; and
also presenting, by the one or more processors, new auxiliary content corresponding to the new content on a rear-facing portion of the flexible display that is separated from the front-facing portion by a curvilinear portion of the flexible display.

* * * * *